United States Patent
Yamaoka et al.

(10) Patent No.: US 8,254,233 B2
(45) Date of Patent: Aug. 28, 2012

(54) INFORMATION RECORDING DEVICE, INFORMATION REPRODUCING DEVICE, AND INFORMATION RECORDING MEDIUM

(75) Inventors: Masaru Yamaoka, Osaka (JP); Yuji Takagi, Osaka (JP); Makoto Usui, Osaka (JP)

(73) Assignee: Panasonic Corporation, Osaka (JP)

( * ) Notice: Subject to any disclaimer, the term of this patent is extended or adjusted under 35 U.S.C. 154(b) by 55 days.

(21) Appl. No.: 12/921,976

(22) PCT Filed: Dec. 10, 2009

(86) PCT No.: PCT/JP2009/006752
§ 371 (c)(1),
(2), (4) Date: Sep. 10, 2010

(87) PCT Pub. No.: WO2010/082271
PCT Pub. Date: Jul. 22, 2010

(65) Prior Publication Data
US 2011/0004891 A1 Jan. 6, 2011

(30) Foreign Application Priority Data
Jan. 13, 2009 (JP) ................................. 2009-004226

(51) Int. Cl.
*G11B 20/18* (2006.01)
(52) U.S. Cl. .................. 369/53.21; 369/53.2; 369/47.21; 369/47.28; 369/275.1
(58) Field of Classification Search ............... 369/47.21, 369/47.28, 53.2, 275.1
See application file for complete search history.

(56) References Cited

U.S. PATENT DOCUMENTS

| | | | |
|---|---|---|---|
| 7,039,848 B2 | 5/2006 | Inokuchi et al. | |
| 7,421,742 B2 | 9/2008 | Kitani et al. | |
| 2003/0172341 A1 | 9/2003 | Inokuchi et al. | |
| 2005/0089165 A1 | 4/2005 | Kitani et al. | |
| 2005/0105728 A1* | 5/2005 | Yamaoka et al. | 380/202 |
| 2008/0232220 A1 | 9/2008 | Yamaoka | |

(Continued)

FOREIGN PATENT DOCUMENTS

JP 7-78187 3/1995

(Continued)

OTHER PUBLICATIONS

International Search Report issued Jan. 12, 2010 in International (PCT) Application No. PCT/JP2009/006752.

*Primary Examiner* — Wayne Young
*Assistant Examiner* — Brenda Bernardi
(74) *Attorney, Agent, or Firm* — Wenderoth Lind & Ponack, L.L.P.

(57) ABSTRACT

An information recording device, an information reproducing device, and an information recording medium securely protect copyright of main information, and prevent illegal access to the recorded main information. The information recording device includes a medium unique information generating section that generates second sub information by data-converting stamper unique information based on disc identification information that differs for each optical disc after transferring main information and first sub information from a stamper having the main information and the first sub information recorded thereon onto an optical disc, and a medium unique information recording section that records the second sub information on the optical disc having recorded thereon in advance the main information and the first sub information in a form different from the forms of the main information and the first sub information.

13 Claims, 30 Drawing Sheets

U.S. PATENT DOCUMENTS

| | | |
|---|---|---|
| 2009/0067309 A1* | 3/2009 | Kobayashi et al. ........ 369/59.26 |
| 2009/0097376 A1* | 4/2009 | Yamaoka et al. ................ 369/94 |
| 2009/0196140 A1 | 8/2009 | Yamaoka et al. |

FOREIGN PATENT DOCUMENTS

| | | |
|---|---|---|
| JP | 2001-357533 | 12/2001 |
| JP | 2002-74833 | 3/2002 |
| JP | 2003-249009 | 9/2003 |
| JP | 2004-282238 | 10/2004 |
| JP | 2006-260614 | 9/2006 |
| JP | 2007-25913 | 2/2007 |
| JP | 2007025913 A * | 2/2007 |
| JP | 2008-269763 | 11/2008 |
| WO | 2004/064314 | 7/2004 |
| WO | 2007/139077 | 12/2007 |

* cited by examiner

FIG. 7A

| SYNCHRONIZATION CODE | DATA CODE | SYNCHRONIZATION CODE | DATA CODE |
|---|---|---|---|
| SY0 | FIRST FRAME | SY5 | SECOND FRAME |
| SY1 | THIRD FRAME | SY5 | FOURTH FRAME |
| SY2 | FIFTH FRAME | SY5 | SIXTH FRAME |
| SY3 | SEVENTH FRAME | SY5 | EIGHTH FRAME |
| SY4 | NINTH FRAME | SY5 | TENTH FRAME |
| SY1 | ELEVENTH FRAME | SY6 | TWELFTH FRAME |
| SY2 | THIRTEENTH FRAME | SY6 | FOURTEENTH FRAME |
| SY3 | FIFTEENTH FRAME | SY6 | SIXTEENTH FRAME |
| SY4 | SEVENTEENTH FRAME | SY7 | EIGHTEENTH FRAME |
| SY1 | NINETEENTH FRAME | SY7 | TWENTIETH FRAME |
| SY2 | TWENTY-FIRST FRAME | SY7 | TWENTY-SECOND FRAME |
| SY3 | TWENTY-THIRD FRAME | SY7 | TWENTY-FOURTH FRAME |
| SY4 | TWENTY-FIFTH FRAME | SY7 | TWENTY-SIXTH FRAME |

FIG. 7B

| SYNCHRONIZATION CODE | DATA CODE | SYNCHRONIZATION CODE | DATA CODE |
|---|---|---|---|
| SY0 | FIRST FRAME | SY5 | SECOND FRAME |
| SY1 | THIRD FRAME | SY8 | FOURTH FRAME | 381 |
| SY2 | FIFTH FRAME | SY5 | SIXTH FRAME |
| SY3 | SEVENTH FRAME | SY5 | EIGHTH FRAME | 382 |
| SY4 | NINTH FRAME | SY5 | TENTH FRAME |
| SY1 | ELEVENTH FRAME | SY6 | TWELFTH FRAME | 383 |
| SY2 | THIRTEENTH FRAME | SY6 | FOURTEENTH FRAME |
| SY3 | FIFTEENTH FRAME | SY8 | SIXTEENTH FRAME | 384 |
| SY4 | SEVENTEENTH FRAME | SY6 | EIGHTEENTH FRAME |
| SY1 | NINETEENTH FRAME | SY8 | TWENTIETH FRAME | 385 |
| SY2 | TWENTY-FIRST FRAME | SY7 | TWENTY-SECOND FRAME |
| SY3 | TWENTY-THIRD FRAME | SY7 | TWENTY-FOURTH FRAME | 386 |
| SY4 | TWENTY-FIFTH FRAME | SY7 | TWENTY-SIXTH FRAME |

FIG. 15

| | (a) | (b) | (c) | (d) |
|---|---|---|---|---|
| (1) | RECORDING START ADDRESS: 0x00100000<br>RECORDING END ADDRESS: 0x00200000<br>KEY (INITIAL VALUE) 0x1111 | RECORDING START ADDRESS: 0x00200000<br>RECORDING END ADDRESS: 0x00300000<br>KEY (INITIAL VALUE) 0x2222 | RECORDING START ADDRESS: 0x00300000<br>RECORDING END ADDRESS: 0x00400000<br>KEY (INITIAL VALUE) 0x3333 | RECORDING START ADDRESS: 0x00400000<br>RECORDING END ADDRESS: 0x00500000<br>KEY (INITIAL VALUE) 0x4444 |
| (2) | RECORDING START ADDRESS: 0x00500000<br>RECORDING END ADDRESS: 0x00600000<br>KEY (INITIAL VALUE) 0x5555 | RECORDING START ADDRESS: 0x00600000<br>RECORDING END ADDRESS: 0x00700000<br>KEY (INITIAL VALUE) 0x6666 | RECORDING START ADDRESS: 0x00700000<br>RECORDING END ADDRESS: 0x00800000<br>KEY (INITIAL VALUE) 0x7777 | RECORDING START ADDRESS: 0x00800000<br>RECORDING END ADDRESS: 0x00900000<br>KEY (INITIAL VALUE) 0x8888 |
| (3) | RECORDING START ADDRESS: 0x00900000<br>RECORDING END ADDRESS: 0x00A00000<br>KEY (INITIAL VALUE) 0x9999 | RECORDING START ADDRESS: 0x00A00000<br>RECORDING END ADDRESS: 0x00B00000<br>KEY (INITIAL VALUE) 0xAAAA | RECORDING START ADDRESS: 0x00B00000<br>RECORDING END ADDRESS: 0x00C00000<br>KEY (INITIAL VALUE) 0xBBBB | RECORDING START ADDRESS: 0x00C00000<br>RECORDING END ADDRESS: 0x00D00000<br>KEY (INITIAL VALUE) 0xCCCC |

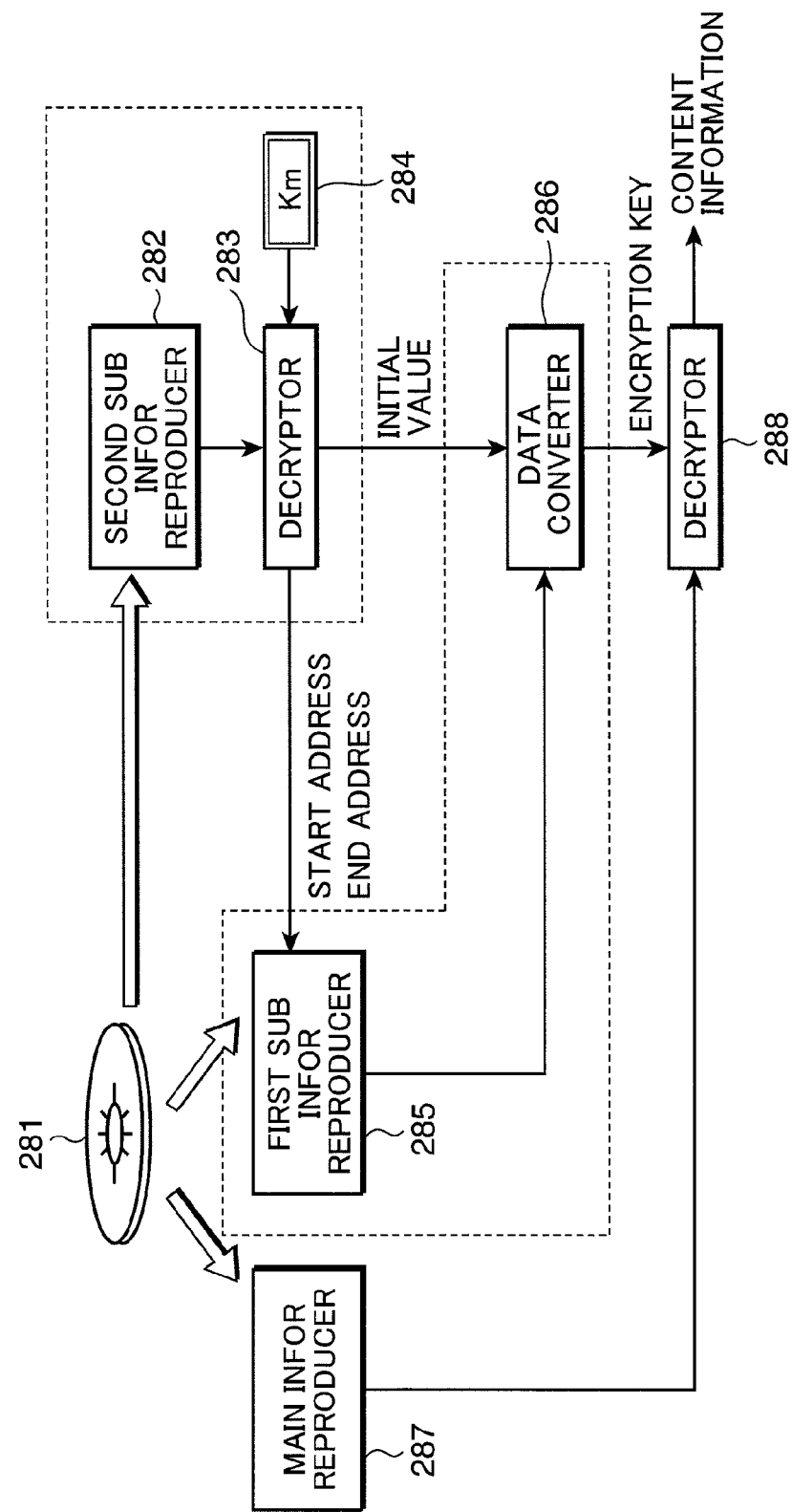

FIG. 19A

|     | (a) | (b) | (c) | (d) |
|-----|-----|-----|-----|-----|
| (1) | RECORDING START ADDRESS: 0x00100000<br>RECORDING END ADDRESS: 0x00200000<br>KEY (INITIAL VALUE) 0x1111<br>ENCRYPTION USING KEY 1 | RECORDING START ADDRESS: 0x00200000<br>RECORDING END ADDRESS: 0x00300000<br>KEY (INITIAL VALUE) 0x2222<br>ENCRYPTION USING KEY 2 | RECORDING START ADDRESS: 0x00300000<br>RECORDING END ADDRESS: 0x00400000<br>KEY (INITIAL VALUE) 0x3333<br>ENCRYPTION USING KEY 3 | RECORDING START ADDRESS: 0x00400000<br>RECORDING END ADDRESS: 0x00500000<br>KEY (INITIAL VALUE) 0x4444<br>ENCRYPTION USING KEY 4 |
| (2) | RECORDING START ADDRESS: 0x00500000<br>RECORDING END ADDRESS: 0x00600000<br>KEY (INITIAL VALUE) 0x5555<br>ENCRYPTION USING KEY 5 | RECORDING START ADDRESS: 0x00600000<br>RECORDING END ADDRESS: 0x00700000<br>KEY (INITIAL VALUE) 0x6666<br>ENCRYPTION USING KEY 6 | RECORDING START ADDRESS: 0x00700000<br>RECORDING END ADDRESS: 0x00800000<br>KEY (INITIAL VALUE) 0x7777<br>ENCRYPTION USING KEY 7 | RECORDING START ADDRESS: 0x00800000<br>RECORDING END ADDRESS: 0x00900000<br>KEY (INITIAL VALUE) 0x8888<br>ENCRYPTION USING KEY 8 |
| (3) | RECORDING START ADDRESS: 0x00900000<br>RECORDING END ADDRESS: 0x00A00000<br>KEY (INITIAL VALUE) 0x9999<br>ENCRYPTION USING KEY 9 | RECORDING START ADDRESS: 0x00A00000<br>RECORDING END ADDRESS: 0x00B00000<br>KEY (INITIAL VALUE) 0xAAAA<br>ENCRYPTION USING KEY 10 | RECORDING START ADDRESS: 0x00B00000<br>RECORDING END ADDRESS: 0x00C00000<br>KEY (INITIAL VALUE) 0xBBBB<br>ENCRYPTION USING KEY 11 | RECORDING START ADDRESS: 0x00C00000<br>RECORDING END ADDRESS: 0x00D00000<br>KEY (INITIAL VALUE) 0xCCCC<br>ENCRYPTION USING KEY 12 |

FIG. 19B

|     | (a)   | (b)    | (c)    | (d)    |
|-----|-------|--------|--------|--------|
| (1) | KEY 1 | KEY 2  | KEY 3  | KEY 4  |
| (2) | KEY 5 | KEY 6  | KEY 7  | KEY 8  |
| (3) | KEY 9 | KEY 10 | KEY 11 | KEY 12 |

INFORMATION RECORDING DEVICE, INFORMATION REPRODUCING DEVICE, AND INFORMATION RECORDING MEDIUM

BACKGROUND OF THE INVENTION

1. Technical Field

The invention relates to an information recording device for recording information on an information recording medium to be manufactured by using a stamper, an information reproducing device for reproducing information from an information recording medium to be manufactured by using a stamper, and an information recording medium to be manufactured by using a stamper.

2. Background Art

For instance, patent literature 1 discloses an information recording medium having recorded therein medium identification information unique to each information recording medium, and computation values obtained by computing the medium identification information by using a one-way function.

In the invention disclosed in patent literature 1, an information recording device for recording information in an information recording medium, and an information reproducing device for reproducing information from an information recording medium respectively have the same one-way function generating means. The information recording device records, on an information recording medium, a first computation value obtained by computing medium identification information unique to each information recording medium, with a one-way function generated by the one-way function generating means. The information reproducing device reproduces medium identification information from an information recording medium, compares a second computation value obtained by computing the reproduced medium identification information with a one-way function generated by the one-way function generating means, with the first computation value recorded in the information recording medium, and reproduces content information recorded in the information recording medium only in the case where the first computation value and the second computation value agree with each other.

Further, for instance, patent literature 2 discloses an information recording medium, wherein a media identifier unique to each information recording medium having content information recorded therein, and a content identifier unique to each content information are recorded.

In the invention disclosed in patent literature 2, an information recording device for recording information in an information recording medium generates an individual key based on a media identifier and a content identifier, encrypts a content key used in encrypting content information by using the individual key, generates an encrypted content key, and records the content information encrypted by using the content key, the content identifier, and the encrypted content key in the information recording medium. Further, the information reproducing device for reproducing information from an information recording medium reads out, from the information recording medium, the content information, the media identifier, the content identifier, and the content key, generates an individual key based on the readout media identifier and content identifier, decrypts the encrypted content key by using the generated individual key, and decrypts the encrypted content information by using the decrypted content key.

However, patent literature 1 is configured to compare a first computation value obtained by computing in advance medium identification information with a one-way function, which is read out from an information recording medium, and a second computation value obtained by computing medium identification information read out from the information recording medium with the one-way function, and allow reproduction of content information, if the first computation value and the second computation value agree with each other. In the above arrangement, if a malicious information reproducing device manufacturer has manufactured an information reproducing device configured to ignore determination on agreement between the first computation value and the second computation value, content data may be reproducible, even if the first computation value and the second computation value do not agree with each other.

Further, in ROM-type information recording media manufactured by copying a stamper, normally, content data is also generated by copying the stamper. In this sense, content information is information common for each of the stampers. In patent literature 1, medium identification information recorded in information recording media is information that differs for each of the information recording media, and the computation values of the medium identification information differs for each of the information recording media. Accordingly, it is impossible to record content data which should be common for each of the stampers by data conversion of medium identification information that differs for each of the information recording media. Therefore, in the information reproducing device disclosed in patent literature 1, copyright protection is performed only by determining agreement between computation values of medium identification information, and controlling output of content information.

Further, patent literature 2 discloses an arrangement, wherein content information is recorded based on media identifiers that differs for each of the information recording media, and content identifiers. Patent literature 2 discloses an arrangement based on a recordable information recording medium obtained by encryption using an encryption key unique to each of the information recording media. This is because if media identifiers that differs for each of the information recording media, and content identifiers are information common for each of the stampers, individual keys to be generated based on the media identifiers and the content identifiers are information that differs for each of the information recording media. Since patent literature 2 does not disclose a concrete individual key recording method, the information recording medium to be used in patent literature 2 is presumably a recordable information recording medium to be recorded by an ordinary recording method. Since an individual key is recorded in each of the stampers in ROM-type information recording media to be manufactured by copying a stamper, only one optical disc is manufactured with respect to each of the stampers. Thus, it is extremely inefficient and infeasible to apply the invention disclosed in patent literature 2 to the ROM-type information recording media.

Considering a conventional invention as described above, there is conceived an information recording and reproducing system as shown in FIG. 31. FIG. 31 is a block diagram showing an arrangement of a conventional information recording and reproducing system. The information recording and reproducing system shown in FIG. 31 is constituted of a mastering device 401, an information recording device 402, and an information reproducing device 403.

The mastering device 401 is constituted of a content encrypting section 405, a modulating section 406, and a key information scrambling section 407.

The content encrypting section 405 encrypts content information to be recorded in an information recording medium 404 by using a content encryption key.

The modulating section 406 modulates the encrypted content information into a modulation format depending on the kind of the information recording medium (stamper) 404, and records the encrypted content information in a user data area 411 of the information recording medium 404.

The key information scrambling section 407 scrambles a content encryption key for encrypting content information with use of e.g. a master key which is secretly held in the key information scrambling section 407, and records the scrambled content encryption key in a first sub information recording area 410 of the information recording medium (stamper) 404.

The information recording device 402 manufactures plural information recording media by copying the stamper manufactured by the mastering device 401, and generates disc unique information unique to each of the information recording media. The information recording device 402 is provided with a unique information recording section 408. The unique information recording section 408 records the disc unique information in a second sub information recording area 409 of the information recording medium 404, as second sub information.

Further, the information reproducing device 403 is constituted of a unique information reproducing section 412, a unique information verifying section 413, a key information descrambling section 414, a demodulating section 415, a content decrypting section 416, and a content output switch 417.

The unique information reproducing section 412 reproduces the disc unique information that differs for each of the information recording media, from the second sub information recording area 409 of the information recording medium 404. The unique information verifying section 413 verifies whether the reproduced disc unique information is legitimate information.

The key information descrambling section 414 reads out, from the first sub information recording area 410 of the information recording medium 404, the content encryption key which is scrambled in common with respect to each of the stampers, and descrambles the scrambled content encryption key by using e.g. a master key which is secretly held in the key information descrambling section 414.

The demodulating section 415 is a section corresponding to the demodulating section 406 of the mastering device 401, and demodulates the content information recorded in the user data area 411 depending on the kind of the information recording medium 404.

The content decrypting section 416 decrypts the encrypted content information read out from the user data area 411 of the information recording medium 404 by using the content encryption key extracted by the key information descrambling section 414.

The content output switch 417 controls reproduction of the content information in accordance with a verification result of the unique information verifying section 413. Specifically, in the case where the unique information verifying section 413 determines that a targeted information recording medium is an illegitimate information recording medium, the content output switch 417 does not output the decrypted content information. On the other hand, in the case where the unique information verifying section 413 determines that the targeted information recording medium is a legitimate information recording medium, the content output switch 417 outputs the decrypted content information. Thus, in the case where disc unique information as the second sub information has not been recorded, or an illegitimate information recording medium having illegitimate information recorded therein is used, the content information is not reproduced. In this way, it is possible to protect the copyright of a copyrighted work such as content information.

However, in the above arrangement, it is impossible to protect the copyright, if an illegitimate information reproducing device loaded with the content output switch 417 which is constantly in a content output state is manufactured.

The user data area 411 and the first sub information recording area 410 of the information recording medium 404 are formed by copying a stamper. Accordingly, it is difficult to prevent a malicious third-party from copying these areas. In view of the above, there is a likelihood that an illegitimate information recording medium 404 having illegally copied content information and content encryption key, and devoid of disc unique information in the second sub information recording area 409 may be manufactured.

On the other hand, the information reproducing device 403 does not reproduce the second sub information recording area 409. Accordingly, it is also possible to manufacture an illegitimate information reproducing device loaded with the content output switch 417 which is constantly in a content output state.

In view of the above, content information may be illegally reproduced or copied by combining an illegitimate information recording medium devoid of the second sub information (disc unique information), and an illegitimate information reproducing device devoid of the content output switch 417.

CITATION LIST

Patent Literature

Patent literature 1: JP 2002-74833A
Patent literature 2: JP 2004-282238A

SUMMARY OF INVENTION

In view of the above problems, an object of the invention is to provide an information recording device, an information reproducing device, and an information recording medium capable of securely protecting the copyright of main information, and preventing an illegal access to the recorded main information.

An information recording device according to an aspect of the invention is an information recording device for recording information in information recording media manufactured by using a stamper. The information recording device includes a second sub information generating section that generates second sub information by data-converting stamper unique information common for each stamper, based on medium unique information that differs for each of the information recording media having recorded therein in advance main information and first sub information that is obtained by data-converting reproduction permitting information necessary for reproducing the main information based on the stamper unique information; and a second sub information recording section that records, in each of the information recording media, the second sub information generated by the second sub information generating section in a form different from the forms of the main information and the first sub information.

In the above arrangement, the second sub information is generated by data-converting the stamper unique information common for each of the stampers, based on the medium unique information that differs for each of the information recording media having recorded therein in advance the main information and the first sub information that is obtained by data-converting the reproduction permitting information necessary for reproducing the main information based on the stamper unique information. Then, the generated second sub information is recorded in each of the information recording media in the form different from the forms of the main information and the first sub information.

According to the invention, unless the second sub information that differs for each of the information recording media is reproduced, the main information is not reproducible. Accordingly, copyright of the main information can be securely protected. Further, even in information recording media manufactured by transferring from the same stamper, it is necessary to read out second sub information that differs for each of the information recording media. As compared with a case of reading out common information in each of information recording media, the above arrangement makes it difficult to illegally analyze the information recording media, thereby preventing illegal access to the recorded main information.

These and other objects, features and advantages of the present invention will become more apparent upon reading the following detailed description along with the accompanying drawings.

BRIEF DESCRIPTION OF DRAWINGS

FIG. 7A is a diagram showing a sector format of the main information recording area, in the case where first sub information is not recorded, and FIG. 7B is a diagram showing a sector format of the main information recording area, in the case where the first sub information is recorded.

FIG. 15 is a conceptual diagram showing an example of a data format of stamper unique information in the second embodiment of the invention.

FIG. 18 is a block diagram showing a characteristic arrangement of an information reproducing device for reproducing content information from an optical disc manufactured by the manufacturing device shown in FIG. 16.

FIG. 19A is a diagram showing first table information representing combinations of address information and initial value information, and FIG. 19B is a diagram showing second table information representing encryption keys for encrypting respective table nodes.

DESCRIPTION OF INVENTION

In the following, embodiments of the invention are described referring to the accompanying drawings. The following embodiments are merely examples embodying the invention, and do not limit the technical scope of the invention.

First Embodiment

Figure 1:
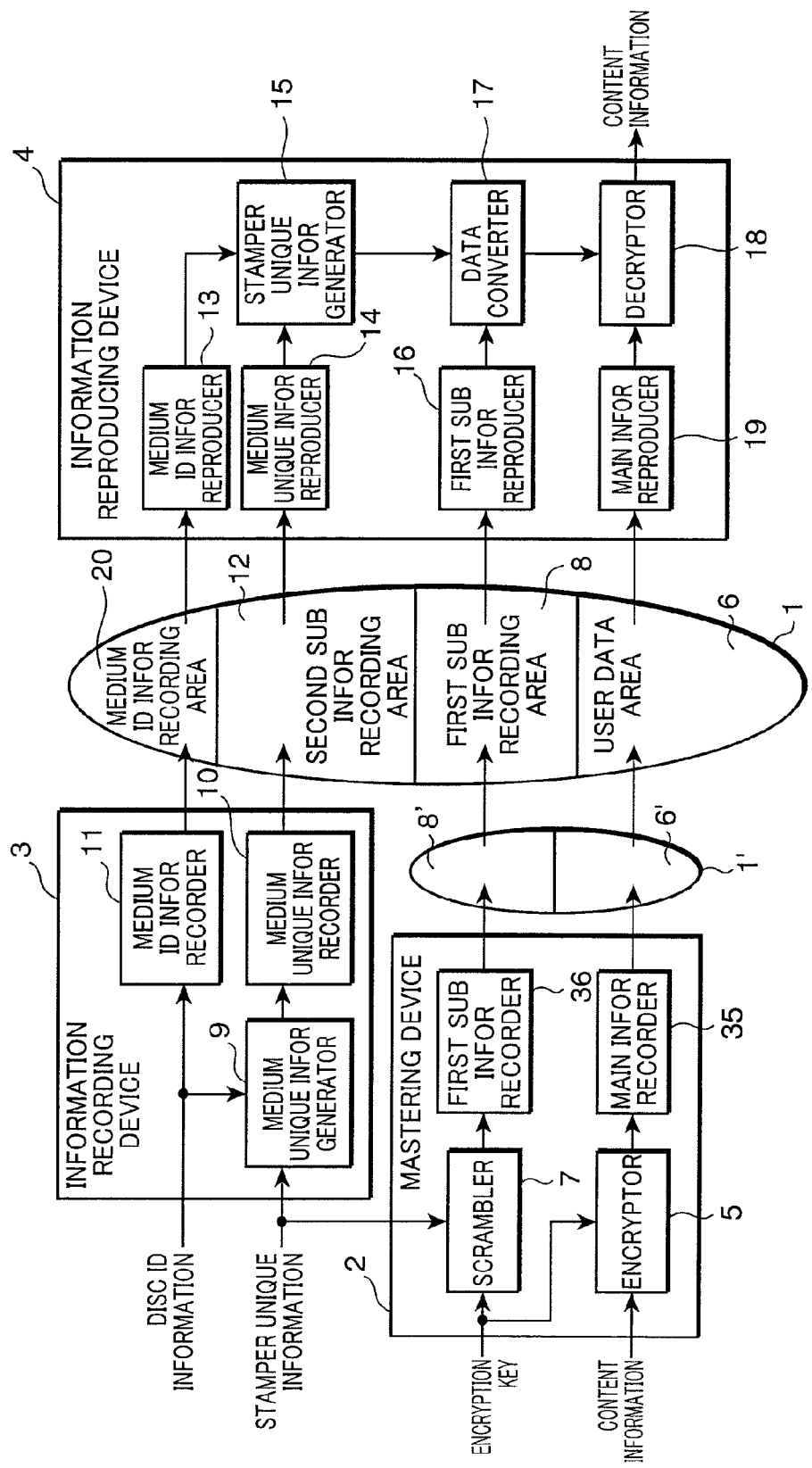
FIG. 1 is a block diagram showing an arrangement of an information recording and reproducing system in a first embodiment of the invention.

FIG. 1 is a block diagram showing an arrangement of an information recording and reproducing system in the first embodiment of the invention. In the first embodiment, description is made based on the premise that an information recording medium is a read-only optical disc. However, the inventive information recording medium is not limited to such an optical disc. All the kinds of information recording media manufactured by copying a master medium such as an optical disc stamper are embraced in the invention.

The information recording and reproducing system of the first embodiment is constituted of a mastering device 2 for manufacturing a stamper 1', an information recording device 3 for recording second sub information in an optical disc 1 manufactured by copying the stamper 1', and an information reproducing device 4 for reproducing information from the optical disc 1. The information recording and reproducing system is provided with a duplication device for copying optical discs from the stamper 1' manufactured by the mastering device 2. In FIG. 1, illustration of the duplication device is omitted.

The mastering device 2 manufactures the stamper 1' by recording content information and first sub information on a master optical disc made of glass. The mastering device 2 is constituted of an encryptor 5, a scrambler 7, a main information recorder 35, and a first sub information recorder 36.

The encryptor 5 encrypts content information to be recorded on the stamper 1' based on an encryption key. The main information recorder 35 records, on the stamper 1', the content information encrypted by the encryptor 5, as main information. The main information recorder 35 manufacture the stamper 1' by irradiating a master optical disc with laser light, and forming concave-convex recording marks on a surface of the master optical disc.

The main information is recorded in a user data area 6' of the stamper 1' by the concave-convex recording marks. Thus, content information as the main information to be recorded on the optical disc 1 is encrypted and recorded by the encryption key. In this sense, the encryption key is information necessary for reproducing content information. Further, content information is not reproducible, unless the encryption key is reproduced. In this sense, the encryption key is reproduction permitting information for permitting reproduction of content information.

The scrambler 7 encrypts the encryption key used in encrypting content information, as information necessary for reproducing the content information, by stamper unique information common for each stamper. The first sub information recorder 36 records, in a first sub information recording area 8' of the stamper 1', the encryption key encrypted by using the stamper unique information, as first sub information.

The first sub information recording area 8' is a recording area, where frame syncs (synchronization codes) to be assigned to each frame in recording main information are recorded. The first sub information recorder 36 in the first embodiment records the first sub information by modifying a pattern of frame syncs to be assigned to each frame at a predetermined interval in recording main information, based on the first sub information. At the time of reproducing the main information, since the reproduction is performed in a state that a frame sync unnecessary for content information is deleted, there is no likelihood that the first sub information may be copied, even if the reproduction data is copied as it is. Thus, the method for recording the first sub information is an information recording method effective in protection against illegal copying.

In the above arrangement, the mastering device 2 in the first embodiment generates content information encrypted by using an encryption key, as main information common for each stamper, and generates a scrambled encryption key by using stamper unique information common for each of the stampers, as the first sub information common for each of the stampers. Then, the mastering device 2 records main information by forming concave-convex recording marks in the user data area 6', and records the first sub information by modifying a pattern of frame syncs to be assigned at a predetermined interval in recording the main information.

In this way, the user data area 6' and the first sub information area 8' are common for each of the stampers, and it is possible to manufacture plural information recording media (optical discs) by copying the stamper 1'. The main information and the first sub information recorded in the user data area 6' and the first sub information recording area 8' of the stamper 1' are transferred to a user data area 6 and a first sub information recording area 8 of the optical disc 1.

The information recording device 3 in the first embodiment records second sub information (medium unique information) that differs for each of the information recording media 1 manufactured by copying the stamper 1' by the mastering device 2. The information recording device 3 is constituted of a medium unique information generator 9, a medium unique information recorder 10, and a medium identification information recorder 11.

The medium unique information generator 9 generates second sub information that differs for each information recording medium by modulating stamper unique information which is identical to the stamper unique information used in scrambling the encryption key by the mastering device 2, and differs for each stamper, based on disc identification information for identifying the information recording medium (optical disc) 1 manufactured by copying a stamper.

In the first embodiment, the second sub information is generated by scrambling and modulating the stamper unique information based on the disc identification information. For instance, the second sub information is generated by calculating an exclusive OR of the stamper unique information and the disc identification information, or by encryption with respect to the stamper unique information and the disc identification information.

The medium unique information recorder 10 records, in the optical disc 1, the second sub information that differs for each of the manufactured information recording media. The optical disc 1 is manufactured by copying the concave-convex recording marks from the stamper 1', and forming a reflection film and a protection film on the concave-convex recording marks.

The medium unique information recorder 10 in the first embodiment records the second sub information in a general BCA (Burst Cutting Area) of an optical disc. The BCA is an area formed by removing a reflection film by laser light irradiation in the form of a barcode extending in the disc radial direction, in an inner circumferential portion of an information recording medium (optical disc). The medium unique information recorder 10 records the second sub information that differs for each of the optical discs by forming a barcode mark where the reflectance and the reflected light intensity of the reflection film are changed. In the first embodiment, the generated second sub information is recorded in the BCA on the inner circumferential portion of the optical disc 1 by using a method for recording information in the BCA.

The medium identification information recorder 11 records, in the optical disc 1, the disc identification information used in generating the second sub information that differs for each other in each of the information recording media. Similarly to the medium unique information recorder 10, the medium identification information recorder 11 records a barcode mark generated based on the disc identification information, in the BCA of the optical disc 1.

The recording band of the barcode mark in the disc circumferential direction is set to a value other than the recording band of the concave-convex recording marks where the main information is recorded. Idealistically, it is desirable to set the recording band of the barcode mark to one half or smaller than the lowest recording band out of the recording bands of the concave-convex recording marks. This is because the above arrangement makes it easy to separate a concave-convex recording mark component recorded beneath the barcode mark, and a barcode mark component depending on a frequency band, in reproducing the barcode mark, and enhance the readout reliability of a barcode mark. On the other hand, in the case where a recording band of a barcode mark, and a recording band of concave-convex recording marks are close to each other, it is difficult to separate a concave-convex recording mark component in a reading signal, and a barcode mark component depending on a frequency band, with the result that the readout reliability of a barcode mark may be lowered.

In the above arrangement, in the information recording device 3 in the first embodiment, both of the second sub information that differs for each of the information recording media, and the disc identification information that differs for each of the information recording media are recorded in the BCA on the inner circumferential portion of a disc, as a barcode mark. The second sub information and the disc identification information are recorded in the BCA by removing a reflection film, which is a metal film on an optical disc, by using e.g. a high-output YaG laser. Further, the barcode mark is recorded in a state that the barcode mark is separated from the concave-convex recording marks recorded beneath the barcode mark depending on a frequency band. In view of the above, it is desirable to set a frequency band of laser light to be applied by a YaG laser to a value other than the recording band of the concave-convex recording marks. More idealistically, it is desirable to set the recording band of the barcode mark to one half or smaller than the lowest recording band out of the recording bands of the concave-convex recording marks.

As a result of the above operation, it is possible to record a barcode mark which is distinguishable from concave-convex recording marks depending on a frequency band, and enhance the readout reliability of a barcode mark. Thus, the above arrangement makes it impossible to copy the barcode information by a general information recording device for recording information in information recording media, and the second sub information is recorded as information whose copying is difficult. Further, the information recording device 3 is capable of recording information that differs for each of the optical discs manufactured by copying a stamper. The information that differs for each of the optical discs may be information unique per information recording medium, or may be information unique per a certain number of information recording media. The information that differs for each of the optical discs is not necessarily information which should be set uniquely with respect to each of the optical discs.

The optical disc 1 manufactured by copying the stamper 1' by the mastering device 2 has the user data area 6, the first sub information recording area 8, a second sub information recording area 12, and a medium identification information recording area 20.

The user data area 6 is an area where encrypted content information is recorded by concave-convex recording marks, as main information. The first sub information recording area 8 is an area where a scrambled encryption key is recorded as the first sub information common for each of the stampers by intentionally modifying an ordinary frame sync pattern necessary for frame synchronization and assigned to each frame at a predetermined interval in recording the main information.

The second sub information recording area 12 is an area where stamper unique information modulated by disc identification information is recorded in the form of a barcode mark on an inner circumferential portion of a disc, as the second sub information that differs for each of the optical discs manufactured by stamping a stamper. The medium identification information recording area 20 is an area where disc identification information for identifying the optical disc 1 is recorded in the form of a barcode mark on an inner circumferential portion of the disc.

The information reproducing device 4 reproduces the main information, the first sub information, and the second sub information from the optical disc 1. The information reproducing device 4 is constituted of a medium identification information reproducer 13, a medium unique information reproducer 14, a stamper unique information generator 15, a first sub information reproducer 16, a data converter 17, a decryptor 18, and a main information reproducer 19.

The medium identification information reproducer 13 reproduces the disc identification information of the optical disc 1, from the barcode mark recorded in the BCA of the optical disc 1.

Similarly to the medium identification information reproducer 13, the medium unique information reproducer 14 reproduces the second sub information that differs for each of the optical discs, from the barcode mark recorded in the BCA of the optical disc 1.

The stamper unique information generator 15 is a section corresponding to the medium unique information generator 9 of the information recording device 3, and performs an inverse transformation with respect to the transformation process to be performed by the medium unique information generator 9. Accordingly, in the case where the medium unique information generator 9 encrypts the stamper unique information based on the disc identification information, the second sub information is encrypted stamper unique information. In this case, the stamper unique information generator 15 decrypts the second sub information based on the disc identification information reproduced by the medium identification information reproducer 13, and extracts the stamper unique information.

On the other hand, in the case where the medium unique information generator 9 performs a scrambling operation of obtaining an exclusive OR of the stamper unique information and the disc identification information, the second sub information is a computation value of the exclusive OR of the stamper unique information and the disc identification information. In this case, the stamper unique information generator 15 performs a descrambling operation of obtaining an exclusive OR of the disc identification information reproduced by the medium identification information reproducer 13, and the second sub information reproduced by the medium unique information reproducer 14, and extracts the stamper unique information.

The first sub information reproducer 16 reproduces the concave-convex recording marks where the main information of the optical disc 1 is recorded, and determines whether an ordinary frame sync pattern to be assigned to each frame at a predetermined interval in recording the main information is modified. In the case where the ordinary frame sync pattern is modified, the first sub information reproducer 16 detects the first sub information based on the modified pattern.

The data converter 17 is a section corresponding to the scrambler 7 of the mastering device 2, and performs an inverse transformation with respect to the transformation process to be performed by the scrambler 7. In the case where the scrambler 7 encrypts an encryption key by the stamper unique information, the first sub information is encrypted encryption key information. In this case, the data converter 17 decrypts the first sub information based on the stamper unique information generated by the stamper unique information generator 15, and extracts the encryption key of content information (main information).

On the other hand, in the case where the scrambler 7 performs a scrambling operation of obtaining an exclusive OR of the encryption key and the stamper unique information, the first sub information is a computation value of the exclusive OR of the encryption key and the stamper unique information. In this case, the data converter 17 performs a descrambling operation of obtaining an exclusive OR of the first sub information reproduced by the first sub information reproducer 16, and the stamper unique information generated by the stamper unique information generator 15, and extracts the encryption key.

The main information reproducer 19 reproduces the main information (encrypted content information) by reproducing the concave-convex recording marks recorded in the user data area 6 of the optical disc 1.

The decryptor 18 decrypts the main information (encrypted content information) reproduced by the main information reproducer 19 by using the encryption key extracted by the data converter 17, and outputs the decrypted content information.

In the first embodiment, the information recording device 3 corresponds to an example of an information recording device, the medium unique information generator 9 corresponds to an example of a second sub information generating section, the medium unique information recorder 10 corresponds to an example of a second sub information recording section, and the medium identification information recorder 11 corresponds to an example of a medium identification information recording section.

Further, the information reproducing device 4 corresponds to an example of an information reproducing device, the main information reproducer 19 corresponds to an example of a main information reproducing section, the first sub information reproducer 16 corresponds to an example of a first sub information reproducing section, the medium unique information reproducer 14 corresponds to a second sub information reproducing section, the stamper unique information generator 15 corresponds to an example of a stamper unique information generating section, the data converter 17 corresponds to an example of a reproduction permitting information extracting section, and the medium identification information reproducer 13 corresponds to an example of a medium identification information reproducing section.

Further, the optical disc 1 corresponds to an example of an information recording medium, the user data area 6 corresponds to an example of a main information recording area, the first sub information recording area 8 corresponds to an example of a first sub information recording area, the second sub information recording area 12 corresponds to an example of a second sub information recording area, and the medium identification information recording area 20 corresponds to an example of a medium identification information recording area.

In the above arrangement, it is impossible to generate an encryption key for decrypting encrypted content information, unless both of the first sub information common for each of the stampers, and the second sub information that differs for each of the information recording media are normally detected. The information reproducing device 4 requires the stamper unique information generator 15 and the data converter 17 which cannot be manufactured, unless a license is given. Thus, it is extremely difficult for a manufacturer who has no knowledge about the first sub information and the second sub information to manufacture an illegitimate information reproducing device.

Further, in the first embodiment, there is described a method for recording the first sub information by modifying a frame sync pattern frame by frame. Since in this method, a reproduction signal to be outputted from the information reproducing device 4 includes only a signal representing content information, there is no likelihood that the first sub information may be outputted to the outside of the information reproducing device 4. Since the first sub information is not information which is easily copyable by a general information recording device for recording information in information recording media, copyright protection of content information can be strengthened.

Furthermore, in the first embodiment, there is described a method for recording the second sub information by forming a barcode mark in a BCA. The barcode mark is formed by removing a reflection film by the application of high-output laser light such as YaG laser light onto the reflection film. Therefore, it is extremely difficult to copy the second sub information as well as the first sub information, thereby enabling to strengthen copyright protection of content information.

Further, concerning a conventional information recording medium, there is disclosed a method for recording disc identification information that differs for each information recording medium. However, in the conventional information recording medium, since stamper unique information is used as encryption key information, if the encryption key information is leaked from one of the information recording media, the encryption of the other information recording media manufactured by copying the same stamper may be illegally decrypted.

However, in the first embodiment, even in ROM-type information recording media manufactured by copying a same stamper, the second sub information is recorded with respect to each of the information recording media, and it is impossible to reproduce the content information, unless the second sub information is reproduced. Even if a malicious third party attempts to analyze the information recording media, information that differs for each of the information recording media is read out. Accordingly, even if the disc identification information of a certain information recording medium is hacked, it is impossible to reproduce the content information recorded in the other information recording media, based on the hacked disc identification information. Thus, the above arrangement is also advantageous in enhancing the protection against hacking.

Figure 2:
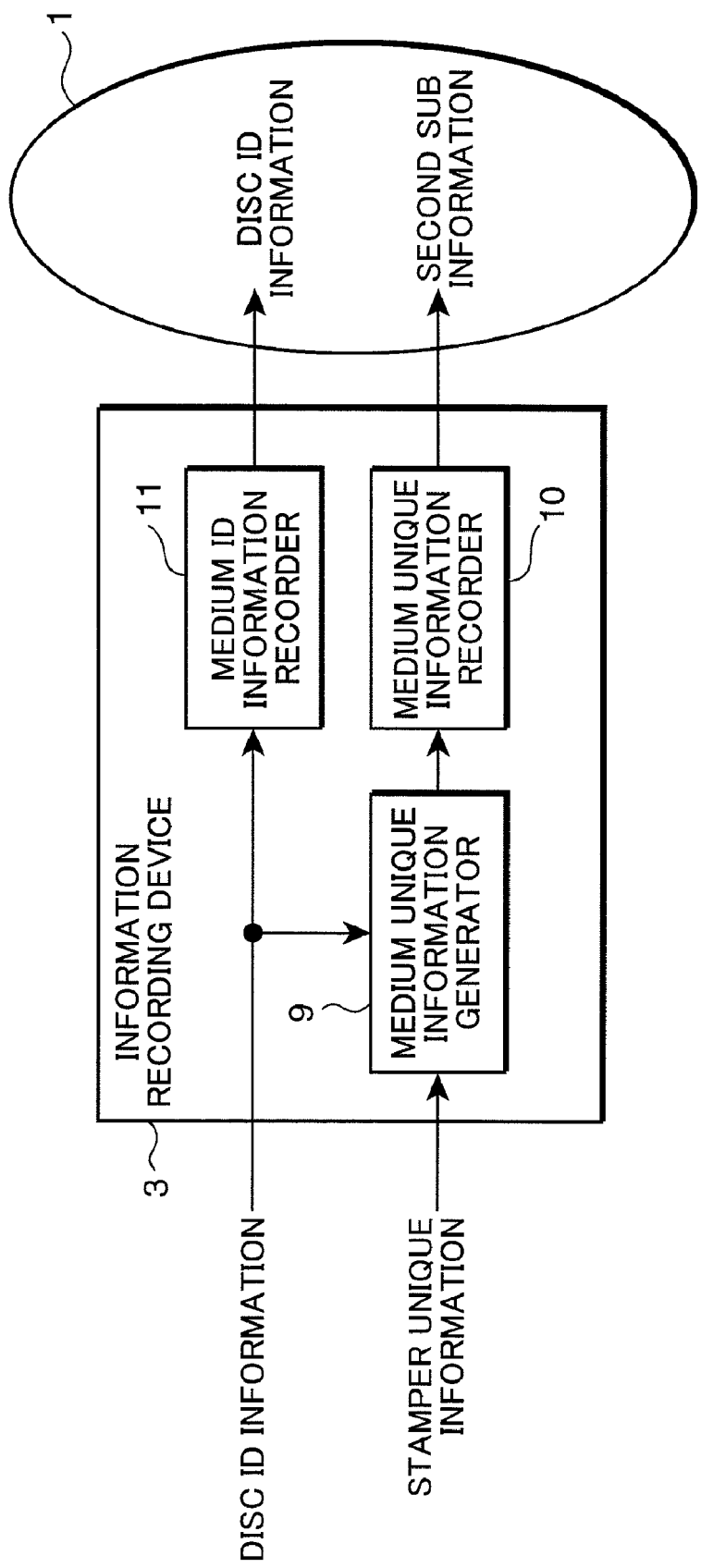
FIG. 2 is a diagram showing an arrangement of an information recording device in the first embodiment of the invention.

FIG. 2 is a diagram showing an arrangement of the information recording device in the first embodiment of the invention.

The information recording device 3 shown in FIG. 2 is provided with the medium unique information generator 9, the medium unique information recorder 10, and the medium identification information recorder 11.

The information recording device 3 records information in the optical disc (information recording medium) 1 manufactured by using the stamper 1'. The optical disc 1 has the main information recorded therein in advance, and also has recorded therein in advance the first sub information obtained by data-converting the encryption key information (reproduction permitting information) necessary for reproducing the main information, based on the stamper unique information common for each stamper, in a form different from the form of the main information.

Further, the optical disc 1 includes concave-convex recording marks formed in accordance with the main information, and a reflection film formed on the concave-convex recording marks. The optical disc 1 is manufactured by transferring the concave-convex recording marks formed in accordance with the main information from the stamper 1', and by forming a reflection film on the concave-convex recording marks transferred from the stamper 1'.

The medium unique information generator 9 generates the second sub information by data-converting the stamper unique information common for each of the stampers, based on the disc identification information (medium unique information) that differs for each of the optical discs having recorded therein in advance the main information, and the first sub information that is obtained by data-converting the encryption key information (reproduction permitting information) necessary for reproducing the main information, based on the stamper unique information.

Further, the medium unique information generator 9 generates the second sub information by encrypting the stamper unique information based on the disc identification information as an encryption key.

The medium unique information recorder 10 records, in the optical disc 1, the second sub information generated by the medium unique information generator 9, in a form different from the forms of the main information and the first sub information. Further, the medium unique information recorder 10 records the second sub information in the optical disc 1 by applying laser light at an interval longer than the longest mark of the concave-convex recording marks, and changing the reflectance of the reflection film.

The medium identification information recorder 11 records, in the optical disc 1, the disc identification information (medium identification information) for identifying the information recording medium by irradiating the optical disc 1 with laser light and changing the reflectance of the reflection film.

As described above, the second sub information is generated by data-converting the stamper unique information common for each stamper, based on the disc identification information (medium unique information) that differs for each optical disc having recorded therein in advance the main information, and the first sub information that is obtained by data-converting the encryption key information (reproduction permitting information) necessary for reproducing the main information, based on the stamper unique information. Then, the generated second sub information is recorded in the optical disc 1 in a form different from the forms of the main information and the first sub information.

Accordingly, in the inventive information recording device, since the main information is not reproducible, unless the second sub information that differs for each optical disc is reproduced, copyright of the main information can be securely protected. Further, it is necessary to read out the second sub information that differs for each optical disc, even if the optical disc 1 is manufactured by transferring from the same stamper 1'. Accordingly, as compared with a case of reading out information common for each optical disc, illegal analysis of the optical disc 1 becomes difficult, and illegal access to the recorded main information can be prevented.

Figure 3:
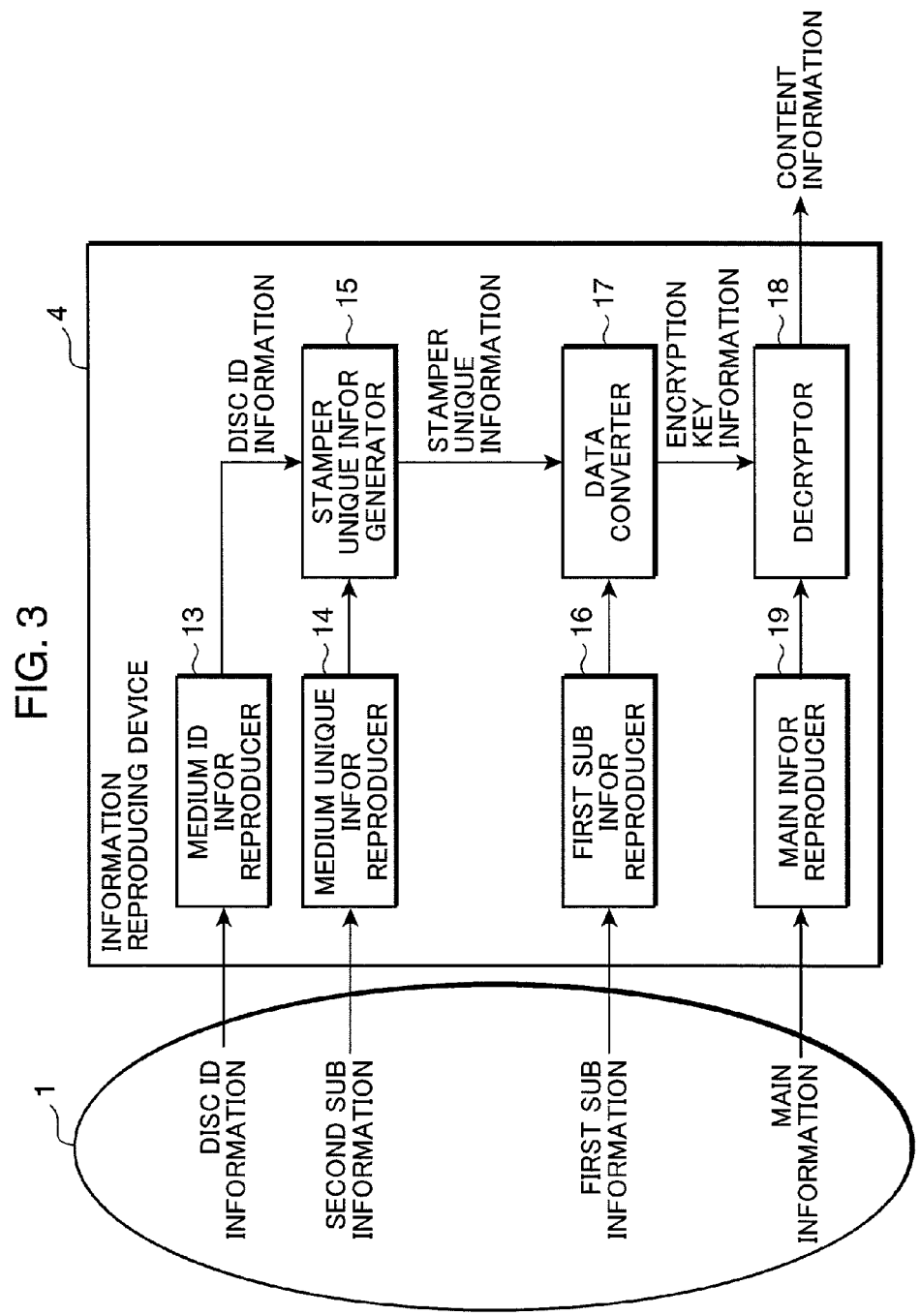
FIG. 3 is a diagram showing an arrangement of an information reproducing device in the first embodiment of the invention.

FIG. 3 is a diagram showing an arrangement of the information reproducing device in the first embodiment.

The information reproducing device 4 shown in FIG. 3 is provided with the medium identification information reproducer 13, the medium unique information reproducer 14, the stamper unique information generator 15, the first sub information reproducer 16, the data converter 17, the decryptor 18, and the main information reproducer 19.

The information reproducing device 4 reproduces information from the optical disc 1 manufactured by using the stamper 1'. The optical disc 1 is manufactured by transferring the concave-convex recording marks formed in accordance with the main information from the stamper 1', forming a reflection film on the concave-convex recording marks transferred from the stamper 1', and additionally recording the second sub information in each of the optical discs.

The medium identification information reproducer 13 reproduces the disc identification information (medium identification information) for identifying the optical disc 1 by irradiating the optical disc 1 with laser light. Further, the medium identification information reproducer 13 reproduces the disc identification information by detecting an intensity change of reflected light from the reflection film.

The main information reproducer 19 reproduces the main information by irradiating the concave-convex recording marks formed on the optical disc 1 with laser light, based on the reflected light from the concave-convex recording marks.

The first sub information reproducer 16 reproduces the first sub information obtained by data-converting the encryption key information (reproduction permitting information) necessary for reproducing the main information, based on the stamper unique information common for each of the stampers. Further, the first sub information reproducer 16 reproduces the first sub information by detecting at least one of displacement of the concave-convex recording marks, deformation of the concave-convex recording marks, and modification of a predetermined pattern of data to be recorded by the concave-convex recording marks, based on reflected light from the concave-convex recording marks.

The medium unique information reproducer 14 reproduces the second sub information obtained by data-converting the stamper unique information, based on the disc identification information (medium unique information) that differs for each optical disc. Further, the medium unique information reproducer 14 reproduces the second sub information by detecting an intensity change of reflected light from the reflection film.

The stamper unique information generator 15 generates the stamper unique information by data-converting the second sub information reproduced by the medium unique information reproducer 14, based on the disc identification information. Further, the stamper unique information generator 15 generates the stamper unique information by data-converting the second sub information reproduced by the medium unique information reproducer 14, based on the disc identification information reproduced by the medium identification information reproducer 13. Furthermore, the stamper unique information generator 15 generates the stamper unique information by decrypting the second sub information based on the disc identification information as an encryption key.

The data converter 17 extracts the encryption key information by data-converting the first sub information reproduced by the first sub information reproducer 16, based on the stamper unique information generated by the stamper unique information generator 15. Further, the data converter 17 extracts the encryption key information by descrambling the scrambled first sub information based on the stamper unique information generated by the stamper unique information generator 15.

The decryptor 18 decrypts the main information reproduced by the main information reproducer 19, based on the encryption key information extracted by the data converter 17.

As described above, the main information is reproduced, and the first sub information obtained by data-converting the encryption key information (reproduction permitting information) necessary for reproducing the main information is reproduced, based on the stamper unique information common for each stamper. Further, the second sub information obtained by data-converting the stamper unique information, based on the disc identification information (medium unique information) that differs for each optical disc, is reproduced. Then, the stamper unique information is generated by data-converting the reproduced second sub information, based on the disc identification information, and the encryption key information is extracted by data-converting the reproduced first sub information, based on the generated stamper unique information.

Accordingly, in the inventive information reproducing device, since the main information is not reproducible, unless the second sub information that differs for each optical disc is reproduced, copyright of the main information can be securely protected. Further, it is necessary to read out the second sub information that differs for each optical disc, even if the optical disc 1 is manufactured by transferring from the same stamper 1'. Accordingly, as compared with a case of reading out information common for each optical disc, illegal analysis of the optical disc 1 becomes difficult, and illegal access to the recorded main information can be prevented.

Figure 4:
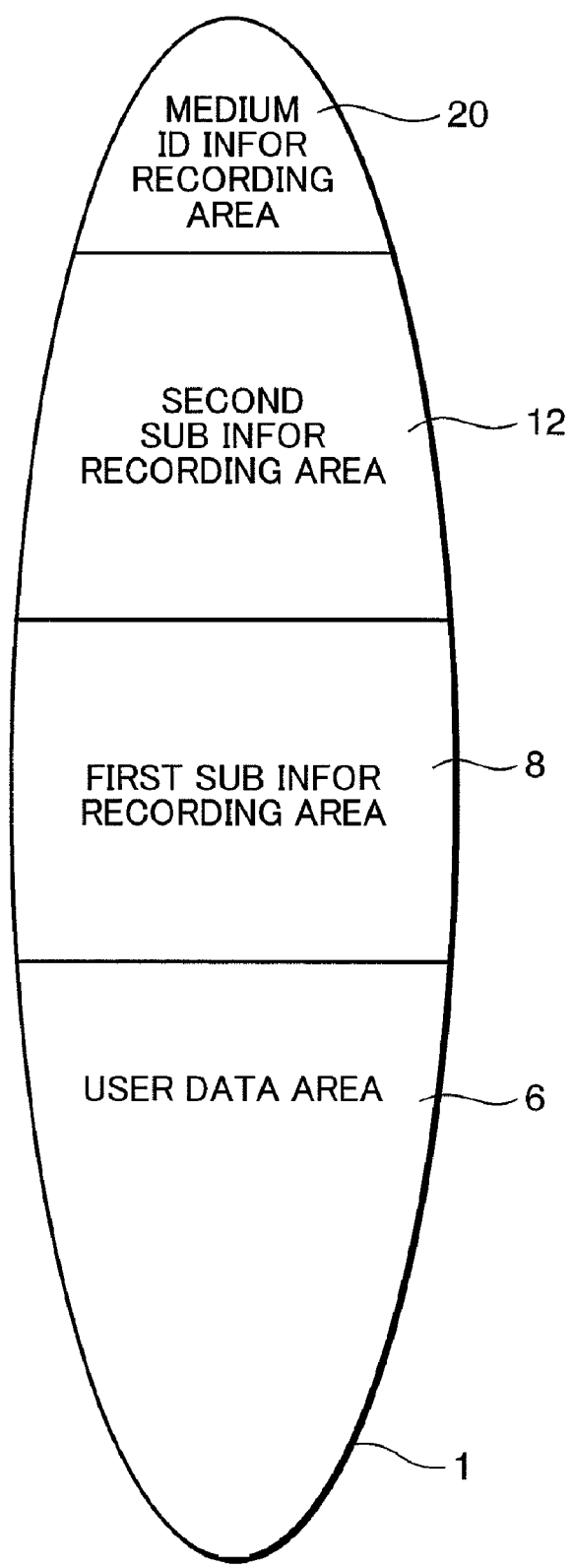
FIG. 4 is a diagram showing an arrangement of an information recording medium in the fast embodiment of the invention.

FIG. 4 is a diagram showing an arrangement of the information recording medium in the first embodiment of the invention.

The optical disc (information recording medium) 1 shown in FIG. 4 is provided with the user data area (main information recording area) 6, the first sub information recording area 8, the second sub information recording area 12, and the medium identification information recording area 20.

The user data area 6 has the main information recorded therein.

The first sub information recording area 8 has recorded therein the first sub information obtained by data-converting the encryption key information (reproduction permitting information) necessary for reproducing the main information, based on the stamper unique information common for each stamper. The first sub information recording area 8 has the first sub information recorded therein in a form different from the form of the main information. Further, the first sub information recording area 8 has the first sub information recorded therein by at least one of displacement of the concave-convex recording marks, deformation of the concave-convex recording marks, and modification of a predetermined pattern of data to be recorded by the concave-convex recording marks.

The second sub information recording area 12 has recorded therein the second sub information obtained by data-converting the stamper unique information, based on the disc identification information (medium unique information) that differs for each optical disc. The second sub information recording area 12 has the second sub information recorded therein in a form different from the forms of the main information and the first sub information. Further, the second sub information recording area 12 has the second sub information recorded therein by changing the reflectance of the reflection film.

The main information and the first sub information are transferred from the stamper 1' having the main information and the first sub information recorded therein to the optical disc 1, and the second sub information is recorded in the optical disc 1.

The medium identification information recording area 20 has recorded therein the disc identification information (medium identification information) for identifying the optical disc 1. The medium identification information recording area 20 has the disc identification information recorded therein by irradiating the optical disc 1 with laser light, and changing the reflectance of the reflection film.

As described above, the user data area 6 has the main information recorded therein; the first sub information recording area 8 has recorded therein the first sub information obtained by data-converting the encryption key information (reproduction permitting information) necessary for reproducing the main information, based on the stamper unique information common for each stamper, and the second sub information recording area 12 has recorded therein the second sub information obtained by data-converting the stamper unique information, based on the disc identification information (medium unique information) that differs for each optical disc. Then, the main information and the first sub information are transferred from the stamper 1' having the main information and the first sub information recorded therein to the optical disc 1, and the second sub information is recorded in the optical disc 1.

Accordingly, in the inventive optical disc (information recording medium), since the main information is not reproducible, unless the second sub information that differs for each optical disc is reproduced, copyright of the main information can be securely protected. Further, it is necessary to read out the second sub information that differs for each optical disc, even if the optical disc 1 is manufactured by transferring information from the same stamper 1'. Accordingly, as compared with a case of reading out information common for each optical disc, illegal analysis of the optical disc 1 becomes difficult, and illegal access to the recorded main information can be prevented.

Figure 5:
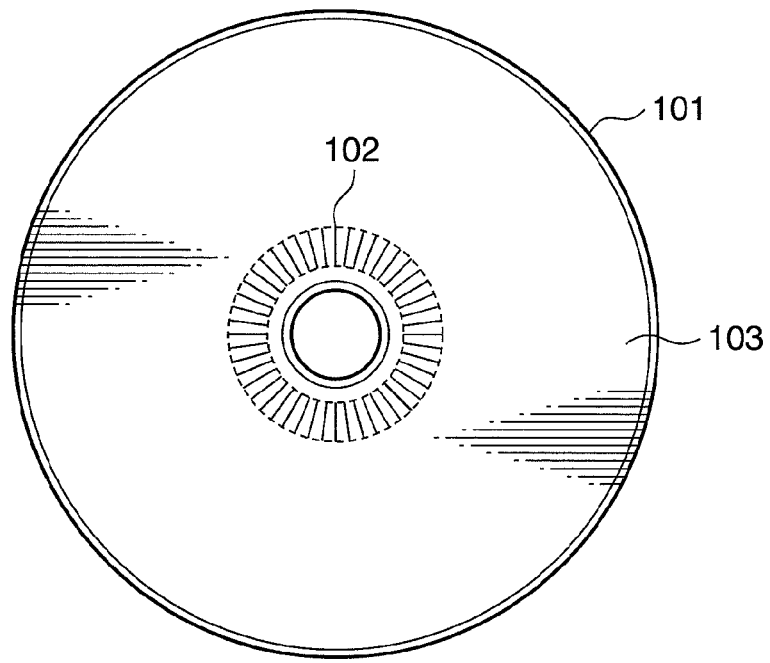
FIG. 5 is an external view showing an arrangement of the information recording medium in the first embodiment of the invention.

Next, the information recording medium in the first embodiment of the invention is described. FIG. 5 is an external view showing an arrangement of the information recording medium in the first embodiment of the invention.

An information recording medium 101 is an ROM-type information recording medium manufactured by transferring and copying a stamper. The information recording medium 101 is constituted of a second sub information recording area 102 where the second sub information is recorded, and a main information recording area (user data area) 103 where the main information such as content information is recorded by concave-convex recording marks.

The second sub information recording area 102 has the second sub information recorded therein by forming a barcode mark. The barcode mark is formed by transferring and copying a stamper, and removing a reflection film by the application of high-output laser light from a YaG laser in the form of a barcode extending in the disc radial direction, in an inner circumferential portion of the information recording medium 101 deposited with the reflection film.

The second sub information is information that differs for each information recording medium manufactured by copying a stamper, and is generated based on the stamper unique information unique to each stamper, and the disc identification information unique to each information recording medium.

The main information recording area 103 is an area where the main information is recorded by concave-convex marks, and is an area formed by transferring a stamper. Further, the first sub information is superimposed and recorded with the main information by modifying an ordinary frame sync pattern to be assigned to each frame at a predetermined interval in recording the main information recorded by the concave-convex recording marks. Accordingly, the main information and the first sub information are recorded in a stamper for manufacturing the information recording medium 101. The main information and the first sub information are recorded by transferring and copying the main information and the first sub information onto an optical disc substrate made of e.g. a polycarbonate resin. After the main information and the first sub information are transferred, a reflection film made of a metal film is formed on the optical disc substrate by vapor deposition or sputtering, and a protection film is formed on the reflection film, whereby the information recording medium 101 is manufactured.

Figure 6:
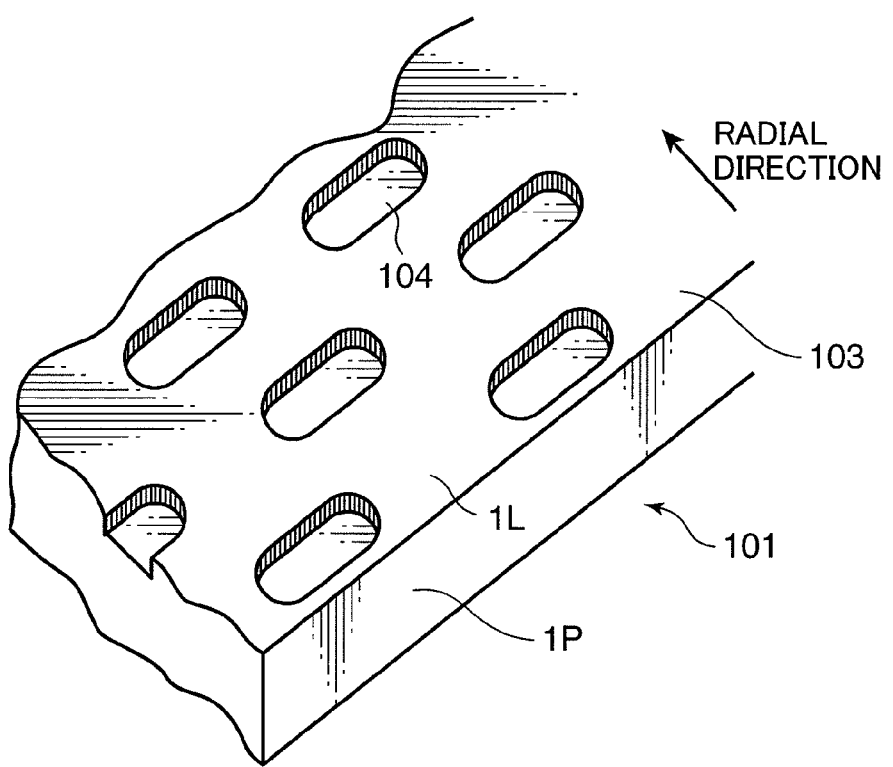
FIG. 6 is a conceptual diagram enlargedly showing an information recording surface of a main information recording area of the information recording medium in the first embodiment of the invention.

FIG. 6 is a conceptual diagram enlargedly showing an information recording surface of the information recording area 103 of the information recording medium 101 in the first embodiment of the invention.

The information recording medium 101 is formed with concave-convex recording marks 104 formed by transferring a stamper onto an optical disc substrate 1P made of e.g. a polycarbonate resin. A reflection film 1L made of a metal film is formed on the concave-convex recording marks 104 by vapor deposition or sputtering. The main information and the first sub information are recorded by the concave-convex recording marks 104.

FIGS. 7A and 7B are conceptual diagrams showing a recording format of the main information recording area 103 of the information recording medium in the first embodiment of the invention. FIG. 7A is a diagram showing a sector format of the main information recording area 103, in the case where the first sub information is not recorded, and FIG. 7B is a diagram showing a sector format of the main information recording area 103, in the case where the first sub information is recorded. In the first embodiment, described is a case where the information recording medium is a DVD-ROM.

The main information in the DVD-ROM is recorded block by block. One block is constituted of 16 sectors of ECC (Error Correction Code) blocks as a unit, one sector is constituted of 26 frames as a unit, and one frame is constituted of 1,488 channel bits as a unit. A frame is a minimum unit of a data synchronization unit, and a synchronization code (frame sync) of 32 channel bits is assigned to a leading portion of a frame. A sector is a unit, to which address information for data access is assigned. An ECC block is a logical minimum access unit of error correction encoded data in units of 16 KB (kilobytes).

As shown in FIG. 7A, a sector in the DVD-ROM is constituted of 26 frames, and a synchronization code (frame sync) is assigned in the leading 32 channel bits of each frame. A synchronization code is constituted of a type indicating portion indicating the type of a synchronization code, and a synchronizing portion corresponding to a fixed pattern common between all the synchronization codes, and indicating that the portion is a synchronization code. The synchronizing portion in the DVD-ROM is constituted of a code of 14 channel bits and a code of 4 channel bits.

A portion of a frame other than the leading synchronization code is a data code, and data such as content information is recorded in the data code.

Further, there are eight types of synchronization codes in the DVD-ROM, i.e., "SY0" through "SY7", and the synchronization codes are identified one from the other by the type indicating portion of the synchronization codes. Further, in the DVD-ROM, it is possible to extract a frame position (frame address) within a sector by checking the order of a series of synchronization code. For instance, by recognizing a frame having the synchronization code "SY5" assigned thereto after a frame having the synchronization code "SY0" assigned thereto, it is possible to determine that the frame having the synchronization code "SY5" assigned thereto is the second frame in the sector. Further, by recognizing a frame having with the synchronization code "SY6" assigned thereto after a frame having the synchronization code "SY3" assigned thereto, it is possible to determine that the frame having the synchronization code "SY6" assigned thereto is the sixteenth frame in the sector. The order of synchronization codes is defined as physical specifications of the DVD-ROM.

On the other hand, FIG. 7B shows a sector structure, in the case where the first sub information is recorded on the main information in the first embodiment. In this example, the synchronization codes of the fourth frame, the sixteenth frame, and twentieth frame are modified from the original synchronization codes "SY5", "SY6", and "SY7" into an out-of-order synchronization code "SY8" (non-existent in the physical specifications) with respect to the standard sector format shown in FIG. 7A. The first sub information is recorded by modification of the synchronization code pattern.

Specifically, in the information recording medium of the first embodiment, the first sub information is recorded bit by bit based on a determination as to whether the synchronization codes of the fourth frame 381, the eighth frame 382, the twelfth frame 383, the sixteenth frame 384, the twentieth frame 385, and the twenty-fourth frame 386 are replaced by "SY8". Thus, 6-bits first sub information is recorded in a sector, and 96-bits first sub information is recorded in a specific ECC block. In FIG. 7B, since the synchronization codes of the fourth frame 381, the sixteenth frame 384, and the twentieth frame 385 are replaced by "SY8", the first sub information recorded in the target sector becomes "100110".

In this example, in the case where a synchronization code is replaced by "SY8", the bit value of the first sub information is set to "1". Alternatively, in the case where a synchronization code is replaced by "SY8", the bit value of the first sub information may be set to "0", and the aforementioned first sub information may be set to "011001". However, it is essentially required that the information recording device and the information reproducing device have a replacement rule common to each other.

As described in the above example, even in the case where the first sub information is recorded by modifying a synchronization code pattern, there is no likelihood that a synchronization code of a frame preceding to a frame having a modified synchronization code by two frames may be modified. Accordingly, it is possible to normally detect a frame address of the frame preceding to the frame having the modified synchronization code by two frames. Even in the case where it is impossible to extract a frame address because a synchronization code is modified, it is easy to complement the frame address by counting the number of frames. Thus, there is no likelihood that modification of a synchronization code may affect reproduction of the main information. Further, even in an ordinary reproducing operation, a synchronization code may be erroneously read out. In view of the above, generally, a function of complementing a frame address is loaded in a general information reproducing device.

Figure 8:
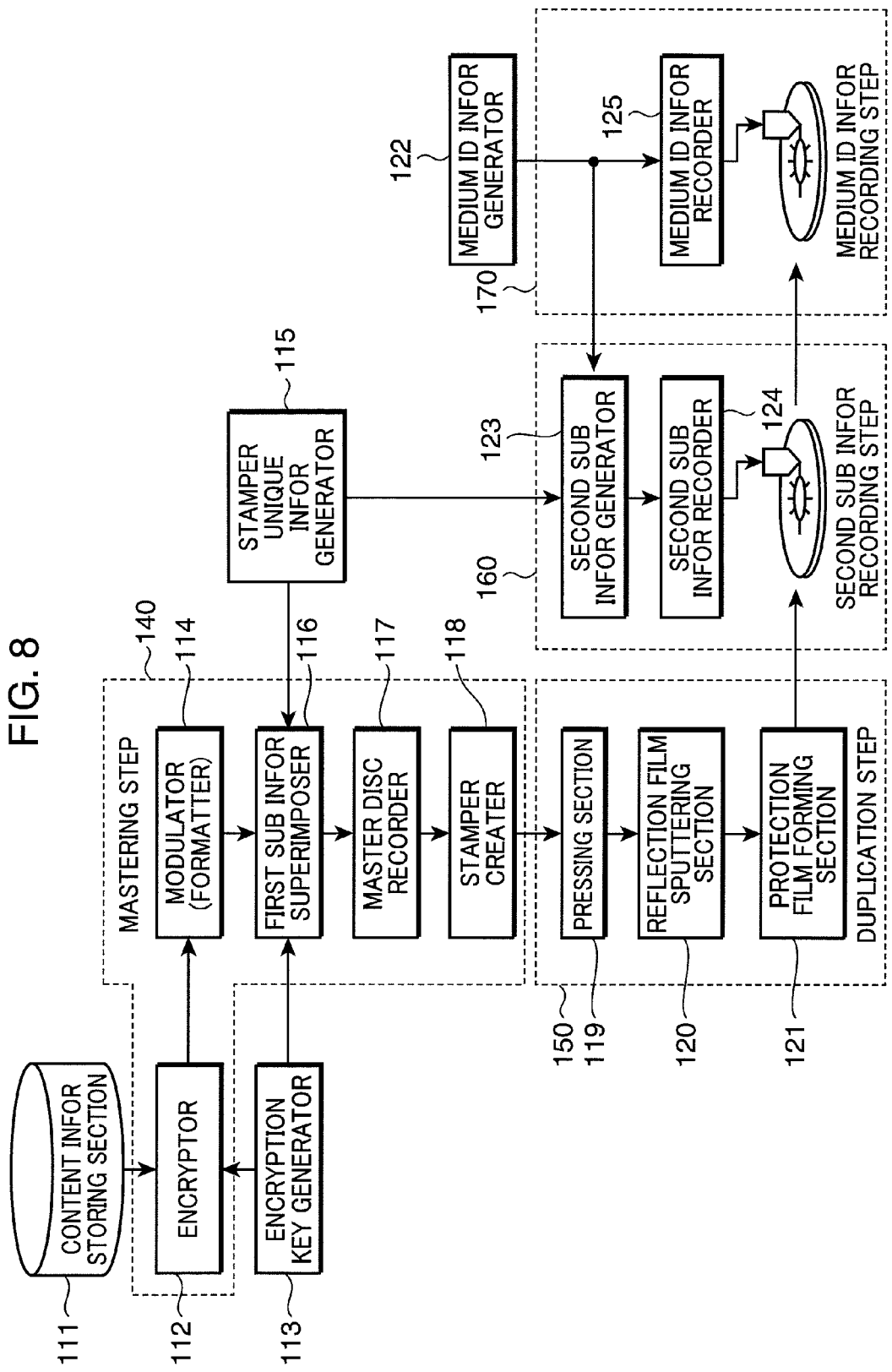
FIG. 8 is a diagram for describing a sequence for manufacturing the information recording medium in the first embodiment of the invention.

FIG. 8 is a diagram for describing a sequence for manufacturing the information recording medium in the first embodiment of the invention.

The sequence for manufacturing the information recording medium in the first embodiment is constituted of a mastering step 140, a duplication step 150, a second sub information recording step 160, and a medium identification information recording step 170.

In the mastering step 140, a stamper is manufactured based on inputted content information. The mastering step 140 is constituted of processes to be performed by an encryptor 112, a modulator 114, a first sub information superimposer 116, a master disc recorder 117, and a stamper creator 118.

The encryptor 112 reads out content information from a content information storing section 111, and encrypts the readout content information by using an encryption key generated by an encryption key generator 113. The content information storing section 111 stores content information to be recorded in the information recording medium. The encryption key generator 113 generates an encryption key for encrypting the content information.

The modulator 114 is constituted of a general formatter, and modulates the encrypted content information encrypted by the encryptor 112 depending on the information recording medium to be recorded. For instance, in a DVD-ROM, 8-16 modulation is applied, and inputted 8-bits information is converted into 16-channel bits information. Further, the modulator 114 assigns an ordinary synchronization code to each frame, and superimposes address information for each sector, and performs an error correction encoding for each ECC block.

The encryption key generated by the encryption key generator 113 is inputted to the first sub information superimposer 116. Further, stamper unique information generated by the stamper unique information generator 115 is inputted to the first sub information superimposer 116. The stamper unique information generator 115 generates stamper unique information unique to the stamper for use in recording content information. The stamper unique information generator 115 may generate content common information common for each content information, or may generate stamper unique information common for each of the stampers for recording.

The first sub information superimposer 116 generates the first sub information based on the inputted encryption key and the stamper unique information. Then, the first sub information superimposer 116 generates modulated data obtained by superimposing the first sub information by modifying a synchronization code pattern within a specific ECC block with respect to the modulated data to be inputted from the modulator 114 and has a synchronization code assigned to each frame, depending on the generated first sub information.

The master disc recorder 117 generates a recording signal for irradiating a master optical disc with laser light depending on the modulated data superimposed with the first sub information by the first sub information superimposer 116, and irradiates the master optical disc with the laser light. The master disc recorder 117 forms concave-convex recording marks on the master optical disc depending on the modulated data superimposed with the first sub information. Thus, the master optical disc is manufactured.

The stamper creator 118 manufactures a stamper by transferring the master optical disc manufactured by the master disc recorder 117 onto a glass substrate. The stamper creator 118 carries the manufactured stamper to the duplication step 150.

The duplication step 150 is constituted of processes to be performed by a pressing section 119, a reflection film sputtering section 120, and a protection film forming section 121.

The pressing section 119 presses a stamper manufactured in the mastering step 140 onto an optical disc substrate made of e.g. a polycarbonate resin, and transfers the concave-convex recording marks recorded in the stamper to the optical disc substrate. Thereby, the main information and the first sub information are copied in the optical disc substrate. Further, the pressing section 119 manufactures plural optical disc substrates from a single stamper.

The reflection film sputtering section 120 forms a reflection film such as a metal film on the concave-convex recording marks in an optical disc substrate manufactured by pressing and copying in the pressing section 119, by a sputtering process. The reflection film may be formed by vapor deposition.

The protection film forming section 121 manufactures an optical disc as an information recording medium by forming a protection film on the optical disc substrate formed with the reflection film by the reflection film sputtering section 120. In this way, in the duplication step 150, plural optical discs are manufactured from a single stamper, and identical main information and identical first sub information are recorded in the optical discs manufactured from the single stamper. The optical discs manufactured by the above process is carried to the second sub information recording step 160.

In the second sub information recording step 160, the second sub information is recorded in each of the optical discs manufactured in the duplication step 150. The second sub information recording step 160 is constituted of processes to be performed by a second sub information generator 123 and a second sub information recorder 124.

The second sub information generator 123 generates the second sub information, based on the stamper unique information (content common information) used by the first sub information superimposer 116 in the mastering step 140, and the disc identification information generated by the medium identification information generator 122 that differs for each of the optical discs. The medium identification information generator 122 generates the disc identification information unique to each of the optical discs. As a method for generating the second sub information in the first embodiment, the second sub information is generated by e.g. using data scrambling based on an exclusive OR of the stamper unique information and the disc identification information, or by encrypting the stamper unique information by using the disc identification information as an encryption key. Further, the second sub information is barcode-demodulated.

The second sub information recorder 124 records the second sub information by removing a reflection film in an inner circumferential portion of an optical disc in the form of a radially extending barcode by irradiation of the optical disc with e.g. high-output YaG laser light depending on the barcode-modulated second sub information. The second sub information recorder 124 is operable to record the second sub information by using a device for recording in a BCA of a general optical disc. The optical disc having the second sub information recorded therein is carried to the medium identification information recording step 170.

In the medium identification information recording step 170, the disc identification information is recorded in the optical disc having the main information and the first sub information transferred therein from a stamper in the duplication step 150 and the second sub information recorded therein in the second sub information recording step 160. The medium identification information recording step 170 is constituted of processes to be performed by a medium identification information recorder 125.

The medium identification information recorder 125 performs barcode modulation with respect to the disc identification information used by the second sub information generator 123 in the second sub information generating step 160, as well as the second sub information. The medium identification information recorder 125 records the disc identification information by removing the reflection film in the inner circumferential portion of the optical disc in the form of a radially extending barcode by irradiation of the optical disc with e.g. high-output YaG laser light depending on the barcode-modulated disc identification information. Thus, the medium identification information recorder 125 in the medium identification information recording step 170, and the second sub information recorder 124 in the second sub information recording step 160 are constituted of a same BCA recording device. The second sub information recording step 160 and the medium identification information recording step 170 may be performed simultaneously.

In the above arrangement, a stamper having the main information and the first sub information recorded therein by concave-convex recording marks is manufactured in the mastering step 140; plural optical discs are manufactured based on the stamper in the duplication step 150; and the optical disc having the second sub information and the disc identification information recorded therein in the inner circumferential portion of each of the optical discs, as barcode marks, are manufactured in the second sub information recording step 160 and the medium identification information recording step 170.

Further, the first sub information is generated based on the stamper unique information common for each of the stampers, and the encryption key information for encrypting the content information; and the second sub information is generated based on the disc identification information and the stamper unique information. Thus, it is necessary to reproduce the disc identification information and the second sub information that differs for each of the information recording media, extract the stamper unique information from the second sub information, and extract the encryption key of content information based on the first sub information and the extracted stamper unique information in order to reproduce from the optical disc.

The above arrangement enables to manufacture an optical disc, in which the encryption key of content information is non-extractable without reading out the second information that differs for each of the information recording media. Thus, even if the second sub information is leaked from a certain optical disc, it is possible to prevent reproduction of content information from other optical discs based on the leaked second sub information, and further strengthen copyright protection of content information recorded in the optical discs.

Figure 9:
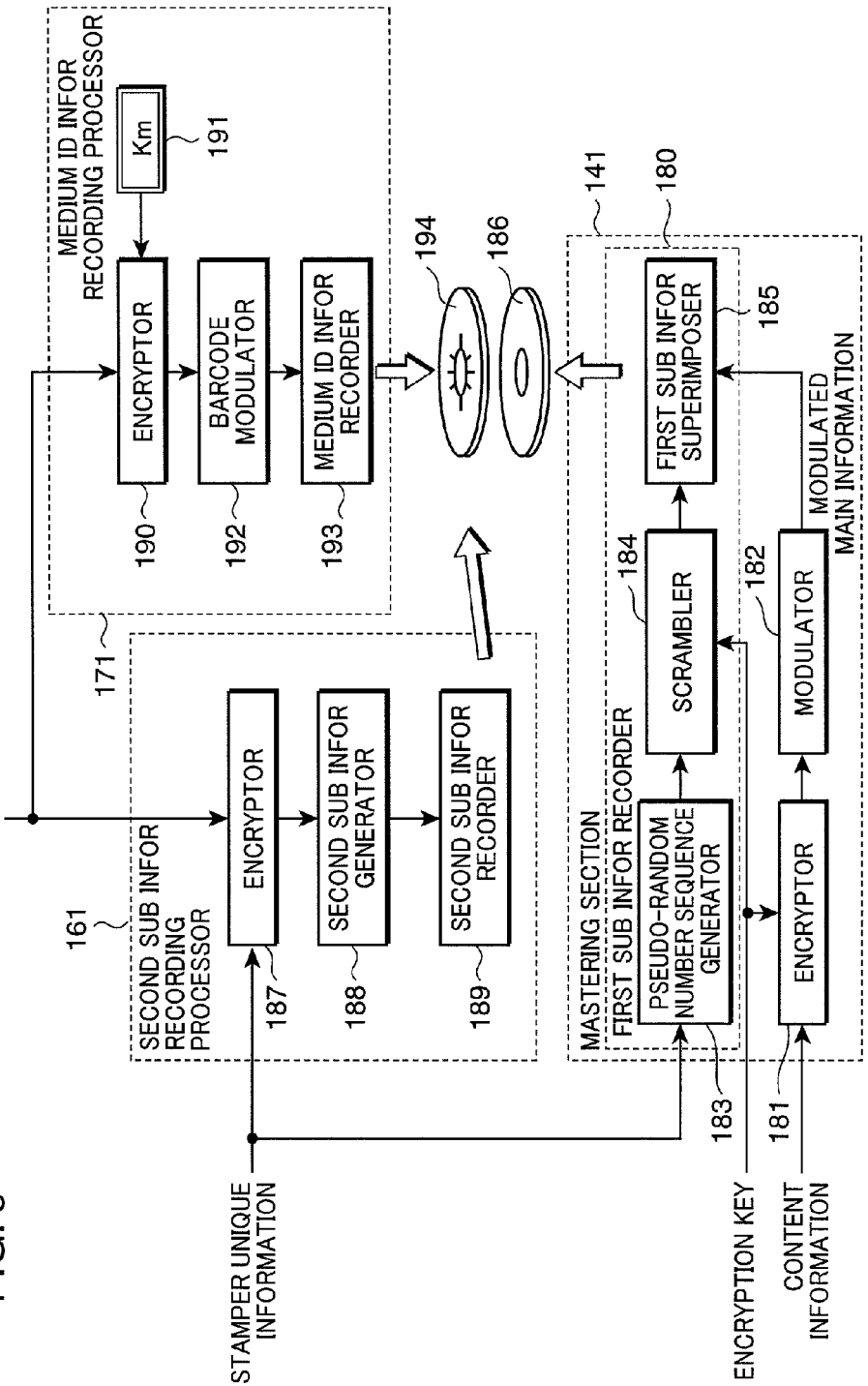
FIG. 9 is a block diagram showing a characteristic arrangement of a manufacturing device for manufacturing the information recording medium in the first embodiment of the invention.

FIG. 9 is a block diagram showing a characteristic arrangement of a manufacturing device for manufacturing the information recording medium in the first embodiment of the invention.

The manufacturing device for manufacturing the information recording medium is constituted of a mastering section 141, a second sub information recording processor 161, and a medium identification information recording processor 171 respectively corresponding to the mastering step 140, the second sub information recording step 160, and the medium identification information recording step 170 described referring to FIG. 8.

The mastering section 141 records the main information and the second sub information in a master optical disc. The mastering section 141 is constituted of an encryptor 181, a modulator 182, a pseudo-random number sequence generator 183, a scrambler 184, and a first sub information superimposer 185.

The encryptor 181 generates encrypted content information by encrypting the content information to be recorded in a master optical disc (stamper 186) by an encryption key necessary for reproducing the content information. The encryptor 181 outputs the generated encrypted content information to the modulator 182.

The modulator 182 modulates the encrypted content information to be inputted from the encryptor 181, depending on an optical disc to be recorded. The modulator 182 generates modulated main information by modulating the encrypted content information; and by assigning a synchronization code (frame sync) to each frame at each of a predetermined data amount of encrypted content information, assigning address information to each sector, and performing error correction coding for each ECC block. The modulator 182 outputs the generated modulated main information to the first sub information superimposer 185.

The pseudo-random number sequence generator 183 is constituted of a general shift register for generating M or Gold sequences. The pseudo-random number sequence generator 183 generates pseudo-random number sequences bit by bit by setting the stamper unique information as an initial value at a leading frame position at which the first sub information is recorded, and by shifting the shift register bit by bit on a frame-by-frame basis by which the first sub information is superimposed and recorded. The pseudo-random number sequence generator 183 outputs the generated pseudo-random number sequences to the scrambler 184. The expression "set as an initial value" means presetting a value (stamper unique information) in the shift register.

The stamper unique information common for each of the stampers is set in the pseudo-random number sequence generator 183 as an initial value, and pseudo-random number sequences are generated bit by bit on a frame-by-frame basis in an area where the first sub information is recorded.

The scrambler 184 scrambles an encryption key by using the pseudo-random number sequences generated bit by bit on a frame-by-frame basis in the area where the first sub information is recorded. The scrambler 184 outputs the scrambled encryption key to the first sub information superimposer 185, as the first sub information.

The first sub information superimposer 185 superimposes the first sub information on the modulated main information obtained by modifying the synchronization codes assigned to each frame of the modulated main information to be inputted from the modulator 182, depending on the bit value of the first sub information to be inputted from the scrambler 184. Specifically, as shown in FIG. 7B, in the case where the bit value of the first sub information to be recorded is set to "1" in the fourth frame, the eighth frame, the twelfth frame, the sixteenth frame, the twentieth frame, and the twenty-fourth frame in a sector where the first sub information is recorded, the synchronization code is modified into "SY8"; and in the case where the bit value is set to "0", the synchronization code is not modified. Thus, the first sub information superimposer 185 generates a recording signal for recording the modified main information superimposed with the first sub information. The first sub information superimposer 185 forms concave-convex recording marks on a master optical disc by irradiating the master optical disc with laser light depending on the generated recording signal, and records the main information and the first sub information.

The first sub information superimposer 185 records the first sub information of one bit in each of the fourth frame, the eighth frame, the twelfth frame, the sixteenth frame, the twentieth frame, and the twenty-fourth frame in each of the sectors in a specific ECC block where the first sub information is recoded. Accordingly, the first sub information of 96 bits can be recorded in the specific ECC block.

As described above, the mastering section 141 manufactures a master optical disc having recorded therein the content information as the main information, and the first sub information; and manufactures the stamper 186 by transferring the master optical disc onto a glass substrate. Further, the unillustrated duplication section manufactures plural optical discs from the stamper 186. Further, in the first embodiment, the first sub information is information obtained by scrambling an encryption key for encrypting the content information by pseudo-random number sequences generated by using the stamper unique information as an initial value.

The second sub information recording processor 161 is constituted of an encryptor 187, a second sub information generator 188, and a second sub information recorder 189.

The encryptor 187 encrypts the stamper unique information set as an initial value by the pseudo-random number sequence generator 183 in the mastering section 141 by using the disc identification information that differs for each of the optical discs as a key. The encrypted stamper unique information is outputted to the second sub information generator 188.

The second sub information generator 188 generates the second sub information by barcode-modulating the encrypted stamper unique information to be inputted from the encryptor 187. The second sub information generator 188 outputs the generated second sub information to the second sub information recorder 189. The second sub information in the first embodiment is generated by encrypting the stamper unique information common for each of the stampers, by using the disc identification information that differs for each of the optical discs. Accordingly, the second sub information is information that differs for each of the optical discs.

The second sub information recorder 189 records the second sub information by forming a radially extending barcode mark by e.g. YaG laser light irradiation in an inner circumferential portion of an optical disc 194, depending on the barcode-modulated second sub information.

The medium identification information recording processor 171 records the disc identification information that differs for each of the optical discs. The medium identification information recording processor 171 is constituted of an encryptor 190, a barcode modulator 192, and a medium identification information recorder 193.

The encryptor 190 encrypts the disc identification information used as an encryption key by the encryptor 187 in the second sub information recording processor 161, by an encryption key Km 191 secretly held in the encryptor 190. The encrypted disc identification information is outputted to the barcode modulator 192.

The barcode modulator 192 barcode-modulates the encrypted disc identification information. The barcode modulator 192 outputs the barcode-modulated encrypted disc identification information to the medium identification information recorder 193.

The medium identification information recorder 193 records the encrypted disc identification information in the inner circumferential portion of the optical disc 194 by forming a barcode mark by removal of the reflection film in the inner circumferential portion of the optical disc 194 in the form of a radially extending barcode, depending on the barcode-modulated encrypted disc identification information.

Thus, the medium identification information recorder 193 of the medium identification information recording processor 171 records the encrypted disc identification information as a barcode mark by the same process as the process to be performed by the second sub information recorder 189 of the second sub information recording processor 161. The second sub information recording processor 161 and the medium identification information recording processor 171 may be configured to be the same device, or the second sub information recording step to be performed by the second sub information recording processor 161, and the medium identification information recording step to be performed by the medium identification information recording processor 171 may be performed simultaneously.

In the above arrangement, the manufacturing device is capable of recording both of the second sub information and the disc identification information in the optical disc 194 manufactured by transferring the stamper 186 having the main information and the first sub information recorded therein.

The first sub information in the first embodiment is generated by scrambling the encryption key information necessary for reproduction of the content information and used in encrypting the content information, by pseudo-random number sequences generated by using the stamper unique information common for each of the stampers as an initial value.

Further, the second sub information in the first embodiment is recorded by encrypting the stamper unique information used in scrambling the first sub information by the disc identification information that differs for each of the optical discs.

Accordingly, at the time of reproduction, stamper unique information is generated by reproducing and decrypting the second sub information and the disc identification information that differs for each of the optical discs. Further, the first sub information is descrambled by the stamper unique information, and an encryption key for decrypting the encrypted content information is generated. Accordingly, even in an optical disc manufactured by transferring a same stamper, it is necessary to reproduce the second sub information that differs for each of the optical discs. Thus, even if the second sub information is leaked from a certain optical disc, it is impossible to reproduce from the other optical discs by using the leaked second sub information. The above arrangement enables to strengthen copyright protection of the content information to be recorded in the optical discs.

Figure 10:
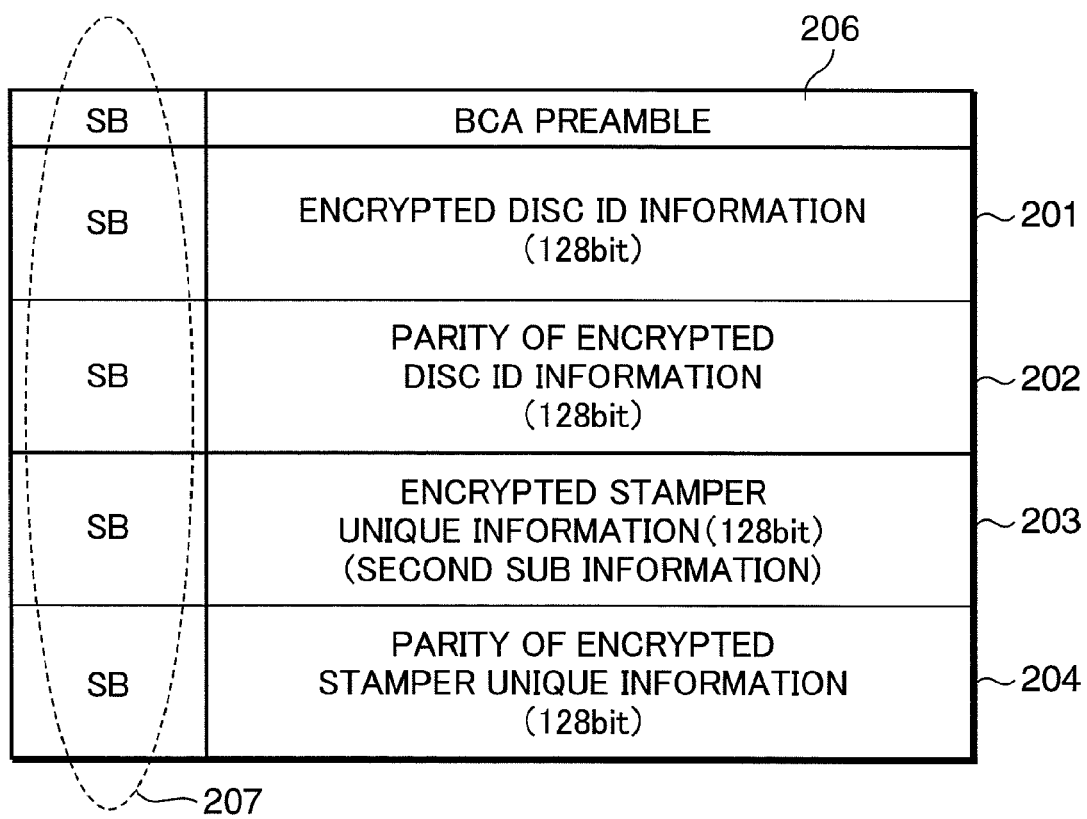
FIG. 10 is a diagram showing an example of a data format of second sub information and encrypted disc identification information to be recorded in an inner circumferential portion of an optical disc in the first embodiment of the invention.

FIG. 10 is a diagram showing an example of a data format of the second sub information and the encrypted disc identification information, which are recorded in the inner circumferential portion of the optical disc in the first embodiment of the invention.

The second sub information and the encrypted disc identification information, which are recorded in the inner circumferential portion of the optical disc, is barcode-modulated and recorded in a BCA as a radially extending barcode mark in the optical disc. A synchronization code SB 207 in the form of a barcode mark is recorded in a leading portion of each of data clusters. The BCA has recorded therein a BCA pre-amble 206 indicating that the data format includes the encrypted medium identification information and the second sub information, encrypted disc identification information 201, a parity 202 for error correction of the encrypted disc identification information, encrypted stamper unique information (=second sub information) 203, and a parity 204 of encrypted stamper unique information.

Figure 11:
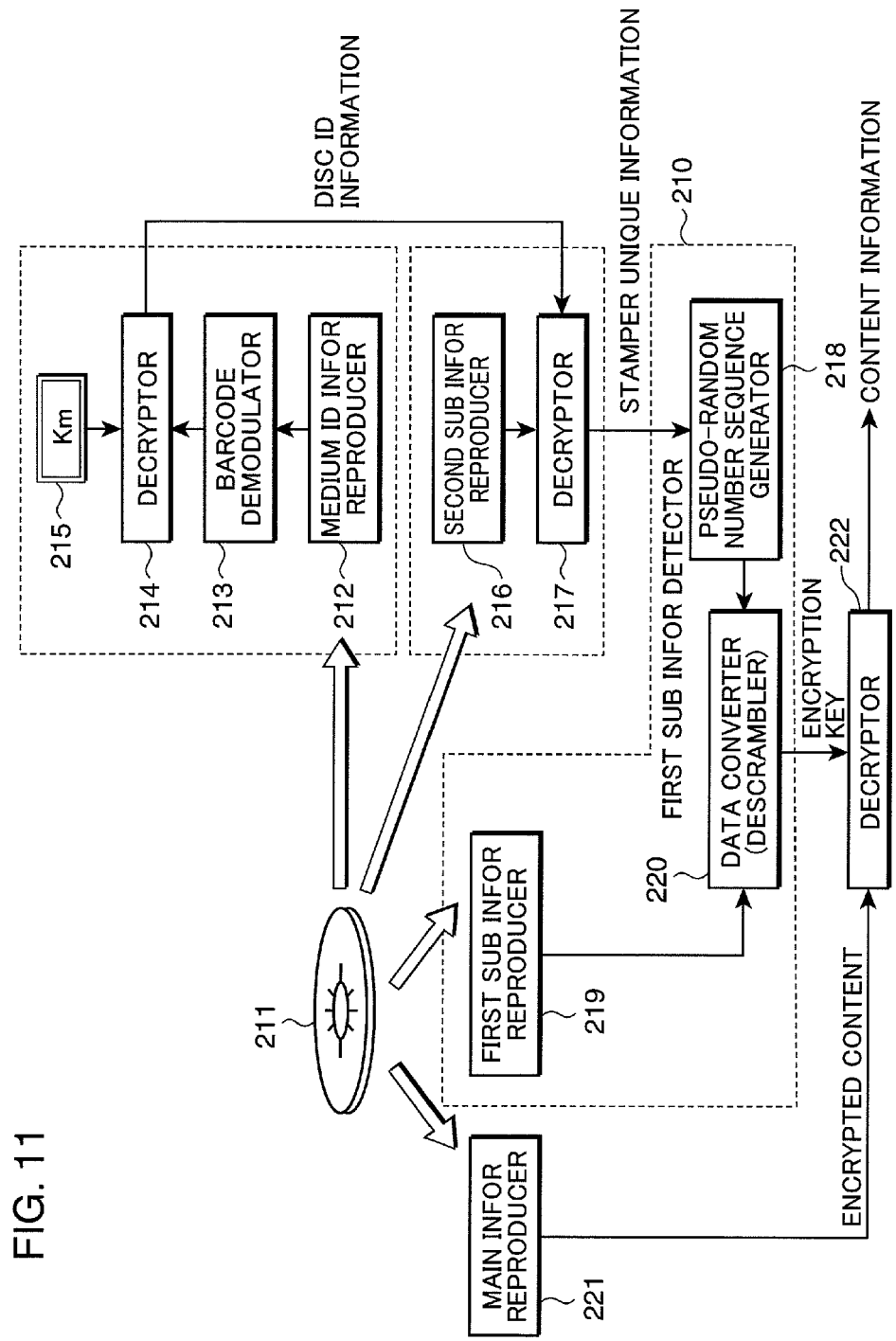
FIG. 11 is a block diagram showing a characteristic arrangement of an information reproducing device for reproducing content information from the optical disc manufactured by the manufacturing device shown in FIG. 9.

FIG. 11 is a block diagram showing a characteristic arrangement of an information reproducing device for reproducing content information from the optical disc manufactured by the manufacturing device shown in FIG. 9.

The information reproducing device reproduces the content information recorded in an optical disc 211 by reproducing the first sub information common for each of the stampers, and the second sub information that differs for each of the optical discs, from the optical disc 211 as an information recording medium. The information reproducing device is constituted of a medium identification information reproducer 212, a barcode demodulator 213, a decryptor 214, a second sub information reproducer 216, a decryptor 217, a pseudo-random number sequence generator 218, a first sub information reproducer 219, a data converter 220, a main information reproducer 221, and a decryptor 222.

The medium identification information reproducer 212 reads out the barcode information recorded in an inner circumferential portion of the optical disc 211, based on an intensity change of reflected light by laser irradiation, and outputs a signal indicating the laser intensity to the barcode demodulator 213.

The barcode demodulator 213 reads out the barcoded encrypted disc identification information, from the signal indicating the laser intensity as a readout signal of a barcode. The barcode demodulator 213 outputs the readout encrypted disc identification information to the decryptor 214.

The decryptor 214 is a section corresponding to the encryptor 190 shown in FIG. 9. The decryptor 214 extracts the disc identification information by decrypting the encrypted disc identification information by using an encryption key Km 215 secretly held in the decryptor 214. The decryptor 214 outputs the extracted disc identification information to the decryptor 217.

Similarly to the medium identification information reproducer 212, the second sub information reproducer 216 reads out, from the barcode information recorded in the inner circumferential portion of the optical disc 211, the barcoded second sub information. The second sub information reproducer 216 outputs the readout second sub information to the decryptor 217.

The decryptor 217 is a section corresponding to the encryptor 187 shown in FIG. 9. The decryptor 217 extracts the stamper unique information by decrypting the second sub information (encrypted stamper unique information) by using the disc identification information to be inputted from the decryptor 214 as a key. The decryptor 217 outputs the extracted stamper unique information to the pseudo-random number sequence generator 218.

The pseudo-random number sequence generator 218 has an arrangement substantially equivalent to the arrangement of the pseudo-random number sequence generator 183 shown in FIG. 9. The pseudo-random number sequence generator 218 generates pseudo-random number sequences bit by bit on a frame-by-frame basis in a specific ECC block from which the first sub information is reproduced, by presetting the stamper unique information to be inputted from the decryptor 217 as an initial value. The pseudo-random number sequence generator 218 outputs the generated pseudo-random number sequences to the data converter 220.

The first sub information reproducer 219 detects the concave-convex recording marks based on reflected light from the optical disc 211, by irradiating the optical disc 211 with laser light. The first sub information reproducer 219 detects the synchronization codes assigned to each frame at a predetermined interval of the concave-convex recording marks, and extracts frame addresses from the sector, based on the synchronization code pattern. The first sub information reproducer 219 detects the bit value "1", in the case where the synchronization code is modified into "SY8" in the fourth frame, the eighth frame, the twelfth frame, the sixteenth frame, the twentieth frame, and the twenty-fourth frame in the sector; and detects the bit value "0", in the case where the synchronization code is not modified; and extracts the detected bit value as the first sub information. The first sub information reproducer 219 outputs the extracted first sub information to the data converter 220.

The first sub information reproducer 219 reads out the first sub information from a specific ECC block, in the case where a readout command requesting readout of the first sub information from the specific ECC block is received from an unillustrated system controller.

The data converter (descrambler) 220 is a section corresponding to the scrambler 184 shown in FIG. 9. The data converter 220 descrambles the first sub information by obtaining an exclusive OR of the first sub information to be outputted bit by bit in each of the fourth frame, the eighth frame, the twelfth frame, the sixteenth frame, the twentieth frame, and the twenty-fourth frame in a specific ECC block from which the first sub information is reproduced, and the pseudo-random number sequences to be outputted bit by bit on a frame-by-frame basis. Then, the data converter 220 performs data conversion of the first sub information, and extracts the encryption key. The data converter 220 outputs the extracted encryption key to the decryptor 222.

The main information reproducer 221 reproduces the encrypted content information recorded as the main information, by irradiating the optical disc 211 with laser light and detecting the concave-convex recording marks from the reflected light. The main information reproducer 221 outputs the reproduced encrypted content information to the decryptor 222.

The decryptor 222 is a section corresponding to the encryptor 181 shown in FIG. 9. The decryptor 222 reproduces the content information by decrypting the encrypted content information reproduced by the main information reproducer 221 by using an encryption key.

In the above arrangement, the information reproducing device generates stamper unique information common for each of the stampers by reproducing the second sub information and the disc identification information that differs for each of the optical discs. Then, the information reproducing device reproduces the content information by generating an encryption key for decrypting the encrypted content information, based on the first sub information and the stamper unique information common for each of the stampers. In this arrangement, it is impossible for a malicious information reproducing device manufacturer to erase any of the constituent elements of the information reproducing device. Thus, the above arrangement forces an information reproducing device manufacturer to manufacture an information reproducing device designed to reproduce only from a legitimate optical disc having the first sub information and the second sub information recorded therein, and excludes a malicious information reproducing device manufacturer.

Further, even if the second sub information is leaked from a certain optical disc, it is impossible to reproduce the content information of the other optical discs by utilizing the leaked second sub information. Accordingly, it is possible to strengthen copyright protection of content information recorded in the optical discs of the first embodiment.

Figure 12:
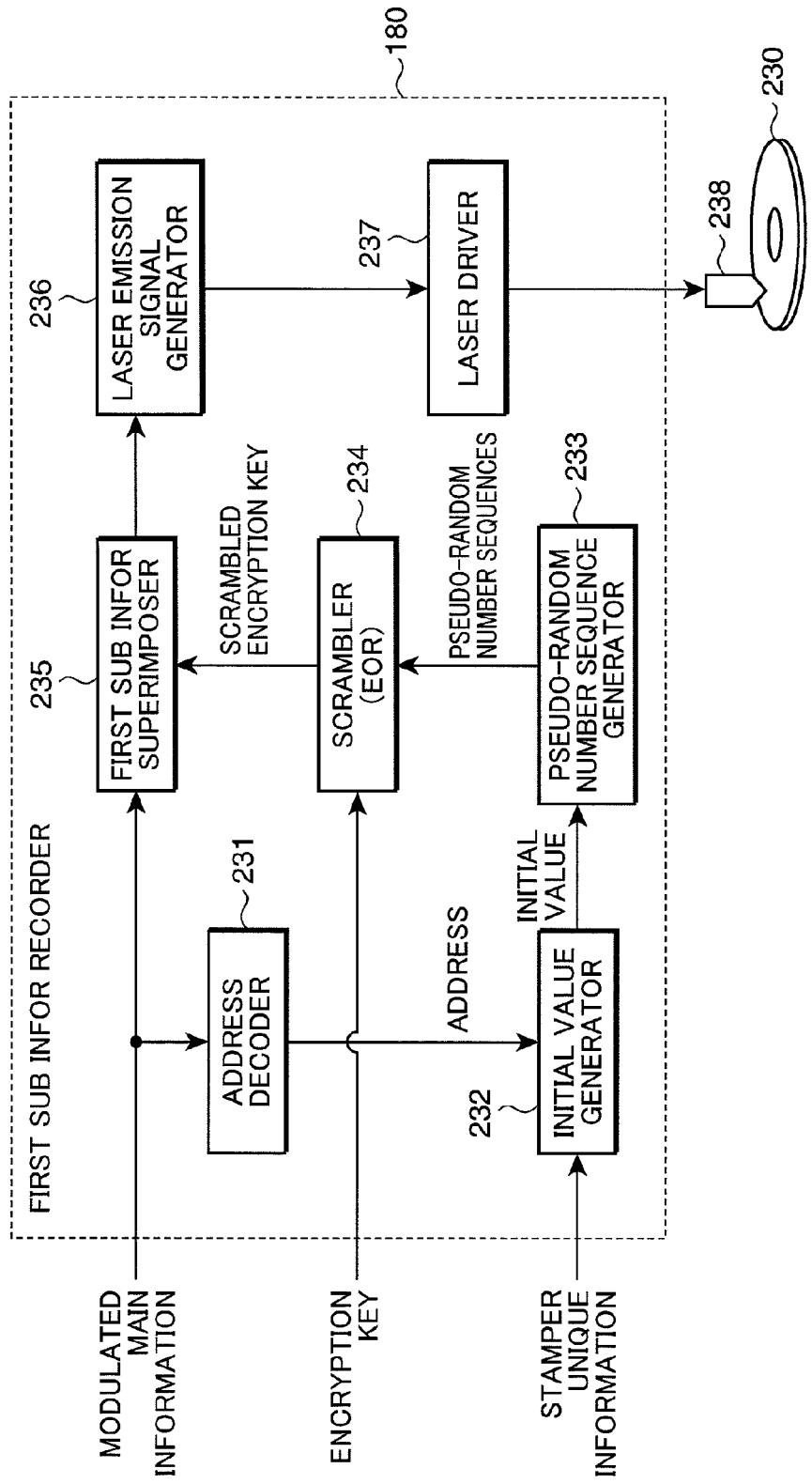
FIG. 12 is a block diagram showing a detailed arrangement of a first sub information recorder shown in FIG. 9.

FIG. 12 is a block diagram showing a characteristic arrangement of the first sub information recorder in the first embodiment of the invention.

FIG. 12 is a block diagram showing a detailed arrangement of the first sub information recorder 180 shown in FIG. 9. The first sub information recorder 180 records the main information and the first sub information in a master optical disc 230 by the mastering section 141. The first sub information recorder 180 is constituted of an address decoder 231, an initial value generator 232, a pseudo-random number sequence generator 233, a scrambler 234, a first sub information superimposer 235, a laser emission signal generator 236, a laser driver 237, and an optical head 238.

The address decoder 231 extracts address information by temporarily demodulating the inputted modulated main information, and outputs the extracted address information to the initial value generator 232. The modulated main information is information obtained by modulating an information recording medium having e.g. content information recorded therein; and assigning synchronization codes (frame syncs) to each frame, assigning address information to each sector, and performing error correction coding for each ECC block.

The initial value generator 232 generates initial value information to be preset in a pseudo-random number sequence generation shift register in a pseudo-random number sequence generator 233, based on the inputted stamper unique information and address information. In the first embodiment, the initial value generator 232 is constituted of an exclusive OR computer. Accordingly, the initial value generator 232 generates a computation result of the exclusive OR of the inputted stamper unique information and address information, as an initial value, and outputs the generated initial value to the pseudo-random number sequence generator 233. Further, the initial value generator 232 updates the initial value information with respect to each of the sectors, in other words, each time the address is updated; and outputs the updated initial value to the pseudo-random number sequence generator 233.

The pseudo-random number sequence generator 233 is constituted of a general shift register for generating M or Gold sequences. The pseudo-random number sequence generator 233 determines the area where the first sub information is recorded, based on the address information, and presets the inputted initial value information each time the inputted initial value is updated, in other words, on a sector-by-sector basis. Then, the pseudo-random number sequence generator 233 generates pseudo-random number sequences bit by bit in units of frames of the modulated main information. The pseudo-random number sequence generator 233 outputs the generated pseudo-random number sequences to the scrambler 234.

The scrambler 234 scrambles an inputted encryption key by the pseudo-random number sequences to be inputted from the pseudo-random number sequence generator 233. The scrambler 234 is constituted of an exclusive OR computer. Upon receiving an encryption key, the scrambler 234 calculates an exclusive OR of the bit-by-bit encryption key information of synchronization codes in the fourth frame, the eighth frame, the twelfth frame, the sixteenth frame, the twentieth frame, and the twenty-fourth frame in an area where the first sub information is recorded, and the pseudo-random number sequences to be updated on a frame-by-frame basis, whereby a scrambled encryption key is generated. The scrambler 234 outputs the generated scrambled encryption key to the first sub information superimposer 235.

The first sub information superimposer 235 superimposes the first sub information on the modulated main information by modifying the synchronization code pattern assigned to the inputted modulated main information, depending on the bit value of the scrambled encryption key to be inputted from the scrambler 234. Specifically, the first sub information superimposer 235 replaces the synchronization code assigned to the modulated main information with "SY8" at a timing of the fourth frame, the eighth frame, the twelfth frame, the sixteenth frame, the twentieth frame, and the twenty-fourth frame of the modulated main information, only in the case where the bit value of the scrambled encryption key is set to "1". As a result of the above operation, in the case where the information recording medium is a DVD-ROM, 6-bits scrambled encryption key information for each sector, or 96-bits scrambled encryption key information for each ECC block is recorded as the first sub information by modifying the synchronization code of the modulated main information.

The laser emission signal generator 236 generates a laser emission signal indicating a timing of irradiating the master optical disc 230 with laser light in accordance with the modulated main information whose synchronization code is modified by superimposing the first sub information. The laser emission signal generator 236 outputs the generated laser emission signal to the laser driver 237.

The laser driver 237 controls laser emission by outputting an electric current in accordance with an intensity of laser light to be applied onto the master optical disc 230 from a laser light source in the optical head 238, based on the laser emission signal to be inputted from the laser emission signal generator 236.

The optical head 238 is loaded with the laser light source and an optical lens, and records the main information and the first sub information by collecting the emitted laser light on the master optical disc 230 and forming concave-convex recording marks on the master optical disc 230.

In the above arrangement, the first sub information recorder 180 is operable to record the first sub information by scrambling an encryption key necessary for reproducing the content information by the pseudo-random number sequences generated by setting an initial value generated based on the stamper unique information common for each of the stampers; and by modifying a synchronization code pattern of the modulated main information.

In the foregoing, the scrambler 234 in the first sub information recorder 180 scrambles data by using an exclusive OR. The invention is not limited to the above. For instance, it is possible to use a scrambling method, wherein plural exclusive ORs are combined with each other. It is difficult to easily analogize an encryption key which is scrambled by the scrambler 234. Further, as far as least the stamper unique information is known at the time of reproduction, any scrambling method capable of inversely transforming an encryption key based on a scrambled encryption key is applicable. Selection of a scrambling method is a design matter.

Figure 13:
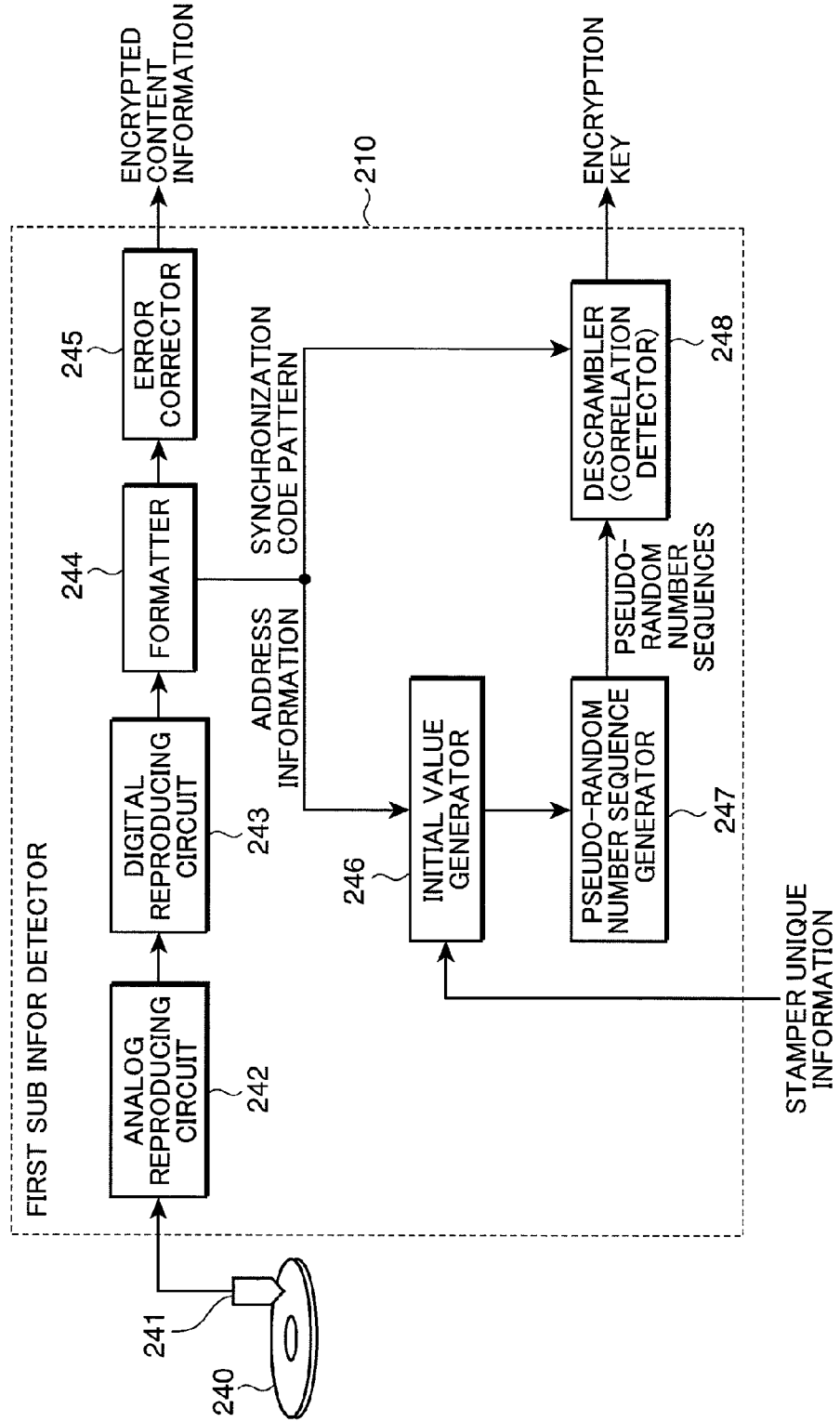
FIG. 13 is a block diagram showing a detailed arrangement of a first sub information detector shown in FIG. 11.

FIG. 13 is a block diagram showing a characteristic arrangement of a first sub information detector 210 for detecting the first sub information in the first embodiment of the invention. FIG. 13 is a block diagram showing a detailed arrangement of the sub information detector 210 shown in FIG. 11.

The first sub information detector 210 detects encrypted content information recorded as the main information, and the encryption key recorded as the first sub information, based on the concave-convex recording marks in an optical disc 240. The first sub information detector 210 is constituted of an optical head 241, an analog reproducing circuit 242, a digital reproducing circuit 243, a formatter 244, an error corrector 245, an initial value generator 246, a pseudo-random number sequence generator 247, and a descrambler 248.

The optical head 241 has a laser light source for emitting laser light having a reproduction intensity, a collecting lens for collecting laser light onto a reflection film of the optical disc 240, and a plurality of detectors for detecting an intensity of reflected light from the reflection film of the optical disc 240.

The analog reproducing circuit 242 generates an analog reproduction signal indicating a component of concave-convex recording marks, based on the reflected light intensity detected by the detectors. The analog reproducing circuit 242 outputs the generated analog reproduction signal to the digital reproducing circuit 243.

The digital reproducing circuit 243 generates a digital reproduction signal by AD (analog-to-digital) conversion of the analog reproduction signal to be inputted from the analog reproducing circuit 242. Further, the digital reproducing circuit 243 amplifies the generated digital reproduction signal, and performs waveform equalization with respect to the generated digital reproduction signal; and generates a clock signal synchronous with the recording band of the concave-convex recording marks by a PLL (Phase-Locked-Loop) circuit. The digital reproducing circuit 243 outputs the generated digital reproduction signal and clock signal to the formatter 244.

The formatter 244 is constituted of a digital circuit to be operated by the clock signal generated in the PLL circuit. The formatter 244 makes synchronization on a frame-by-frame basis by detecting a synchronization code pattern based on a digital reproduction signal, makes synchronization on a sector-by-sector basis by detecting a frame address based on the order of a series of synchronization codes in a synchronization code pattern, and makes synchronization on an ECC block-by-ECC block basis, based on address information assigned to each sector. The formatter 244 outputs a synchronized digital reproduction signal to the error corrector 245.

Further, the formatter 244 extracts the address information assigned to each sector to output the extracted address information to the initial value generator 246, and extracts the synchronization code pattern assigned to each frame to output the extracted synchronization code pattern to the descrambler 248.

The error corrector 245 performs error detection and error correction of the digital reproduction signal by using a parity bit assigned to each ECC block of the digital reproduction signal to be inputted from the formatter 244, and reproduces the encrypted content information in the unit of 16 KB (kilobytes) with respect to each of the ECC blocks.

The initial value generator 246 has a function substantially equivalent to the function of the initial value generator 232 in the first sub information recorder 180. The initial value generator 246 generates initial value information by calculating an exclusive OR of the stamper unique information reproduced based on the second sub information, and the address information. The initial value generator 246 outputs the generated initial value information to the pseudo-random number sequence generator 247.

The pseudo-random number sequence generator 247 has an arrangement substantially equivalent to the arrangement of the pseudo-random number sequence generator 233 in the first sub information recorder 180. The pseudo-random number sequence generator 247 generates pseudo-random number sequences bit by bit on a frame-by-frame basis by presetting the initial value to be inputted from the initial value generator 246 at a leading position of a sector in the area from which the first sub information is detected. The pseudo-random number sequence generator 247 outputs the generated pseudo-random number sequences to the descrambler 248.

The descrambler 248 is a section corresponding to the scrambler 234 in the first sub information recorder 180. The descrambler 248 descrambles the scrambled encryption key, based on the synchronization code pattern to be inputted from the formatter 244 and assigned to each frame, and the pseudo-random number sequences to be generated bit by bit on a frame-by-frame basis.

The descrambler 248 determines whether the synchronization codes in the fourth frame, the eighth frame, the twelfth frame, the sixteenth frame, the twentieth frame, and the twenty-fourth frame are replaced by "SY8" in the area from which the first sub information is detected. In the case where the synchronization codes are replaced, the descrambler 248 detects "1" as the bit value of the first sub information; and in the case where the synchronization codes are not replaced, the descrambler 248 detects "0" as the bit value of the first sub information. Then, the descrambler 248 descrambles the encryption key based on the first sub information, by calculating an exclusive OR of the detected bit value of the first sub information, and the bit value of the pseudo-random number sequences to be inputted from the pseudo-random number sequence generator 247 and updated on a frame-by-frame basis.

In the first embodiment, 96-bits first sub information is recorded in one ECC block, and a 96-bits encryption key can be detected by reproducing from the ECC block recorded with the first sub information.

In the above arrangement, it is possible to reproduce the main information and the first sub information, based on the concave-convex recording marks recorded in the optical disc 240. Further, the first sub information in the first embodiment is recorded with an out-of-order synchronization code "SY8" by modifying a synchronization code assigned to each frame of the main information. The first sub information detector 210 detects the first sub information, based on the synchronization code pattern assigned to each frame.

In the foregoing, the descrambler 248 in the first sub information detector 210 descrambles data by using an exclusive OR. The invention is not limited to the above. For instance, it is possible to use a descrambling method, wherein plural exclusive ORs are combined with each other. An object of the descrambler 248 is to perform inverse transformation with respect to the scrambler 234 in the first sub information recorder 180 shown in FIG. 12. Selection of a scrambling method and a descrambling method is a design matter.

Second Embodiment

Figure 14:
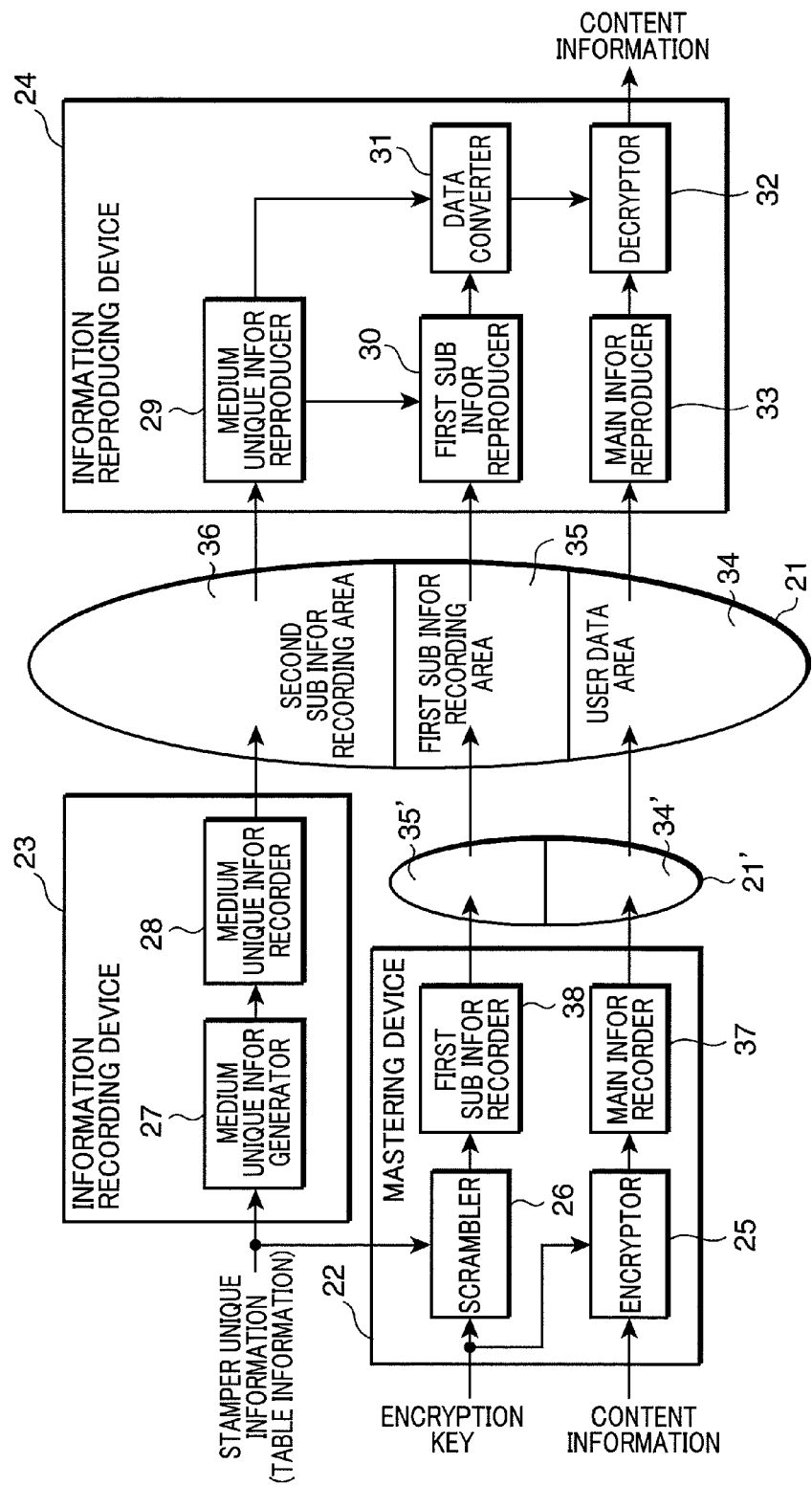
FIG. 14 is a block diagram showing an arrangement of an information recording and reproducing system in a second embodiment of the invention.

FIG. 14 is a block diagram showing an arrangement of an information recording and reproducing system according to a second embodiment of the invention.

The information recording and reproducing system according to the second embodiment is constituted by a mastering device 22 for producing a stamper (master optical disc) 21' of optical discs that are information recording media, an information recording device 23 for recording second sub information on an optical disc 21 manufactured by copying the stamper 21', and an information reproducing device 24 for reproducing information from an optical disc 21.

Although the information recording and reproducing system according to the second embodiment includes a duplication device for manufacturing optical discs 21 by copying the stamper 21' manufactured by the mastering device 22, the duplication device is not shown in FIG. 14.

The mastering device 22 records main information that includes encrypted content information and first sub information that is common for each stamper, on the stamper 21'. The mastering device 22 is constituted by an encryptor 25, a scrambler 26, a main information recorder 37, and a first sub information recorder 38.

The encryptor 25 encrypts content information to be recorded on the stamper 21' with an encryption key and generates the encrypted content information as main information. The main information recorder 37 records the main information by irradiating a master optical disc with laser light based on the generated main information and forming concave-convex recording marks on the master optical disc.

The scrambler 26 data-converts encryption key information based on stamper unique information that is common for each stamper. The scrambler 26 according to the second embodiment generates a scrambled encryption key as first sub information, the scrambled encryption key having been obtained by calculating an exclusive OR of an encryption key and pseudo-random number sequences that are generated by presetting, in a pseudo-random number sequence generator, initial value information included in the stamper unique information at a location indicated by address information included in the stamper unique information.

The first sub information recorder 38 records the first sub information generated by the scrambler 26 in a first sub information recording area 35 'of the stamper 21'.

The "address information" as used herein refers to address information assigned to each sector of the main information. The pseudo-random number sequences are generated by presetting, in the pseudo-random number sequence generator, the initial value information included in the stamper unique information at the leading position of a sector where address information indicating where the main information is recorded matches the address information included in the stamper unique information.

The stamper unique information according to the second embodiment includes multiple pieces of address information and multiple pieces of initial value information that correspond to the multiple pieces of address information. The scrambler 26 converts the encryption key into scrambled data, using the pseudo-random number sequences generated by presetting corresponding pieces of initial value information at the locations indicated by the plural pieces of address information. Note that the conversion into scrambled data according to the second embodiment is an exclusive OR operation. Accordingly, encryption keys scrambled at the address locations included in the stamper unique information on the stamper 21' with unique pseudo-random number sequences are recorded multiple times with redundancy.

Note that the first sub information recording method according to the second embodiment is a recording method in which a synchronization code pattern assigned to each frame of main information is modified as in the first sub information recording method described in the first embodiment, and a detailed description thereof is omitted in the second embodiment.

The information recording device 23 records second sub information that differs for each optical disc on each of multiple optical discs 21 manufactured by copying the stamper 21' manufactured by the mastering device 22. The information recording device 23 is constituted by a medium unique information generator 27 and a medium unique information recorder 28.

The medium unique information generator 27 randomly selects at least one combination of address information and initial value information for each optical disc, from the stamper unique information that is common for each stamper and includes plural pieces of address information and plural pieces of initial value information. This random selection method can be implemented by providing a random number generator inside the medium unique information generator 27 and making selection according to a random number value. The medium unique information generator 27 generates the randomly selected combination of address information and initial value information as the second sub information that can differ for each information recording medium. The medium unique information generator 27 outputs the generated second sub information to the medium unique information recorder 28.

The medium unique information recorder 28 is similar in arrangement to the medium unique information recorder 10 in FIG. 1. The medium unique information recorder 28 modulates the second sub information input from the medium unique information generator 27 into a barcode. The medium unique information recorder 28 forms a radially extending barcode mark by removing a reflection film in the inner circumferential portion of the optical disc 21 with YaG laser light and records the second sub information therein. Note that the processing performed by the medium unique information recorder 28 is identical to that performed by the medium unique information recorder 10 in FIG. 1 and therefore a detailed description thereof is omitted.

The information reproducing device 24 reproduces, from the optical disc 21, the main information recorded using the concave-convex recording marks, the first sub information recorded using the concave-convex recording marks, and the second sub information recorded using the barcode marks in the inner circumferential portion of the optical disc 21. The information reproducing device 24 is constituted by a medium unique information reproducer 29, a first sub information reproducer 30, a data converter 31, a decryptor 32, and a main information reproducer 33.

The medium unique information reproducer 29 is similar in arrangement to the medium unique information reproducer 14 in FIG. 1. The medium unique information reproducer 29 reproduces a combination of address information and initial value information as second sub information from a barcode mark recorded in the inner circumferential portion of the optical disc 21. The reproduced address information is output to the first sub information reproducer 30, and the reproduced initial value information is output to the data converter 31.

The first sub information reproducer 30 accesses an optical disc 21 in accordance with the address information input from the medium unique information reproducer 29 and reproduces first sub information indicating whether or not the synchronization code pattern assigned on a frame-by-frame basis has been modified. The first sub information reproducer 30 outputs the reproduced first sub information to the data converter 31.

The data converter 31 includes a pseudo-random number sequence generator similar to that of the scrambler 26 in the mastering device 22. The data converter 31 performs an inverse conversion of the data conversion performed by the scrambler 26 by calculating an exclusive OR of the first sub information input from the first sub information reproducer 30 and pseudo-random number sequences generated by presetting the initial value reproduced by the medium unique information reproducer 29. Thus, the data converter 31 descrambles the first sub information and reproduces the encryption key that has been used to encrypt the content information. The data converter 31 outputs the reproduced encryption key to the decryptor 32.

The main information reproducer 33 reproduces main information (encrypted content information) by reproducing the concave-convex recording marks recorded in a user data area 34 of an optical disc 21. The main information reproducer 33 irradiates the optical disc 21 with laser light and reads out the main information recorded as the concave-convex recording marks based on the intensity of reflected light from the optical disc 21.

The decryptor 32 decrypts the main information reproduced by the main information reproducer 33 with the encryption key extracted by the data converter 31. The decryptor 32 is a section corresponding to the encryptor 25 in the mastering device 22.

With the arrangement described above, the mastering device 22 records the main information and the first sub information that are common for each stamper on the stamper 21', and the information recording device 23 records the second sub information that differs for each optical disc manufactured by transfer and copying from the stamper 21' on optical discs. Meanwhile, the information reproducing device reads out address information and initial value information that differ for each optical disc as the second sub information, descrambles the first sub information with pseudo-random number sequences generated by presetting the initial value information at address locations indicated by the address information, and extracts an encryption key that is information necessary for reproducing content information.

Accordingly, on each optical disc 21, the same encryption key as other optical discs is scrambled at multiple address locations indicated by the stamper unique information with different pseudo-random number sequences depending on initial values corresponding to the multiple address locations, and recorded with redundancy at the multiple address locations. The second sub information is at least one combination of address information and an initial value, which has been randomly selected for each optical disc from among multiple combinations of address information and an initial value included in the stamper unique information. The information reproducing device 24 is thus capable of reproducing encryption key information, using a different address location for each optical disc even though optical discs are manufactured by copying a scrambled encryption key that has been recorded with redundancy from the same stamper.

In the second embodiment, different second sub information is recorded on each optical disc, which enables the location from which an encryption key is read out to vary, even with the use of the same stamper. This increases the degree of difficulty of attack from malicious parties who attempt to hack encrypted content information through analysis of the recording location of an encryption key, thereby enhancing copyright protection of copyrighted works recorded on optical discs.

The second embodiment is more advantageous than the method described in the first embodiment in that the location from which the first sub information is read can be set uniquely for each medium. However, in cases where the second sub information has leaked out from one optical disc, the contents of other optical discs that have been manufactured from the same stamper with the same stamper unique information can be reproduced using the leaked second sub information. Thus, considering the case of a possible leakage of the second sub information, the method described in the first embodiment is more advantageous.

FIG. 15 is a conceptual diagram showing an example of the data format of the stamper unique information according to the second embodiment of the invention.

The stamper unique information is table-type information that includes multiple combinations of address information and initial value information. The stamper unique information according to the second embodiment includes 3 rows by 4 columns, i.e., 12 different combinations of address information and initial value information in total. Each combination includes a recording start address of the first sub information, a recording end address of the first sub information, and initial value information for generating pseudo-random number sequences used to scramble an encryption key.

The scrambler 26 in the mastering device 22 according to the second embodiment scrambles an encryption key at the leading positions of the 12 recording start addresses indicated by the stamper unique information, using pseudo-random number sequences generated by presetting the initial value information corresponding to the recording start addresses in the pseudo-random number sequence generator. Then, the first sub information recorder 38 records the scrambled encryption key as the first sub information. In the present example, in the address range of "0x00100000" to "0x00200000", the encryption key is scrambled using pseudo-random number sequences generated by presetting the initial value "0x1111". In this way, the differently scrambled encryption keys are recorded with redundancy as the first sub information in the 12 different areas.

The second sub information according to the second embodiment represents at least one combination of address information and initial value information that is randomly selected for each optical disc from the stamper unique information. In the second embodiment, there are cases where not all combinations of address information and initial value information included in the stamper unique information are recorded on an optical disc and cases where all combinations of address information and initial value information included in stamper unique information are recorded on an optical disc.

Specifically, in the case where not all combinations of address information and initial value information included in the stamper unique information are recorded on an optical disc, the medium unique information generator 27 generates, as the second sub information, a single set of the recording start address (e.g., "0x00600000"), the recording end address (e.g., "0x00700000"), and the initial value (e.g., "0x6666") that is randomly selected from among all the 12 combinations of address information and initial value information included in the stamper unique information.

On the other hand, in the case where all combinations of address information and initial value information included in the stamper unique information are recorded on an optical disc, the medium unique information generator 27 generates, as the second sub information, pointer information (e.g., (2)-(*b*)) that indicates the location of one combination of address information and initial value information in the stamper unique information that is randomly selected for each medium from the stamper unique information. For instance, in the case where the combination of the recording start address of "0x00600000", the recording end address of "0x00700000", and the initial value of "0x6666" is selected, pointer information ((2)-(*b*) in FIG. 15) corresponding to the selected combination is generated as the second sub information.

In this case, the mastering device 22 encrypts the table information as the stamper unique information and records the encrypted table information in the user data area where the main information is recorded. The information reproducing device reproduces not only the table information as the stamper unique information from the user data area but also the pointer information from the second sub information, to thereby extract the address location from which the first sub information is reproduced and the initial value of the pseudo-random number sequences that is used to descramble the first sub information. This enables the information reproducing device to reproduce the first sub information from an address location unique to each medium.

In the case where the table information is not recorded on an optical disc, although the amount of first sub information increases, there is the advantage that it is unnecessary to record the table information that is the stamper unique information as the main information. On the other hand, in the case where the table information is recorded on an optical disc, the amount of first sub information can be reduced although the user data area is used to record the stamper unique information. Whether or not to record the table information on an optical disc is to be determined depending the amounts of main information and first sub information and the speeds required to access the main information and the first sub information.

Figure 16:
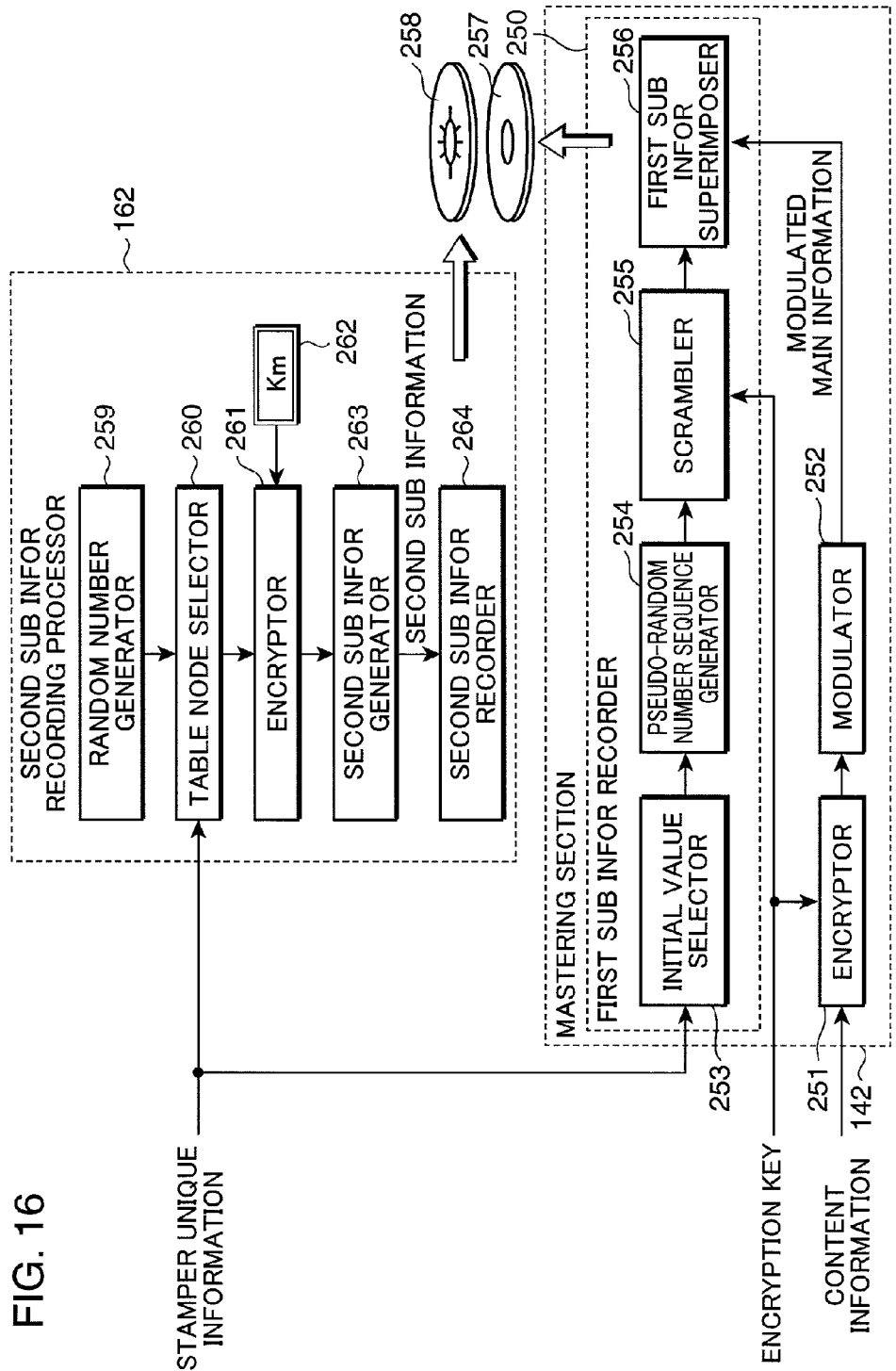
FIG. 16 is a block diagram showing a characteristic arrangement of a manufacturing device for manufacturing an information recording medium in the second embodiment of the invention.

FIG. 16 is a block diagram showing a characteristic arrangement of a manufacturing device for manufacturing information recording media according to the second embodiment of the invention.

The manufacturing device is constituted by a mastering section 142 for recording main information and first sub information on a master optical disc to produce a stamper 257, and a second sub information recording processor 162 for recording second sub information that differs for each optical disc on an optical disc 258 manufactured by transfer and copying from the stamper 257. Note that, unlike the manufacturing device of the first embodiment shown in FIG. 9, the manufacturing device according to the second embodiment does not necessarily require the medium identification information recording processor 171. Thus, in the second embodiment, a description has been given assuming that the medium identification information recording processor 171 is not included.

The mastering section 142 in the manufacturing device according to the second embodiment is constituted by an encryptor 251, a modulator 252, an initial value selector 253, a pseudo-random number sequence generator 254, a scrambler 255, and a first sub information superimposer 256.

The encryptor 251 encrypts content information to be recorded on a master optical disc (stamper 257) with an encryption key so as to generate encrypted content information.

The modulator 252 modulates the encrypted content information into a modulation format depending on an information recording medium used for recording. The modulator 252 also generates modulated main information by assigning a synchronization code to each frame containing a certain amount of modulated encrypted content information, assigning address information to each sector consisting of multiple frames, and performing error correction coding on each ECC block consisting of multiple sectors. The modulator 252 outputs the generated modulated main information to the first sub information superimposer 256.

In the second embodiment, a description has been given of the case where information recording media are DVD-ROMs. Specifically, the modulator 252 performs 8-16 modulation in which 8-bit main information is converted into 16-channel bit modulated main information. The modulator 252 also assigns the first 32 channel bits of every 1488 channel bits as a synchronization code. Each sector consists of 26 frames and is assigned with address information, and modulated main information is generated by performing error correction coding on 16-KB (kilo byte) ECC blocks.

The initial value selector 253 selects initial value information for generating pseudo-random number sequences corresponding to an address where the first sub information is recorded, based on the address information assigned to each sector of the main information to be recorded and the stamper unique information used to record the first sub information. The initial value selector 253 outputs the selected initial value information to the pseudo-random number sequence generator 254.

Specifically, in the example of FIG. 15, if the address of main information to be recorded is in the range of "0x00100000" to "0x00200000", the initial value "0x1111" described in (1)-(a) in FIG. 15 is output to the pseudo-random number sequence generator 254. If the address of main information to be recorded is in the range of "0x00200000" to "0x00300000", the initial value "0x2222" described in (1)-(b) is selected. Similarly thereafter, the initial value selector 253 selects initial value information unique to each of the 12 different address ranges included in the stamper unique information and outputs the selected initial value information to the pseudo-random number sequence generator 254.

Note that the initial value selector 253 may output any initial value for the address range of main information that is not included in the stamper unique information. Alternatively, the initial value selector 253 may generate a pseudo-random number sequence generation interrupt signal for interrupting the generation of pseudo-random number sequences and output the generated signal to the pseudo-random number sequence generator 254, so as to interrupt the generation of pseudo-random number sequences.

The pseudo-random number sequence generator 254 includes a general shift register that generates M- or Gold sequences. The pseudo-random number sequence generator 254 presets the initial value information selected by the initial value selector 253 at the leading position of a sector in the shift register sector, and generates pseudo-random number sequences. The pseudo-random number sequence generator 254 also shifts the shift register in the timing of each frame of the main information and updates the value of the pseudo-random number sequences to be output, so as to generate a 1-bit pseudo-random number sequences for each frame. The pseudo-random number sequence generator 254 outputs the generated pseudo-random number sequences to the scrambler 255.

The scrambler 255 scrambles an encryption key by calculating an exclusive OR of the pseudo-random number sequences that is input one bit for each frame and the encryption key that is input one bit for each of the fourth frame, the eighth frame, the twelfth frame, the sixteenth frame, the twentieth frame, and the twenty-fourth frame in the area where the first sub information is recorded, so as to generate the first sub information.

Accordingly, in the second embodiment, a 6-bit scrambled encryption key is record in each sector and therefore a 96-bit scrambled encryption key is recorded as the first sub information in each ECC block. For example, in the case of the stamper unique information in FIG. 15, in the address range of "0x00100000" to "0x00200000" described in (1)-(a), the initial value "0x1111" is set at the beginning of each ECC block, and the same encryption key (96 bits) is recorded multiple times with redundancy in each ECC block. Similarly, in the address range of "0x00200000" to "0x00300000" described in (1)-(b), the initial value "0x2222" is set and the same encryption key (96 bits) is scrambled with pseudo-random number sequences and recorded in each ECC block.

The first sub information superimposer 256 records the first sub information by modifying the synchronization codes assigned to the fourth frame, the eighth frame, the twelfth frame, the sixteenth frame, the twentieth frame, and the twenty-fourth frame in each sector, from among the synchronization codes assigned to the frames of the modulated main information, depending on the bit values of the first sub information input from the scrambler 255.

With the arrangement described above, a master optical disc (stamper 257) with the encrypted content information recorded thereon as the main information is manufactured. The first sub information is also recorded on the stamper 257 by scrambling encryption key information at the address locations indicated by the stamper unique information, using pseudo-random number sequences generated by presetting the initial values corresponding to the address locations, and then modifying the synchronization code patterns of modulated main information depending on the bit values of the scrambled encryption key information.

Multiple optical discs 258 are manufactured by transfer and copying from the stamper 257 that has been manufactured based on the master optical disc manufactured as described above. Then, the second sub information recording processor 162 records second sub information that differs for each optical disc on the optical discs 258.

The second sub information recording processor 162 records second sub information that differs for each optical disc on the optical discs 258 manufactured by transfer and copying from the stamper 257. The second sub information recording processor 162 is constituted by a random number generator 259, a table node selector 260, an encryptor 261, a second sub information generator 263, and a second sub information recorder 264.

The random number generator 259 generates a random number value, using date and time information. The generated random number is output to the table node selector 260.

The table node selector 260 selects at least one combination of address information and initial value information from the stamper unique information, based on the generated random number. In the second embodiment, the stamper unique information is table information that describes 12 combinations in total as shown in FIG. 15, and it is assumed that the combination (2)-(*b*) is selected from the stamper unique information shown in FIG. 15. Note that, in the case where the stamper unique information is not recorded on an optical disc, the information to be selected is a combination of address information and initial value information, and in the case where the stamper unique information is recorded on an optical disc, the information to be selected is pointer information for the table information included in the stamper unique information.

The encryptor 261 encrypts the information indicating at least one combination of address information and initial value information selected by the table node selector 260 with an encryption key Km 262 that is secretly held in the encryptor 261. The encryptor 261 outputs the encrypted information to the second sub information generator 263.

The second sub information generator 263 modulates the encrypted information indicating at least one combination of address information and initial value information, which has been input from the encryptor 261, into a barcode so as to generate the second sub information. The generated second sub information is output to the second sub information recorder 264.

The second sub information recorder 264 records the second sub information by irradiating the inner circumferential portion of an optical disc 258 with high-output laser light such as YaG laser light in accordance with the barcode-modulated second sub information so as to remove a reflection film and forming a barcode mark that extends radially on the optical disc 258.

With the arrangement described above, the main information and the first sub information are recorded as concave-convex recording marks on the stamper 257. Then, the second sub information that differs for each of multiple optical discs 258 manufactured by transfer and copying from the stamper 257 is generated and recorded as barcode marks in the inner circumferential portion of each optical disc 258. Thereby, the optical discs 258 with the main information, the first sub information, and the second sub information recorded thereon are manufactured.

The first sub information according to the second embodiment is information obtained by scrambling an encryption key necessary for reproducing encrypted content information based on the stamper unique information common for each stamper.

The stamper unique information according to the second embodiment is information that describes, in table format, multiple combinations of address information for scrambling and recording an encryption key and initial value information for generating pseudo-random number sequences that is necessary for scrambling.

The second sub information according to the second embodiment is information indicating one combination of address information and initial value information that is randomly selected as information that differs for each medium from among multiple combinations of address information and initial value information included in the stamper unique information in a table format.

Accordingly, in the case of reproducing encrypted content information from an optical disc, the first sub information needs to be reproduced in order to extract the encryption key. Also, the second sub information, namely the address information and the initial value information, is necessary for reproducing the first sub information. From this, content information cannot be reproduced even though an information reproducing device that reproduces neither the first nor second sub information is manufactured.

Moreover, in the second embodiment, the address information and the initial value information used to read out the first sub information that differs for each optical disc are recorded as the second sub information, so that the first sub information can be read out in different ways even from optical discs manufactured from the same stamper. This improves resistance against attack from malicious third parties who attempt to illegally detect encryption keys, thus enhancing copyright protection of content information recorded in information recording media.

Figure 17:
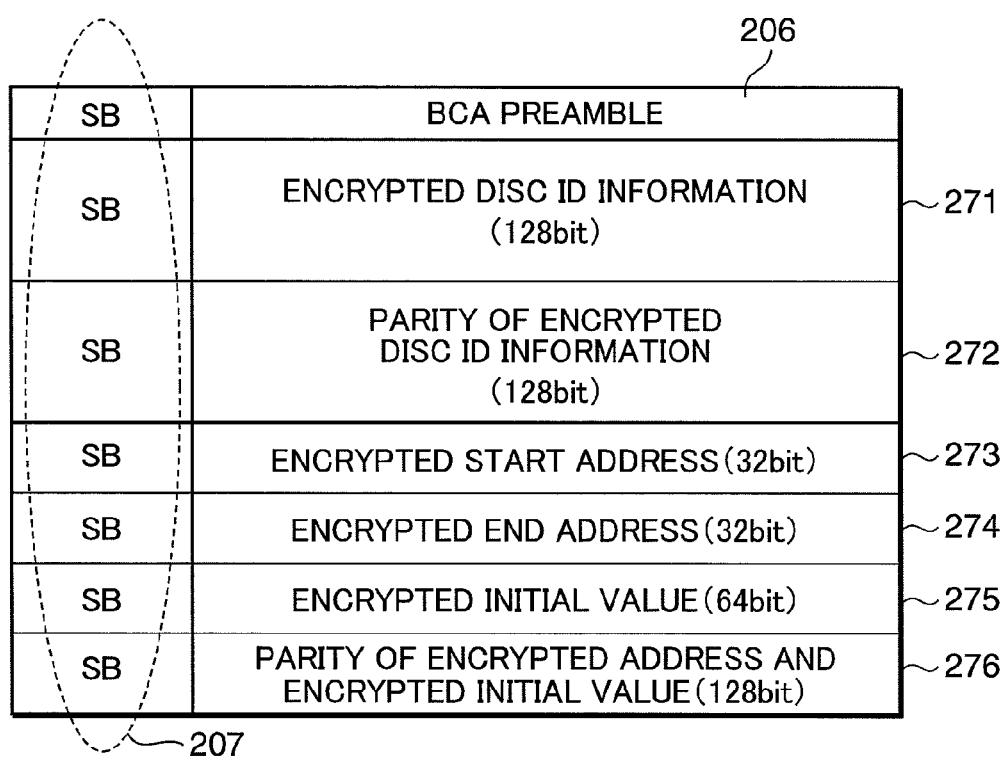
FIG. 17 is a diagram showing an example of a data structure of second sub information in the second embodiment of the invention.

FIG. 17 is a diagram showing an example of the data structure of the second sub information according to the second embodiment of the invention.

Like the second sub information described in the first embodiment, the second sub information according to the second embodiment is also recorded as barcode marks in a BCA by removing the reflection film in the inner circumferential portion of an optical disc.

As in the data structure shown in FIG. 10, a synchronization code SB 207 and a BCA preamble 206 are recorded in the BCA of the second embodiment.

The BCA has also recorded therein 128-bit encrypted disc identification information 271 and a 128-bit parity 272 for error correction of the encrypted disc identification information. However, the disc identification information is not an absolute necessity in the second embodiment as described above.

In the BCA, an encrypted start address 273 randomly selected from the stamper unique information, an encrypted end address 274 randomly selected from the stamper unique information, and an encrypted initial value (key) 275 randomly selected from the stamper unique information are also recorded as the second sub information. Furthermore, parity bits 276 for error correction of the address information (the encrypted start address and the encrypted end address) and the initial value are recorded in the BCA.

Although the address information and the initial value that are used to read out the first sub information are recorded as the second sub information in FIG. 17, the invention is not particularly intended to be limited thereto. In the case where the stamper unique information is recorded on an optical disc, pointer information indicating a single combination of address information and an initial value selected from the stamper unique information, and parity bits of the pointer information may be recorded. In such a case, it is necessary to encrypt the stamper unique information including the table information and record main information including the encrypted stamper unique information.

In the reproduction method for the case where the pointer information has been recorded, firstly, the stamper unique information is read out from the user data area, the pointer information is read out from the second sub information, and the address information and the initial value information indicated by the pointer information are extracted from the stamper unique information. Then, the extract address information and initial value information are used to reproduce the first sub information. In the case where the second sub information is pointer information, pointer information that differs for each optical disc can also be specified. It is thus possible also in such a case to read out the first sub information from a different area for each optical disc.

FIG. 18 is a block diagram showing a characteristic arrangement of an information reproducing device for reproducing content information from an optical disc manufactured by the manufacturing device shown in FIG. 16.

The information reproducing device reproduces content information from an optical disc 281 with the main information, the first sub information, and the second sub information recorded thereon. The information reproducing device is constituted by a second sub information reproducer 282, a decryptor 283, a first sub information reproducer 285, a data converter 286, a main information reproducer 287, and a decryptor 288.

The second sub information reproducer 282 reproduces the second sub information by irradiating a barcode mark formed in the inner circumferential portion of the optical disc 281 with laser light and reading out barcode information based on the intensity of reflected light (or a change in reflectance) from the barcode mark.

Note that the recording band of the barcode marks is far away enough from the recording band of the concave-convex recording marks where the main information is recorded. Ideally, it is desirable that the recording band of the barcode marks is one half of or less than the lowest recording band of the concave-convex recording marks. In this case, the recording band of the concave-convex recording marks is cut off by providing the information reproducing device with a low-frequency pass filter (a lowpass filter or a wide-band cut-off filter) that restricts passage of a recording band that is higher than the lowest recording band of the concave-convex recording marks. This enables stable extraction of the signal band of the barcode marks and accordingly stable reproduction of the barcode marks.

The decryptor 283 decrypts the second sub information reproduced from the barcode mark with an encryption key Km 284 that is secretly held in the decryptor 283 and reproduces the address information and the initial value information (key) that are used to read out the first sub information. Note that the decryptor 283 performs decryption corresponding to the encryption performed by the encryptor 261 in FIG. 16. The address information obtained by decrypting the second sub information is output to the first sub information reproducer 285, and the initial value information (key) is output to the data converter 286.

The first sub information reproducer 285 irradiates a concave-convex recording mark with laser light, reproduces the concave-convex recording mark based on the intensity of reflected light from the concave-convex recording mark, and accesses the address of an optical disc 281 that is identified by the address information extracted by the decryptor 283. Then, in cases where, from among the synchronization codes assigned at predetermined intervals, each of the synchronization codes of the fourth frame, the eighth frame, the twelfth frame, the sixteenth frame, the twentieth frame, and the twenty-fourth frame in each sector has been modified into "SY8", the first sub information reproducer 285 extracts "1" as a bit values of the first sub information, and in cases where they each have not been modified, the first sub information reproducer 285 extracts "0" as a bit value of the first sub information. The first sub information reproducer 285 outputs the extracted bit values to the data converter 286. Specifically, 6-bit first sub information for each sector, i.e., 96-bit first sub information for each ECC block, is reproduced and output to the data converter 286.

The data converter 286 is a section corresponding to the pseudo-random number sequence generator 254 and the scrambler 255 shown in FIG. 16 and contains a pseudo-random number sequence generator including a shift register similar to that of the pseudo-random number sequence generator 254. The data converter 286 presets, in the shift register, the initial value information (key) input at the leading position of the sector where the first sub information is detected and generates a 1-bit pseudo-random number sequence on a frame-by-frame basis. The data converter 286 also performs descrambling corresponding to the scrambling performed by the scrambler 255 by calculating an exclusive OR of the generated pseudo-random number sequences and the first sub information that is generated one bit at a time, and generates an encryption key from the first sub information. In the second embodiment, the 96-bit first sub information is superimposed and recorded for each ECC block repeatedly. It is thus possible to reproduce a 96-bit encryption key in any ECC block in the interval from the start address to the end address specified by the second sub information.

The main information reproducer 287 reproduces main information (encrypted content information) by irradiating the reflection film on the optical disc 281 with laser light and detecting concave-convex recording marks based on the reflected light from the reflection film. The reproduced main information is output to the decryptor 288.

The decryptor 288 reproduces content information by decrypting the main information input from the main information reproducer 287 with the encryption key generated by the data converter 286.

With the arrangement described above, the information reproducing device generates the first sub information from a different location for each optical disc, using the address information and the initial value information recorded as the second sub information that differs for each optical disc. Then, the information reproducing device generates an encryption key necessary for reproducing encrypted content information from the first sub information and reproduces the content information recorded on the optical disc 281.

In the second embodiment, the address information and the initial value information recorded as the second sub information are selected from the stamper unique information common for each stamper, and the first sub information is scrambled and recorded in accordance with the stamper unique information. Accordingly, even if a different combination of address information and initial value information that differs for each optical disc is selected as the second sub information from the stamper unique information, the first sub information can be reproduced by generating second sub information from a different recording location for each optical disc.

In the second embodiment, while a combination of address information and initial value information for reproducing the first sub information has been described as the second sub information, this applies to the case where the table information as the stamper unique information is not recorded on an optical disc. In the case where the table information as the stamper unique information is recorded on an optical disc, pointer information pointing to the stamper unique information is recorded as the second sub information and the stamper unique information is recorded as part of the main information.

Accordingly, in the case where the table information as the stamper unique information is recorded on an optical disc, the information reproducing device reads out the table information as the stamper unique information from the user data area prior to reading out the first sub information, and reproduces pointer information pointing to the stamper unique information from the second sub information. This enables the first sub information to be reproduced based on the address location and the initial value indicated by the pointer information, thereby achieving the same effect as achieved in the case where the table information as the stamper unique information is not recorded on an optical disc.

In addition, in the case where the table information as the stamper unique information is recorded on an optical disc, the amount of second sub information, of which a limited amount can be recorded, is reduced considerably although the stamper unique information needs to be recorded in the user data area.

Alternatively, the stamper unique information may be recorded on a master optical disc (stamper), instead of in the user data area, by modifying synchronization codes as in the case of the first sub information. That is, like the first sub information, the stamper unique information may be superimposed and recorded with the main information.

As described above, information recording media according to the second embodiment are manufactured by transfer and copying from a stamper with encrypted content information and first sub information recorded thereon, and have a combination of address information and initial value information for reproducing the first sub information selected from the stamper unique information common for each stamper and recorded as second sub information that differs for each of multiple information recording media manufactured by transfer and copying from the stamper. Accordingly, the first sub information is read out from a different location for each optical disc even though optical discs have information recorded from the same stamper. This extremely increases the degree of difficulty for malicious third parties to analyze an encryption key that is recorded as first sub information and used to reproduce content information, thereby enhancing copyright protection of recorded digital copyrighted work.

Third Embodiment

Stamper unique information used in an information recording medium, an information recording device, and an information reproducing device according to a third embodiment is table information that includes multiple combinations of address information and initial value information as in the second embodiment. First sub information is scrambled and recorded, using pseudo-random numbers sequence generated by presetting initial value information at address locations described in the stamper unique information. The second sub information is recorded by randomly selecting at least one combination of address information and initial value information from the table of the stamper unique information.

The third embodiment, however, differs from the second embodiment in the following points.

Firstly, the stamper unique information according to the third embodiment further includes encryption-key table information (hereinafter referred to as "second table information") that represents an encryption key used to encrypt each table node, in addition to the table information (hereinafter referred to as "first table information") that represents combinations of address information and initial value information.

Secondly, the first sub information is encrypted with a corresponding encryption key in the second table information of the stamper unique information for each table node of the first table information of the stamper unique information that describes the address information and the initial value information, and is then recorded as part of main information in concave-convex recording marks on the master optical disc (stamper).

Thirdly, the second sub information is generated by extracting not only the pointer information pointing to the stamper unique information but also a corresponding encryption key in the second table information included in the stamper unique information and assigning the encryption key to the pointer information.

FIGS. 19A and 19B are conceptual diagrams showing an example of the data format of the stamper unique information according to the third embodiment of the invention. FIG. 19A is a diagram showing the first table information that represents combinations of address information and initial value information, and FIG. 19B is a diagram showing the second table information that represents encryption keys used to encrypt table nodes.

Unlike the stamper unique information described in FIG. 15, the stamper unique information according to the third embodiment includes the second table information (encryption-key table information) that represent encryption keys used to encrypt table nodes, in addition to the first table information that represents combinations of address information and initial value information.

In addition, the stamper unique information is also encrypted and recorded as part of the main information on the master optical disc (stamper). The stamper unique information is also encrypted with a different encryption key for each table node in the first table information that represents combinations of address information and initial value information. Each table node in the first table information is encrypted with the key information of the second table information that is stored in association with each table node.

Referring for example to the table node (1)-(*a*) in the first table information in FIG. 19A, information indicating the recording start address "0x00100000", the recording end address "0x00200000", and the initial value "0x1111" is recorded after being encrypted with an encryption key "key 1" at the table node (1)-(*a*) in the second table information in FIG. 19B.

As described above, the stamper unique information according to the third embodiment is constituted by the first table information that represents combinations of address information and initial value information, and the second table information that represents encryption keys used to encrypt the table nodes in the first table information. Each table node in the first table information is encrypted with an encryption key described in a corresponding table node in the second table information and recorded as part of the main information.

Note that, in the third embodiment, only the encrypted first table information of the stamper unique information is recorded as part of the main information and the second table information of the stamper unique information is not recorded as part of the main information.

Also, the second sub information according to the third embodiment includes pointer information indicating a table node in the first table information, and encryption key information that is extracted from the second table information and corresponds to a table node in the first table information.

The third embodiment shows the case where the table node (2)-(*b*) in FIG. 19A is selected as a table node that is randomly selected from the first table information as second sub information for each optical disc. In this case, the pointer information of the second sub information that indicates the table node (2)-(*b*) in the first table information is assigned with an encryption key "key 6" corresponding to the table node (2)-(*b*), the encryption key being selected from the second table information of the same stamper unique information as the first table information.

According to the reproduction method for the first sub information, the second sub information, and the main information in the present example, the encrypted first table information that is the stamper unique information is read out from the user data area.

The information reproducing device reads out the pointer information indicating the table node (2)-(*b*) in the stamper unique information from the second sub information and also reads out the encryption key "key 6" that is used to decrypt the table node (2)-(*b*) in the encrypted first table information. The information reproducing device is thus capable of decrypting the table node (2)-(*b*) in the first table information that is recorded as part of the main information. The information reproducing device then extracts the address information and the initial value information for reproducing the first sub information, so that it is capable of reproducing the first sub information. Consequently, the recorded encrypted content information can be reproduced.

With the arrangement described above, even if the encrypted first table information representing combinations of address information and initial value information is recorded as part of the main information, the information reproducing device can decrypt only a table node that is unique to each optical disc from the first table information. This improves resistance against analysis by malicious third parties.

In addition, not only the pointer information pointing to the stamper unique information but also the encryption key information that corresponds to a table node identified by the pointer information are recorded as second sub information on each optical disc. This enables the information reproducing device to decrypt only a table node specified uniquely for each optical disc, instead of attempting to decrypt all table nodes in the first table information, thus reducing access time to the first sub information.

Figure 20:
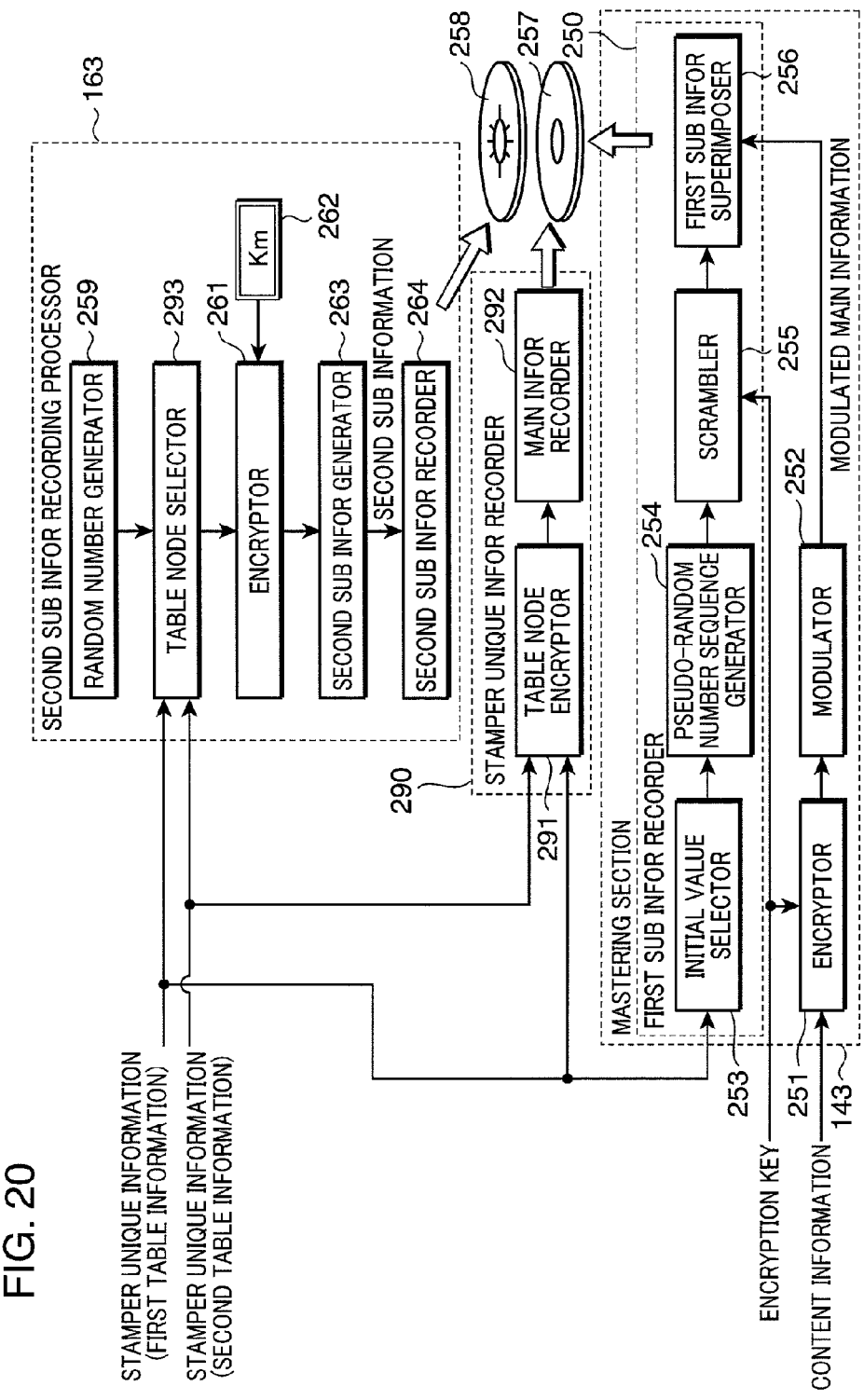
FIG. 20 is a block diagram showing a characteristic arrangement of a manufacturing device for manufacturing an information recording medium in a third embodiment of the invention.

FIG. 20 is a block diagram showing a characteristic arrangement of a manufacturing device for manufacturing information recording media according to the third embodiment of the invention. The manufacturing device according to the third embodiment is an improvement on the manufacturing device of the second embodiment described in FIG. 16, so the same reference numerals are given to blocks that perform the same operation as those in FIG. 16 and a detailed description thereof is omitted in the third embodiment.

The manufacturing device for manufacturing information recording media according to the third embodiment further includes a stamper unique information recorder 290 for recording the stamper unique information as part of main information on a master optical disc (stamper 257). Note that the stamper unique information according to the third embodiment includes the first table information and the second table information that are used to record the first sub information, as described with reference to FIGS. 19A and 19B.

The stamper unique information recorder 290 records the stamper unique information on the master optical disc (stamper 257). The stamper unique information recorder 290 is constituted by a table node encryptor 291 and a main information recorder 292.

The table node encryptor 291 receives an input of the first table information (FIG. 19A) and the second table information (FIG. 19B) included in the stamper unique information and generates encrypted first table information by encrypting each table node in the first table information with an encryption key corresponding to each table node in the second table information. The table node encryptor 291 outputs the generated encrypted first table information to the main information recorder 292. Specifically, the table node (1)-(*a*) in the first table information in FIG. 19A is encrypted with the encryption key described in the node (1)-(*a*) in the second table information in FIG. 19B. Similarly, all 12 table nodes are encrypted with different encryption keys.

The main information recorder 292 records the encrypted first table information input from the table node encryptor 291 as part of the main information on a master optical disc (stamper 257). The main information recorder 292 performs the same modulation as performed by the modulator 252 on the encrypted first table information. Then, the main information recorder 292 records the encrypted first table information by irradiating the master optical disc with laser light and forming a concave-convex recording mark based on the modulated information.

Note that the first table information is recorded in an address location that is predetermined based on the address information in the main information. Also, the modulation format used to modulate the first table information by the main information recorder 292 may differ from the one used to modulate the content information by the modulator 252. In this case, the first table information cannot be reproduced unless the modulation method used in the main information recorder 292 is known, so security is improved.

Moreover, unlike the table node selector 260 described in FIG. 16, a table node selector 293 of a second sub information recording processor 163 in the manufacturing device for manufacturing information recording media receives an input of the first table information and the second table information that are the stamper unique information, randomly selects a single table node from the first table information, and selects encryption key information corresponding the selected table node from the second table information. The table node selector 293 then outputs the selected pointer information and the selected encryption key information to an encryptor 261. The encryptor 261 encrypts the pointer information and the encryption key information selected by the table node selector 293, and a second sub information generator 263 modulates the encrypted pointer information and encryption key information into a barcode so as to generate the second sub information.

Figure 21:
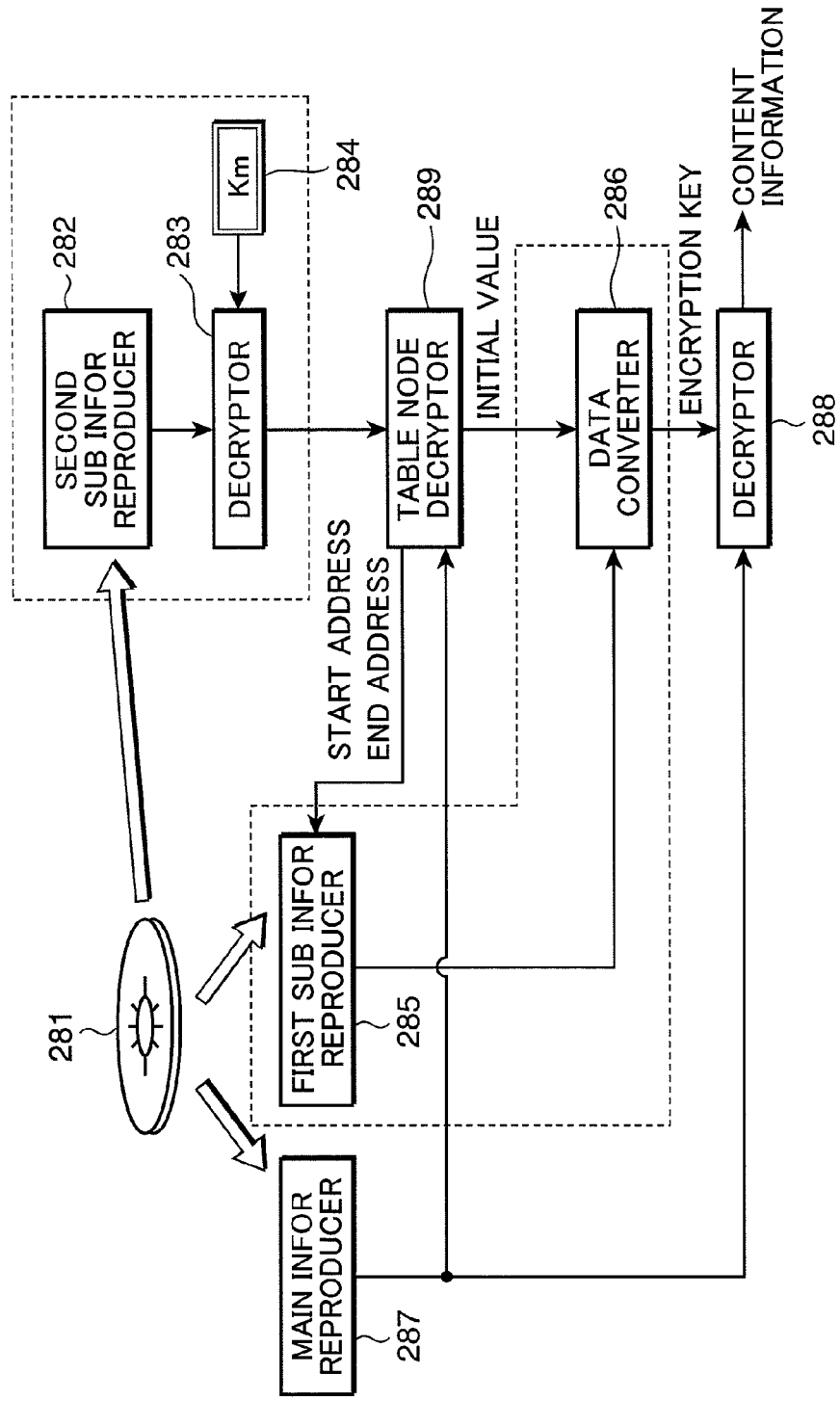
FIG. 21 is a block diagram showing a characteristic arrangement of an information reproducing device for reproducing content information from an optical disc manufactured by the manufacturing device shown in FIG. 20.

FIG. 21 is a block diagram showing a characteristic arrangement of an information reproducing device for reproducing content information from an optical disc manufactured by the manufacturing device in FIG. 20. The information reproducing device according to the third embodiment is an improvement on the information reproducing device of the second embodiment described in FIG. 18, so the same reference numerals are given to blocks that perform the same operation to those in FIG. 18 and a detailed description thereof is omitted in the third embodiment.

The information reproducing device according to the third embodiment differs from the information reproducing device in FIG. 18 in that it includes a table node decryptor 289.

A decryptor 283 decrypts the second sub information reproduced by a second sub information reproducer 282, extracts pointer information and encryption key information in the stamper unique information, and outputs the extracted pointer information and encryption key information to the table node decryptor 289.

A main information reproducer 287 in the information reproducing device reproduces the encrypted first table information from a predetermined address location and outputs the reproduced encrypted first table information to the table node decryptor 289.

The table node decryptor 289 selects a table node in the encrypted first table information based on the pointer information obtained by reproducing the second sub information and decrypts the selected table node with the encryption key information obtained by reproducing the second sub information, so as to extract the address information and the initial value information for reproducing the first sub information.

A first sub information reproducer 285 accesses the optical disc 281 based on the address information extracted by the table node decryptor 289 and reproduces the first sub information. A data converter 286 descrambles the first sub information with pseudo-random number sequences generated based on the initial value information extracted by the table node decryptor 289 and extracts the encryption key information necessary for reproducing content information from the first sub information. A decryptor 288 reproduces the encrypted content information, using the encryption key information extracted by the data converter 286.

With the arrangement described above, the second sub information unique to each optical disc is recorded on an optical disc, so as in the second embodiment, the first sub information can be reproduced from a different recording location for each optical disc even though ROM-type information recording media (optical discs) are manufactured by transfer and copying from the same stamper.

In addition, since only the pointer information and the encryption key information are recorded as second sub information in the third embodiment, the second sub information whose information amount is limited can be recorded more efficiently than in the case where the address information and the initial value information are recorded as-is as second sub information.

In the third embodiment, although the first table information is recorded together with content information as the main information, each optical disc does not contain encryption key information for encrypting all table nodes in the first table information. Thus, the information reproducing device can reproduce only a table node specified by the second sub information. This improves resistance against attack from malicious third parties who attempt to analyze the first table information.

Also, the information reproducing device does not need to check all table nodes in the first table information for whether they can be decrypted with the encryption key specified by the second sub information, since the second sub information includes pointer information pointing to the first table information that represents combinations of address information and initial value information. It is thus possible to shorten the time required to reproduce the first sub information.

Although, as the first sub information recording method, the method for modifying a synchronization code pattern assigned to each frame has been described in the first and second embodiments, the invention is not particularly intended to be limited thereto. What is important herein is that the first sub information is recorded in common for each stamper and with a method such that the first sub information does not exist in ordinary reproduction data indicating the main information. One example of such is a method in which the concave-convex recording marks are recorded by being slightly deformed or displaced in a tangential or radial direction (see JP 2001-357533A, for example).

Even in such a case, the first sub information does not appear in an ordinary reproduction signal for the main information and thus will not be copied even if the reproduction signal is copied as is. In the case where concave-convex recording marks are displaced in the radial direction, the first sub information is observed as radial variations in the concave-convex recording marks, whereas in the case where concave-convex recording marks are displaced in the tangential direction, i.e., the edges of concave-convex recording marks are shifted in the tangential direction, the first sub information is observed as jitter. It is thus difficult, even by means of signal detection or electron microscopic observations, to confirm the presence of the first sub information, which considerably improves the security of the first sub information that represents the encryption key.

Also in such cases where the first sub information is recorded by changing the locations of the concave-convex recording marks in either the tangential or radial direction or deforming the shapes of the concave-convex recording marks in either the tangential or radial direction, the encryption key is scrambled and recorded by calculating an exclusive OR of the encryption key information and pseudo-random number sequences as in the case where the first sub information is recorded by modifying synchronization code patterns. Modifying synchronization code patterns as described in the first and second embodiments and shifting the edges of concave-convex recording marks, i.e., deforming the concave-convex recording marks by a slight amount and displacing concave-convex recording marks by a slight amount in the radial direction, differ with respect to how the scrambled encryption key is recorded. Thus, all such recording methods are within the scope of the invention.

Although the second sub information recording methods using barcode marks formed by removing the reflection film on the inner circumferential portion of an optical disc and changing the reflectance of the reflection film have been described in the first and second embodiments, the invention is not intended to be limited thereto. The second sub information recording method may be any method as long as it can record unique second sub information on each optical disc that is manufactured by transfer from a stamper and with a reflection film such as a metal film formed thereon.

For instance, as disclosed in JP 2008-269763A, the second sub information may be recorded by tracking and irradiating a concave-convex recording mark with a recording level of laser light and forming a reflectance mark that has changed the reflectance of the reflection film on the concave-convex recording mark. In other words, the second sub information recording method according to the invention may be a method for recording unique information for each medium by forming a concave-convex recording mark by transfer and copying from a stamper and then irradiating an optical disc manufactured by forming a reflection film thereon, so as to change the reflectance of the reflection film. Such a second sub information recording method also falls within the scope of the invention.

Fourth Embodiment

Next is a detailed description of an information recording medium, an information recording device, and an information reproducing device according to a fourth embodiment of the invention.

The fourth embodiment is common to the first to third embodiments described above, in that an encryption key used to decrypt encrypted content information is recorded as first sub information and that the first sub information is superimposed and recorded with main information at the time of recording on a stamper (at the time of producing a master optical disc).

However, the fourth embodiment differs from the first to third embodiments described above in that disc identification information and stamper unique information are both recorded as second sub information after formation of optical discs, that the first sub information is recorded by phase shifts of the mark edges of concave-convex recording marks recorded on the stamper, and that the second sub information is recorded after the formation of optical discs by irradiating a reflection film on the concave-convex recording marks with laser light and thereby changing the reflectance of the reflection film.

Figure 22:
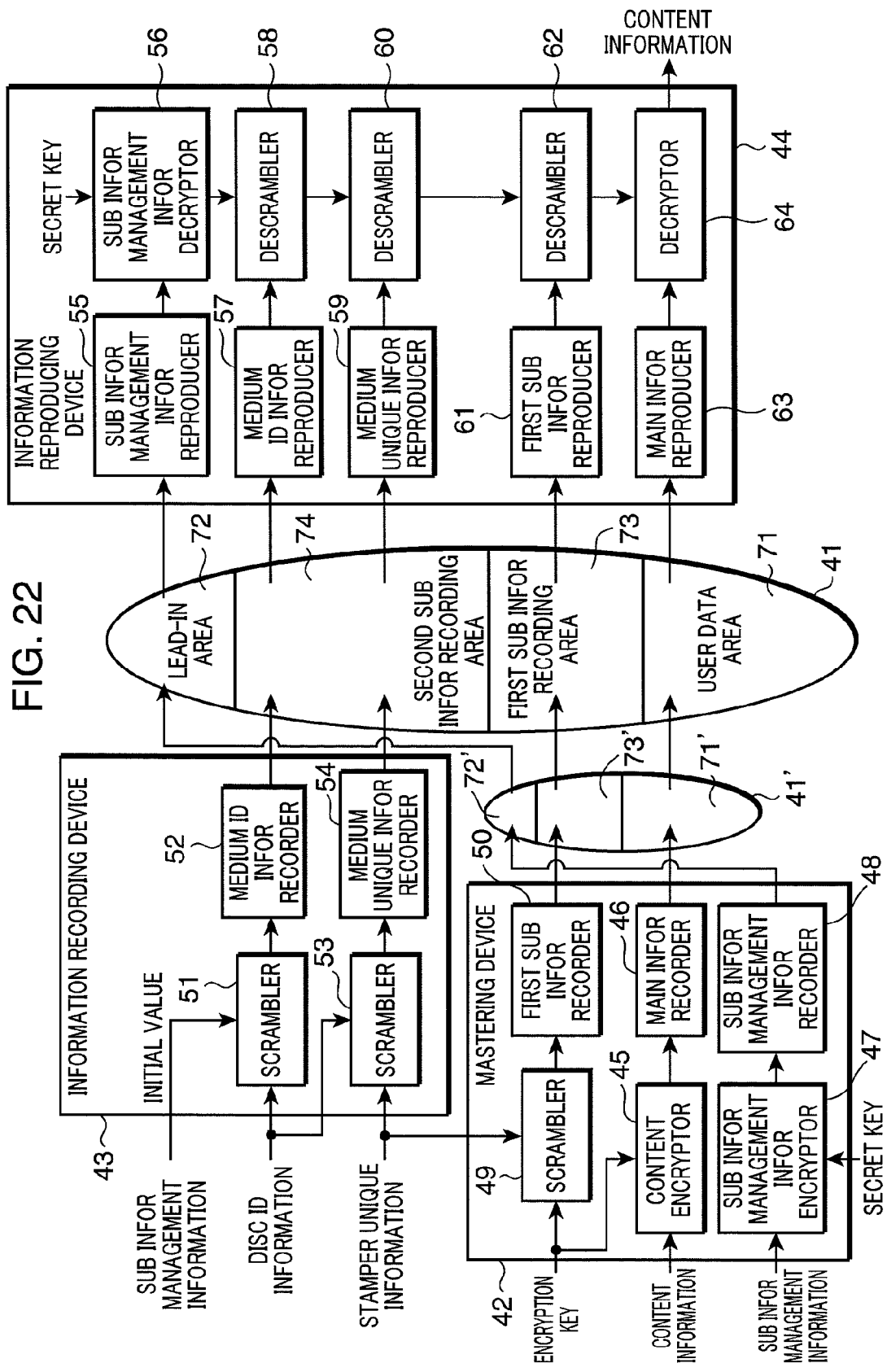
FIG. 22 is a block diagram showing an arrangement of an information recording and reproducing system in a fourth embodiment of the invention.

FIG. 22 is a block diagram showing an arrangement of an information recording and reproducing system according to the fourth embodiment of the invention.

The information recording and reproducing system according to the fourth embodiment is constituted by a mastering device 42 for manufacturing a master optical disc (stamper 41'), an information recording device 43 for recording disc identification information and stamper unique information on an optical disc 41 that is manufactured by transferring information from the stamper 41' manufactured by the mastering device 42 and then forming a reflection film thereon by vapor deposition, and an information reproducing device 44 for reproducing encrypted content information recorded on an optical disc 41.

The mastering device 42 records encrypted content information (main information) and encrypted sub information management information by forming concave-convex recording marks and also records an encryption key for decrypting the encrypted content information as first sub information by shifting the phases of the mark edges of concave-convex recording marks.

The mastering device 42 includes a content encryptor 45, a main information recorder 46, a sub information management information encryptor 47, a sub information management information recorder 48, a scrambler 49, and a first sub information recorder 50.

The content encryptor 45 encrypts content information recorded on the stamper 41' with an input encryption key, based on a common key algorithm such as DES (data encryption standard) or AES (advanced encryption standard).

The main information recorder 46 records the content information encrypted by the content encryptor 45 as main information in a user data area 71' of the stamper 41' (a user data area 71 of an optical disc 41). The main information recorder 46 performs error correction coding on the encrypted content information according to the format of an optical disc 41 where the information is recorded, modulates the encrypted content information, and assigns an address to the encrypted content information. The main information recorder 46 forms a concave-convex recording mark on the master optical disc (stamper 41') by irradiating the master optical disc (stamper 41') with laser light according to the modulated signal. Thus, the main information is recorded on the stamper 41'.

The sub information management information encryptor 47 encrypts sub information management information in the same manner as the content information. The sub information management information recorder 48 records the sub information management information encrypted by the sub information management information encryptor 47 in a lead-in area 72' of the stamper 41' (a lead-in area 72 of an optical disc 41).

The encryption of the sub information management information is, however, performed using a different secret key from the encryption key used to encrypt the content information. Here, the algorithm for encrypting the sub information management information may be the same as or different from the algorithm for encrypting the content information. While the encryption key used to encrypt the content information is key information common for each stamper, the secret key used to encrypt the sub information management information is key information common to all stampers. The sub information management information is recorded in the lead-in area 72, which is a control data area in the inner circumferential portion of an optical disc.

Figure 23:
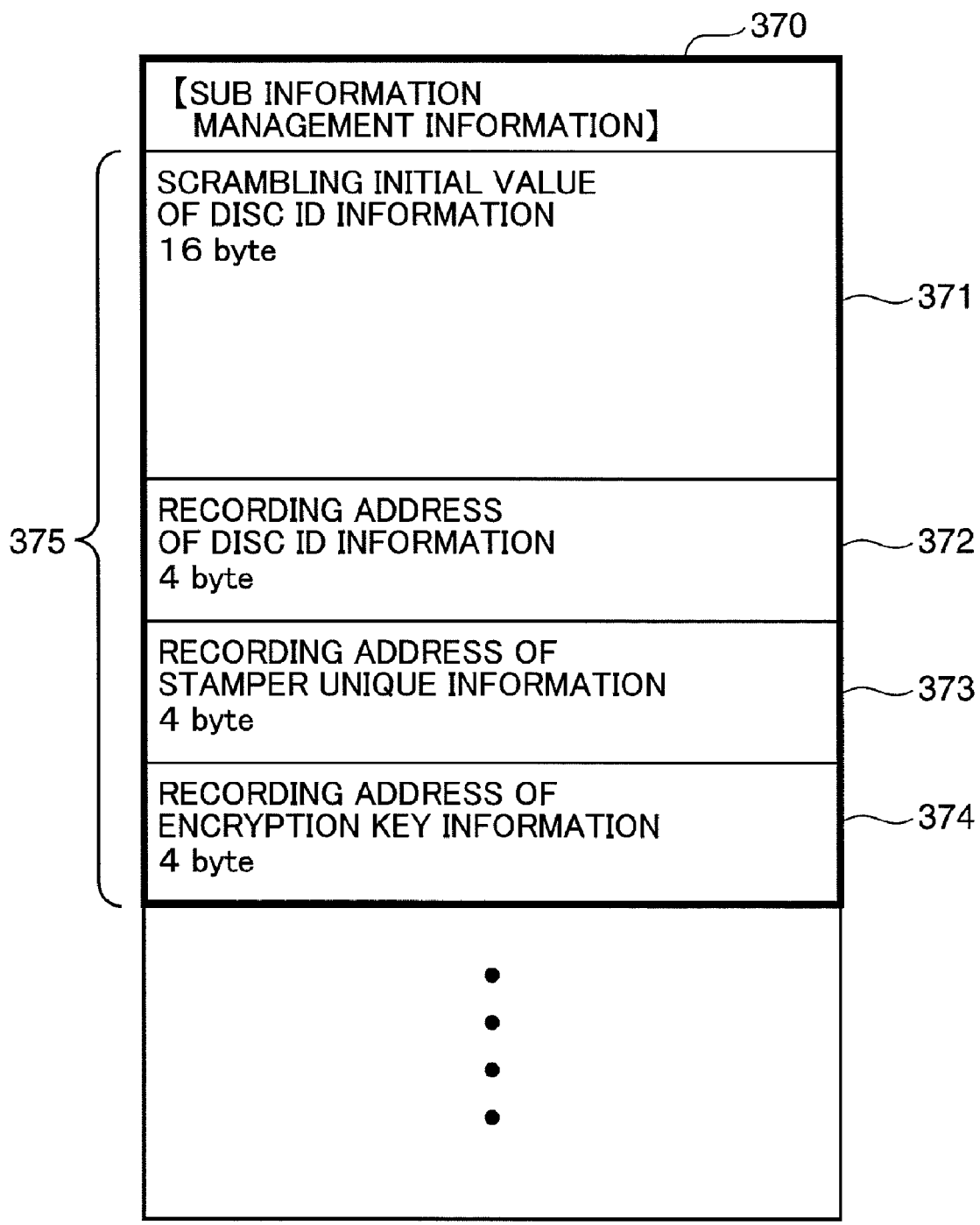
FIG. 23 is a diagram showing an example of sub information management information in the fourth embodiment of the invention.

FIG. 23 is a diagram showing an example of the sub information management information according to the fourth embodiment of the invention. Sub information management information 370 according to the fourth embodiment includes a scrambling initial value 371 for scrambling disc identification information to be recorded as second sub information, a recording address 372 that indicates the recording location of the disc identification information, a recording address 373 that indicates the recording location of stamper unique information to be recorded as the second sub information, and a recording address 374 that indicates the recording location of encryption key information to be recorded as first sub information.

In the sub information management information 370, the scrambling initial value 371, the recording address 372 of the disc identification information, the recording address 373 of the stamper unique information, and the recording address 374 of the encryption key information constitute a set of sub information block information 375. The sub information management information 370 is table information that describes a number of pieces of sub information block information 375 that is equivalent to the number of times the information is recorded on an optical disc. In the fourth embodiment, a set of disc identification information, stamper unique information, and encryption key information that have the same information content is recorded at two different addresses with redundancy in the lead-in area, which is a control data area in the inner circumferential portion of the optical disc. Thus, in this case, two pieces of sub information block information 375 are included in the sub information management information 370.

Next, the scrambler 49 scrambles encryption key information for decrypting the encrypted content information recorded in the user data area, with pseudo-random number sequences generated by presetting an initial value based on the stamper unique information. The first sub information recorder 50 records the encryption key information scrambled by the scrambler 49 as first sub information in a first sub information recording area 73' of the stamper 41' (a first sub information recording area 73 of an optical disc 41).

When the address of main information to be recorded has reached the recording address 374 of encryption key information in the sub information management information during recording of the main information, the first sub information recorder 50 according to the fourth embodiment intentionally advances or delays the edges of recording marks in which the main information is recorded, according to the bit value of the scrambled encryption key information scrambled with pseudo-random number sequences, so as to modulate the phases of the recording mark edges and record the first sub information.

Next is a description of the information recording device 43. The information recording device 43 records disc identification information and stamper unique information as second sub information on each optical disc manufactured by transfer from the stamper 41' manufactured by the mastering device 42.

Although the information recording and reproducing system according to the fourth embodiment includes a duplication device for producing optical discs 41 by copying the stamper 41' manufactured by the mastering device 42, the duplication device has not been shown in FIG. 22.

The information recording device 43 includes a scrambler 51, a medium identification information recorder 52, a scrambler 53, and a medium unique information recorder 54.

The scrambler 51 scrambles disc identification information to be recorded, using pseudo-random number sequences generated by presetting, in a pseudo-random number sequence generator, the scrambling initial value 371 in the disc identification information described in the sub information management information. Note that the pseudo-random number sequence generator is contained in the scrambler 51.

The medium identification information recorder 52 accesses an optical disc 41 based on the recording address 372 of the disc identification information described in the sub information management information and records the scrambled disc identification information from the accessed recording address 372. The medium identification information recorder 52 irradiates the optical disc 41 with laser light with varying intensity according to the bit values of the scrambled disc identification information and changes the reflectance of the reflection film on the concave-convex recording marks, so as to additionally record the scrambled disc identification information as second sub information on the optical disc 41.

The scrambler 53 scrambles stamper unique information using pseudo-random number sequences generated by presetting the disc identification information as an initial value in a pseudo-random number sequence generator. Note that the pseudo-random number sequence generator is contained in the scrambler 53.

The medium unique information recorder 54 accesses the optical disc 41 based on the recording address 373 of the stamper unique information described in the sub information management information and records the scrambled stamper unique information from the accessed recording address 373. The medium unique information recorder 54 irradiates the optical disc 41 with laser light with varying intensity according to the bit values of the scrambled stamper unique information and changes the reflectance of the reflection film on the concave-convex recording marks, so as to additionally record the scrambled stamper unique information as second sub information on the optical disc 41.

Next is a description of the information reproducing device 44 for reproducing content information from an optical disc 41 according to the fourth embodiment.

The information reproducing device 44 includes a sub information management information reproducer 55, a sub information management information decryptor 56, a medium identification information reproducer 57, a descrambler 58, a medium unique information reproducer 59, a descrambler 60, a first sub information reproducer 61, a descrambler 62, a main information reproducer 63, and a decryptor 64.

After reproduction of an optical disc 41 has been started, the sub information management information reproducer 55 accesses the lead-in area 72 which is a control data area in the inner circumferential portion of the optical disc 41, irradiates a concave-convex recording mark with laser light, and reproduces encrypted sub information management information based on a change in the intensity of reflected light from the reflection film corresponding to the concave-convex recording mark.

The sub information management information decryptor 56 decrypts the encrypted sub information management information with a secret key that is secretly held in the information reproducing device 44. The secret key is secretly held in such a form as not to be observed from the outside, such as being embedded in an LSI (large scale integration) constituting the information reproducing device 44. Note that the secret key used by the sub information management information decryptor 56 is the same secret key as used by the sub information management information encryptor 47 in the mastering device 42.

After the sub information management information has been decrypted by the sub information management information decryptor 56, the medium identification information reproducer 57 refers to the decrypted sub information management information and accesses the recording address 372 of disc identification information described in the sub information management information. The medium identification information reproducer 57 reproduces scrambled disc identification information (second sub information) by irradiating the optical disc 41 with laser light and observing a change in the intensity of reflected light caused by changing the reflectance of the reflected light. Note that the change in the intensity of reflected light caused by changing the reflectance of the reflection film is small with respect to variations in the level of reflected light caused by concave-convex recording marks.

The descrambler 58 descrambles the scrambled disc identification information reproduced by the medium identification information reproducer 57, using pseudo-random number sequences generated by presetting, in a pseudo-random number sequence generator, the scrambling initial value 371 of disc identification information described in the sub information management information decrypted by the sub information management information decryptor 56, and extracts the disc identification information. Note that the pseudo-random number sequence generator is contained in the descrambler 58.

The medium unique information reproducer 59 refers to the decrypted sub information management information and accesses the recording address 373 of stamper unique information described in the sub information management information. The medium unique information reproducer 59 reproduces scrambled stamper unique information (second sub information) by irradiating the optical disc 41 with laser light and observing a change in the intensity of reflected light caused by changing the reflectance of the reflection film. Note that the change in the intensity of reflected light caused by changing the reflectance of the reflection film is small with respect to variations in the level of reflected light caused by concave-convex recording marks.

The descrambler 60 descrambles the scrambled stamper unique information reproduced by the medium unique information reproducer 59, using pseudo-random number sequences generated by presetting the disc identification information extracted by the descrambler 58 as an initial value in a pseudo-random number sequence generator, and extracts the stamper unique information. Note that the pseudo-random number sequence generator is contained in the descrambler 60.

The first sub information reproducer 61 refers to the decrypted sub information management information and accesses the recording address 374 of encryption key information described in the sub information management information. The first sub information reproducer 61 reproduces scrambled encryption key information (first sub information) by irradiating the optical disc 41 with laser light and observing phase shifts of the edges of concave-convex recording marks.

The descrambler 62 descrambles the scrambled encryption key information reproduced by the first sub information reproducer 61, using pseudo-random number sequences generated by presetting the scrambled unique information extracted by the descrambler 60 as an initial value in a pseudo-random number sequence generator, and extracts the encryption key information. Note that the pseudo-random number sequence generator is contained in the descrambler 62.

The main information reproducer 63 reproduces encrypted content information recorded using the concave-convex recording marks in the user data area 71 of the optical disc 41. The decryptor 64 decrypts the encrypted content information reproduced by the main information reproducer 63, using the encryption key information extracted by the descrambler 62. Thus, the content information is reproduced.

With the use of the mastering device 42, the information recording device 43, and the information reproducing device 44 as described above, an encryption key for decrypting encrypted content information cannot be reproduced unless additionally recorded disc identification information unique to each optical disc is reproduced, even though optical discs 41 are manufactured by copying the stamper 41'. This improves resistance against illegal copying of recorded content information and enhances copyright protection, thus contributing to sound distribution of optical discs.

Figure 24:
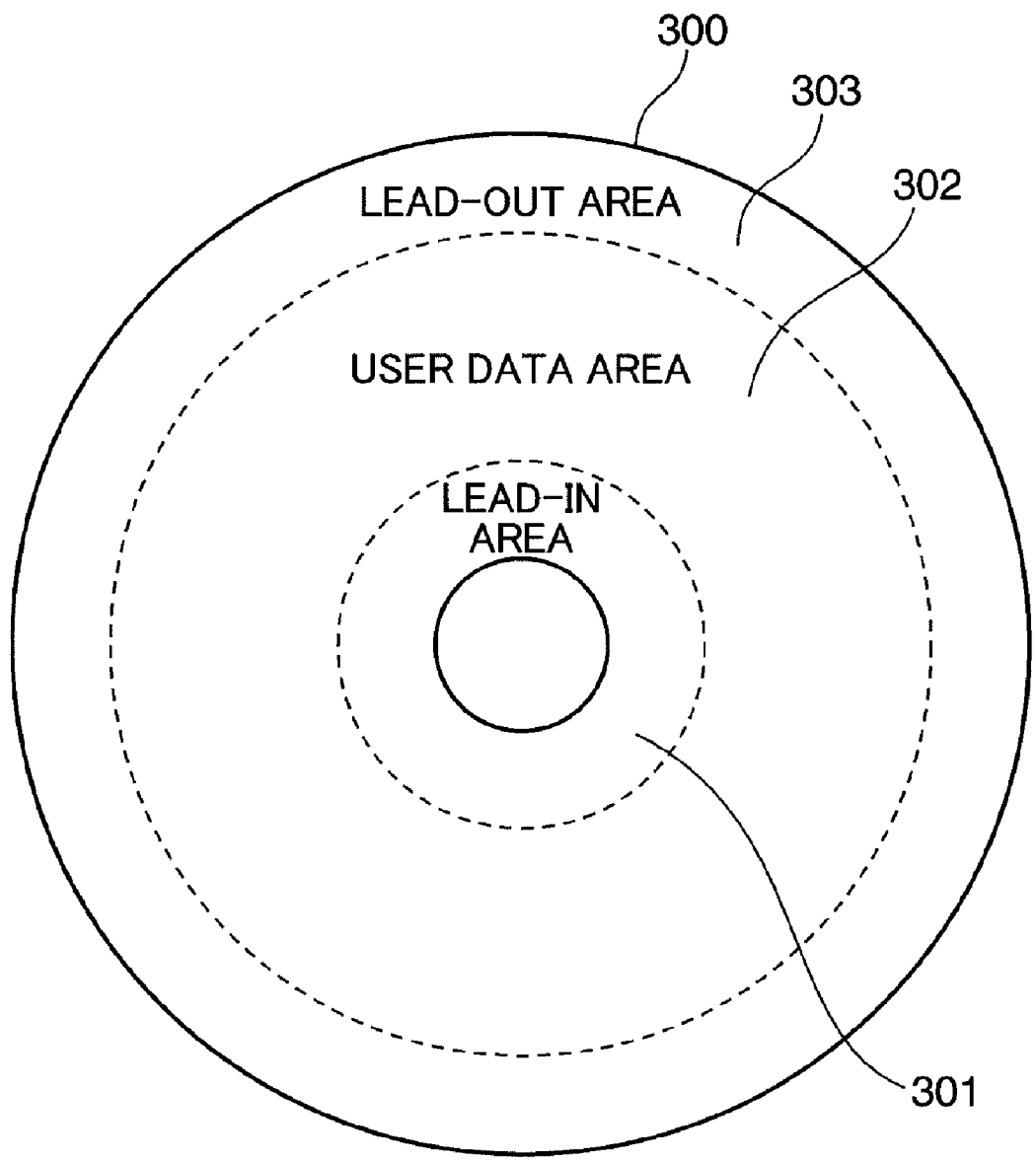
FIG. 24 is a conceptual diagram showing a recording area of an optical disc in the fourth embodiment of the invention.
Figure 25:
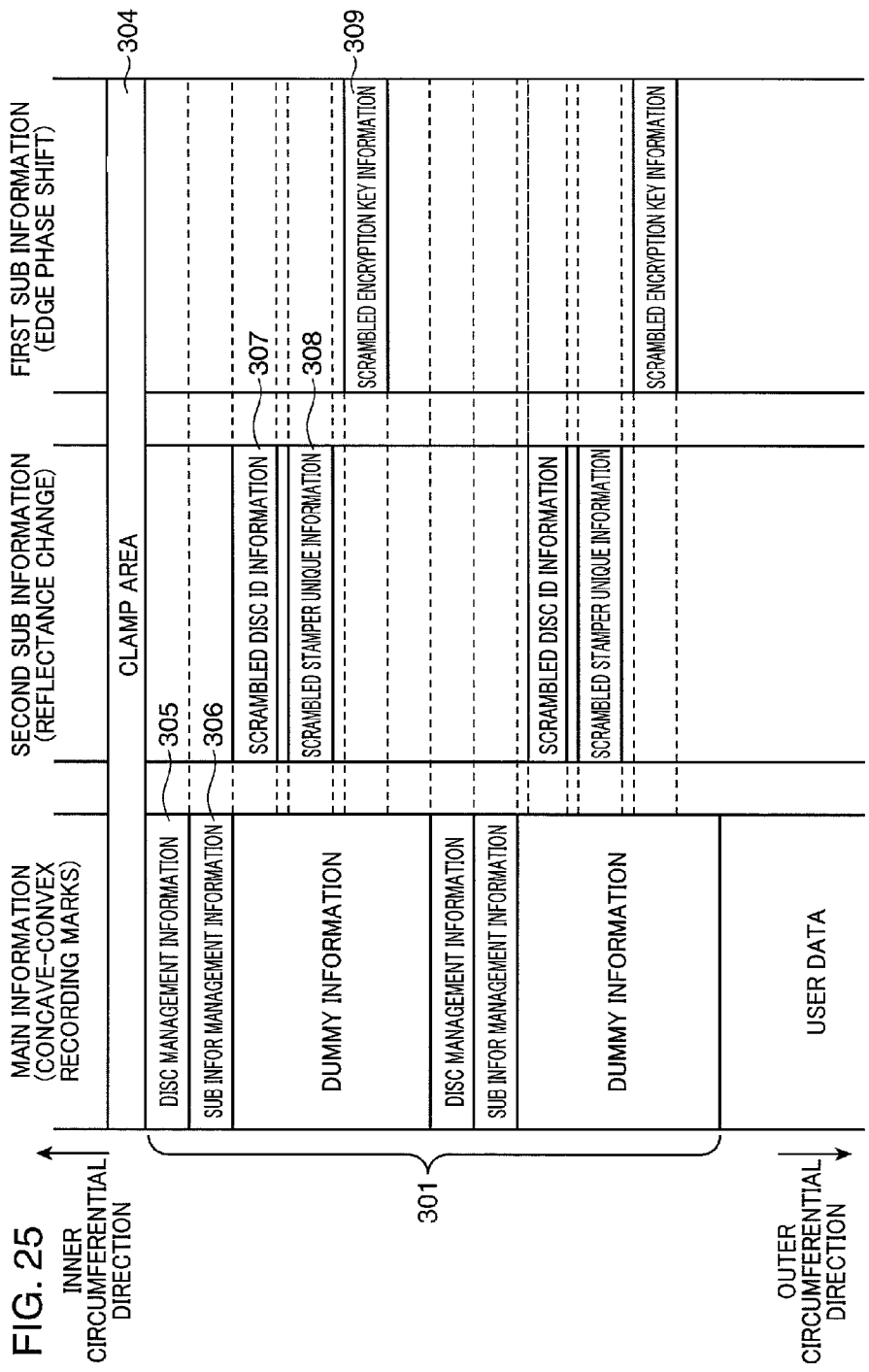
FIG. 25 is a diagram showing a recording format of an optical disc having main information, first sub information, and second sub information.

FIG. 24 is a conceptual diagram showing the recording area of an optical disc according to the fourth embodiment of the invention, and FIG. 25 is a diagram showing the recording format of main information, first sub information, and second sub information on an optical disc.

As shown in FIG. 24, an optical disc 300 according to the fourth embodiment is constituted by a lead-in area 301 which is a control data area in the inner circumference side of the optical disc 300, a user data area 302, and a lead-out area 303 which is a control data area on the outer circumference side of the optical disc 300.

The lead-in area 301 has mainly recorded therein disc management information necessary for reproducing the optical disc 300, and encrypted sub information management information. The user data area 302 has mainly recorded therein encrypted content information. The lead-out area 303 has mainly recorded therein disc management information necessary for reproducing the optical disc 300.

FIG. 25 shows the recording format of the lead-in area 301 of the optical disc 300 according to the fourth embodiment. The lead-in area 301 has the main information recorded using concave-convex recording marks, the second sub information recorded by changing the reflectance of the reflection film, and the first sub information recorded by shifting the phases of the mark edges of concave-convex recording marks. The vertical axis direction of FIG. 25 indicates the circumferential recording location of the optical disc 300, with the upward direction in FIG. 25 corresponding to the inner circumferential direction of the optical disc 300 and the downward direction in FIG. 25 corresponding to the outer circumferential direction of the optical disc 300. Thus, the location where laser light is applied in reproducing information from the optical disc 300 moves from top to bottom in FIG. 25 to reproduce information.

A clamp area 304 is an area used to fix the optical disc 300 when the disc is moved to a rotary table. No information is recorded in the clamp area 304. The clamp area 304 is located in the innermost circumferential portion of the optical disc 300.

In the innermost circumferential portion of the lead-in area 301, disc management information 305 is recorded using concave-convex recording marks. The disc management information 305 includes type information indicating the type of the optical disc 300, main information storage capacity, and the last address location of main information, for example.

On the outer circumference side of the location where the disc management information 305 is recorded, encrypted sub information management information 306 is recorded using concave-convex recording marks. As the sub information management information 306, the information content shown in FIG. 23 is encrypted and recorded.

The disc management information 305 and the sub information management information 306 are recorded multiple times with redundancy at different radial locations (e.g., twice in the fourth embodiment). Thus, for example even if one set of disc management information and sub information management information cannot be read out due to fingerprints, soiling, scratching and other problems, the other set of disc management information and sub information management information can be read out. This ensures system robustness without breaking the system.

In the lead-in area 301, dummy information with no particular meaning is also recorded using concave-convex recording marks between one set of disc management information and sub information management information and the other set of disc management information and sub information management information. Although the dummy information is recorded in the fourth embodiment, the invention is not particularly intended to be limited thereto. Alternatively, other information such as management information other than the disc management information and the sub information management information, or equipment nullification information for eliminating illegal devices, may be recorded.

As long as concave-convex recording marks are formed continuously, any information, either dummy information or non-dummy information, may be recorded between one set of disc management information and sub information management information and the other set of disc management information and sub information management information in the lead-in area 301.

On the outer circumference side of the location where the sub information management information 306 is recorded, scrambled disc identification information 307 is recorded as the second sub information. On the outer circumference side of the location where the disc identification information 307 is recorded, scrambled stamper unique information 308 is further recorded as the second sub information. The second sub information is recorded by irradiating the reflection film covering the concave-convex recording marks with laser light and changing the reflectance of the reflection film. Thus, the sub information management information and the second sub information are recorded in the area (lead-in area 301) where the second sub information is recorded.

Although the second sub information is recorded in the lead-in area 301 in the fourth embodiment, the invention is not particularly intended to be limited thereto, and the second sub information may be recorded in the user data area 302 or the lead-out area 303.

On the outer circumference side of the location where the stamper unique information 308 is recorded, scrambled encryption key information 309 is recorded as first sub information.

In the fourth embodiment, the encryption key information recorded as the first sub information is necessary to decrypt encrypted content information. Since the encryption key information has been scrambled, the stamper unique information recorded as the second sub information is also necessary to descramble the encryption key information. Similarly, since the stamper unique information has been scrambled, the disc identification information is also necessary to descramble the stamper unique information. Similarly, since the disc identification information has been scrambled, the scrambling initial value of disc identification information described in the sub information management information is also necessary to descramble the disc identification information.

Accordingly, the information reproducing device according to the fourth embodiment needs to sequentially read out the sub information management information, the disc identification information, the stamper unique information, and the encryption key information at the time of reproduction.

The optical disc 300 according to the fourth embodiment has recorded thereon the sub information management information, the disc identification information, the stamper unique information, and the encryption key information in sequential order from the inner circumference side of the optical disc 300 as shown in FIG. 25. This minimizes the movement of an optical head at the time of reading out the information, thus enabling high-speed access.

Next is a further detailed description of the recording form of the second sub information according to the fourth embodiment.

Figure 26:
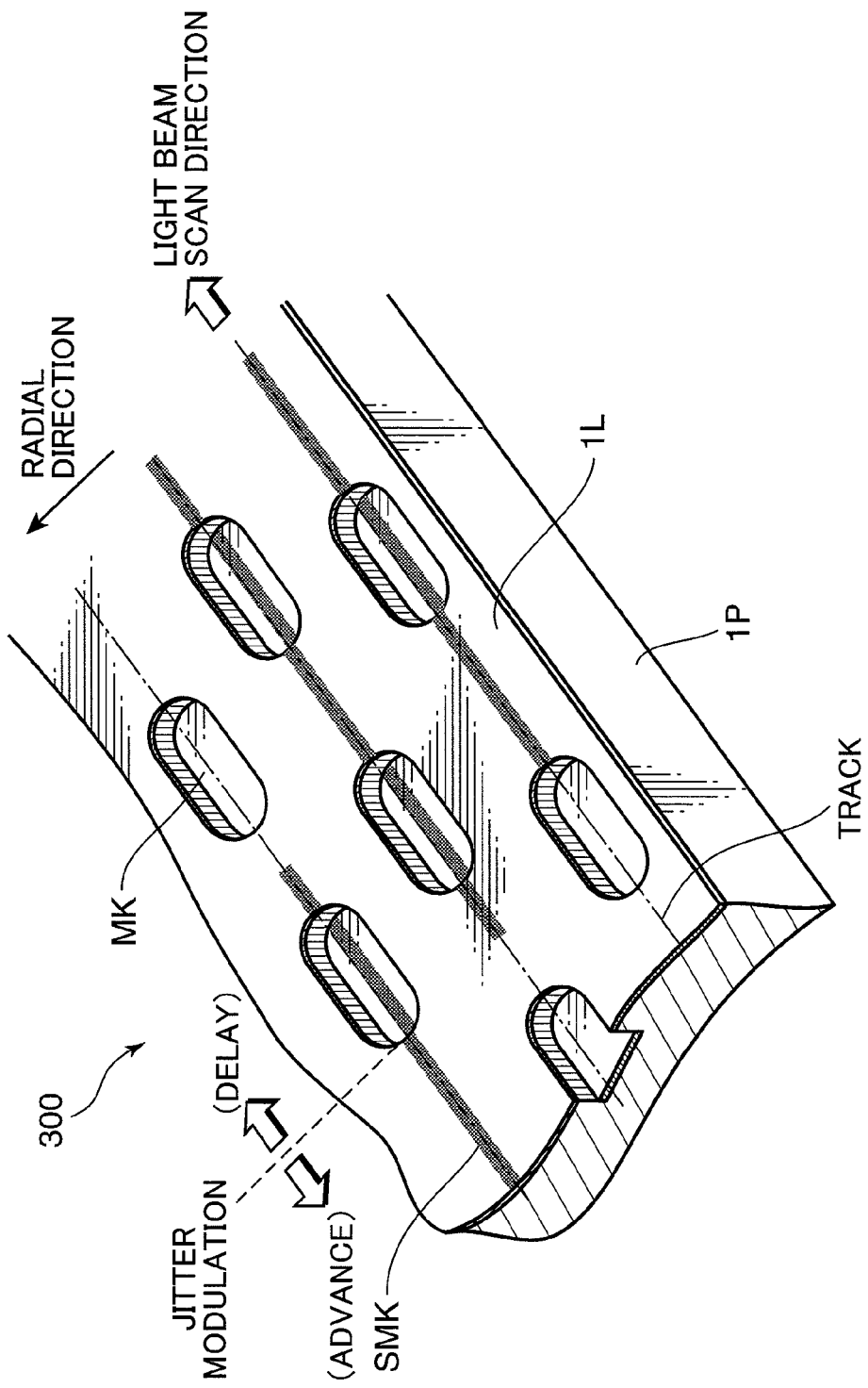
FIG. 26 is a conceptual diagram showing a structure of the optical disc in the fourth embodiment of the invention.

FIG. 26 is a conceptual diagram showing the structure of an optical disc according to the fourth embodiment of the invention.

The optical disc 300 according to the fourth embodiment is constituted by an optical disc substrate 1P with concave-convex recording marks MK transferred from a stamper, the concave-convex recording marks MK where main information such as content information has been recorded, a reflection film 1L whose reflectance will change by laser irradiation, and additional marks SMK where second sub information has been recorded by changing the reflectance of the reflection film 1L by laser irradiation after formation of the optical disc.

The optical disc substrate 1P is made of, for example, a polycarbonate resin and has the concave-convex recording marks MK transferred from a stamper.

The concave-convex recording marks MK are transferred from a stamper and has mainly recorded therein content information, disc management information, and sub information management information to be recorded on the optical disc 300. The concave-convex recording marks MK are also formed in the same manner as ordinary read-only media such as DVD-ROMs and Blu-ray ROMs and has recorded therein information that has been modulated by the 8-16 or 17pp modulation method.

The reflection film 1L is formed by vapor deposition on the optical disc substrate 1P to which the concave-convex recording marks MK have been transferred, and its reflectance will be changed by the application of laser light with certain or higher intensity. The reflection film 1L is constituted from a write-once film whose reflectance is irreversibly changed by the application of laser light with certain or higher intensity. In the case of ordinary read-only media, a film of aluminum or silver material is employed as a reflection film. The write-once film is also desirably an L to H (low to high) film whose reflectance will be increased by the application of laser light with certain or higher intensity. This is because the reflectance of an ordinary metal reflection film of read-only media will be degraded by the application of laser light with certain or higher intensity. Thus, the intentional use of an L to H film makes it difficult to copy the additional marks SMK that have been recorded by increasing the reflectance, to ordinary read-only media. This dramatically improves resistance against illegal copying in cases where the additional marks SMK are used to record copyright protection information or other information.

The optical disc 300 is formed by transferring the concave-convex recording marks MK to the optical disc substrate 1P, forming the reflection film 1L by vapor deposition, and additionally forming a protection film thereon. The additional marks SMK are formed after the formation of the optical disc 300 by performing tracking control on the concave-convex recording marks MK, applying laser light almost immediately above the tracks of the concave-convex recording marks, and increasing the reflectance of the reflection film 1L made of an L to H film. The second sub information is recorded using the additional marks SMK.

In the lead-in area on the inner circumference side of the optical disc 300, information that can be reproduced by the application of laser light, such as management information, copyright information, or physical property information, is recorded.

After the optical disc has been formed by transferring such information as management information, copyright information, or physical property information, the reflectance of the reflection film 1L is locally changed by the application of laser light. Thus, the additional marks SMK are formed on the optical disc 300, and disc identification information and stamper unique information are superimposed and recorded as second sub information.

The additional marks SMK shown in FIG. 26 are formed by applying laser on the tracks where the concave-convex recording marks MK are formed. It is desirable that variations in the level of reflected light caused by recording the additional marks SMK are less than or equal to half of the difference in the level of reflected light between the concave-convex recording marks MK and a mirror portion other than the concave-convex recording marks MK. This avoids erroneously reproducing the edge location of the concave-convex recording marks MK of a reproduction signal, thus giving no influence on the accuracy of reproduction of the concave-convex recording marks MK.

It is also desirable that the recording band of the additional marks SMK is lower than the recording band of the longest mark of the concave-convex recording marks MK. This enables signals based on the concave-convex recording marks and signals based on the additional marks to be separated by a band limiting circuit (filter) at the time of reproduction, thus ensuring the accuracy of reproduction of those marks.

Next is a further detailed description of the recording form of the first sub information according to the fourth embodiment.

As shown in FIG. 26, the positions of two edges of concave-convex recording marks MK formed in the direction of tracks in cases where scrambled encryption key information is recorded are displaced at phase-advanced (or -delayed) positions by the amount of displacement equivalent to a certain and very short amount of time, with respect to the edge positions of concave-convex recording marks MK formed in cases where scrambled encryption key information is not recorded.

The edge positions of concave-convex recording marks MK formed in ordinary cases where scrambled encryption key information is not recorded are also randomly formed at slightly advanced or delayed positions due to error components. Such variations in the edge positions are referred to as "jitter". Accordingly, even if the first sub information is recorded as in the case of the optical disc 300 according to the fourth embodiment, it is impossible to distinguish the first sub information from ordinary jitter unless the displacement rule for the edge positions is known, and thus the first sub information can be recorded as information that is difficult to be discovered and to be copied illegally.

Next is a further detailed description of a second sub information recording device for recording second sub information according to the fourth embodiment.

Figure 27:
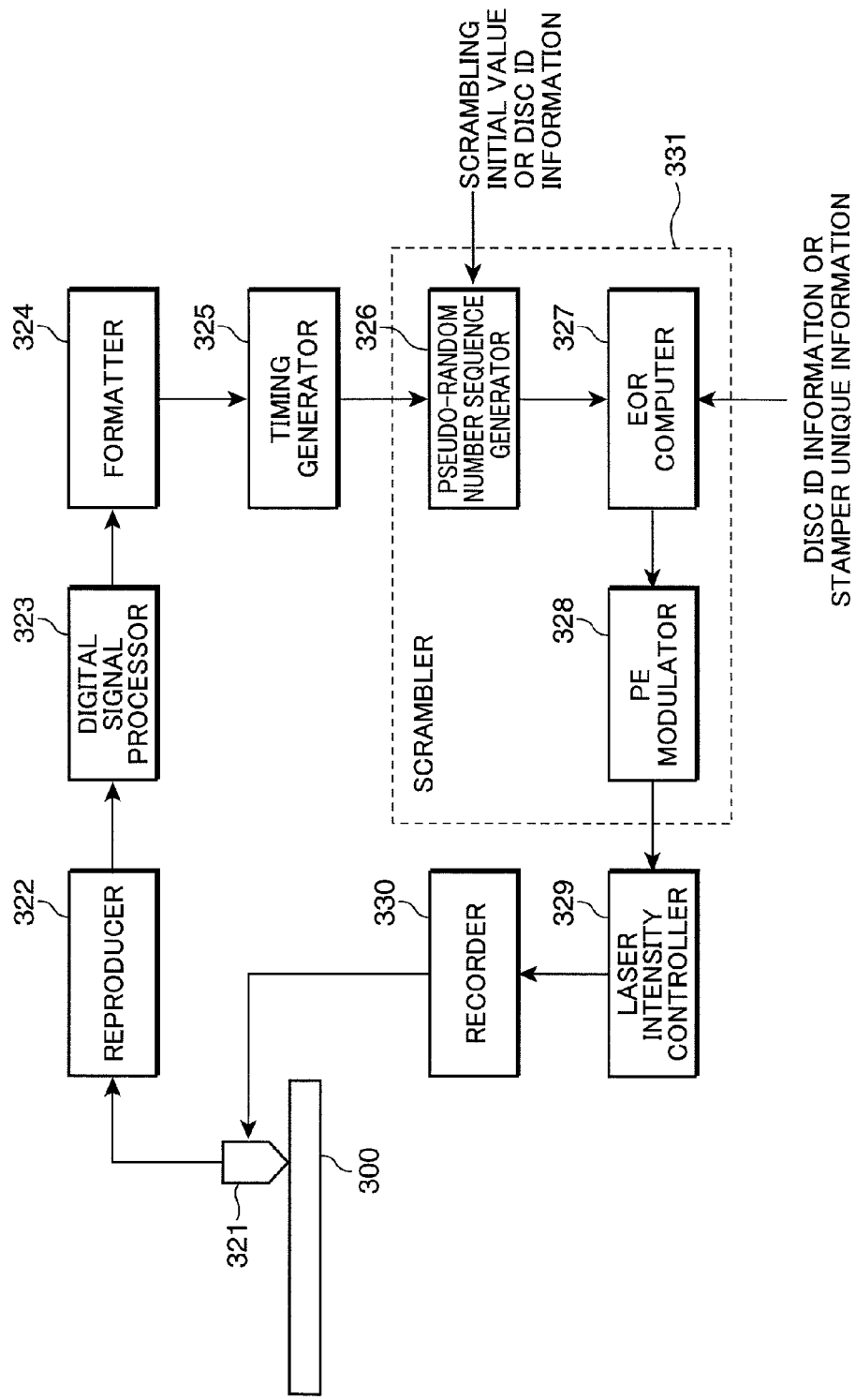
FIG. 27 is a block diagram showing an arrangement of a second sub information recording device in the fourth embodiment of the invention.

FIG. 27 is a block diagram showing an arrangement of the second sub information recording device according to the fourth embodiment of the invention. The second sub information recording device shown in FIG. 27 additionally records second sub information on an optical disc 300 that is manufactured by transfer from a stamper and has main information recorded thereon. Note that the second sub information recording device is equivalent to the information recording device 43 shown in FIG. 22.

The second sub information recording device includes an optical head 321, a reproducer 322, a digital signal processor 323, a formatter 324, a timing generator 325, a pseudo-random number sequence generator 326, an EOR computer 327, a PE modulator 328, a laser intensity controller 329, and a recorder 330. The pseudo-random number sequence generator 326, the EOR computer 327, and the PE modulator 328 constitute a scrambler 331.

The optical head 321 is an optical pickup that focuses laser beams on concave-convex recording marks on a rotating optical disc 300, generates an analog reproduction signal indicating the edge positions of the concave-convex recording marks to be modulated, based on reflected light from the concave-convex recording marks, and outputs the analog reproduction signal to the reproducer 322.

The reproducer 322 converts the analog reproduction signal input from the optical head 321 into a digital reproduction signal by waveform equalization or shaping for example, and outputs the digital reproduction signal to the digital signal processor 323.

The digital signal processor 323 extracts a clock signal that synchronizes with the digital reproduction signal input from the reproducer 322, generates a reproduction signal synchronized with the extracted clock signal, and outputs the reproduction signal to the formatter 324.

The formatter 324 demodulates the modulated reproduction signal and detects address information assigned to each predetermined unit (sector). The detected address information is output to the timing generator 325.

The timing generator 325 generates a timing signal for recording the second sub information based on the address information input from the formatter 324, and outputs the timing signal to the pseudo-random number sequence generator 326.

The pseudo-random number sequence generator 326 is an M-sequence generator including a general shift register. The pseudo-random number sequence generator 326 generates pseudo-random number sequences by presetting a scrambling initial value included in the sub information management information based on the timing signal input from the timing generator 325, and outputs the generated sequence to the EOR computer 327.

The pseudo-random number sequence generator 326 also generates pseudo-random number sequences by presetting the disc identification information as an initial value based on the timing signal input from the timing generator 325, and outputs the generated sequence to the EOR computer 327.

The EOR computer 327 is a general exclusive OR gate. The EOR computer 327 calculates an exclusive OR of the pseudo-random number sequences input from the pseudo-random number sequence generator 326 and the disc identification information to be recorded as second sub information, and outputs the calculated result to the PE modulator 328.

The EOR computer 327 also calculates an exclusive OR of the pseudo-random number sequences input from the pseudo-random number sequence generator 326 and the stamper unique information to be recorded as second sub information, and outputs the calculated result to the PE modulator 328.

The PE modulator 328 performs PE (phase encoding) modulation on the output signal from the EOR computer 327 and outputs the PE-modulated signal to the laser intensity controller 329.

The laser intensity controller 329 generates recording pulses for controlling the timing of laser irradiation, based on the PE-modulated signal obtained by the PE modulator 328.

The recorder 330 controls the intensity of laser light emitted from a laser light source of the optical head 321 and the timing of light emission, based on the recording pulses input from the laser intensity controller 329. The optical head 321 additionally records the scrambled disc identification information and stamper unique information as second sub information by irradiating the optical disc 300 with laser light and changing the reflectance of the reflection film on the concave-convex recording marks.

Next is a further detailed description of a first sub information recording device for recording first sub information according to the fourth embodiment.

Figure 28:
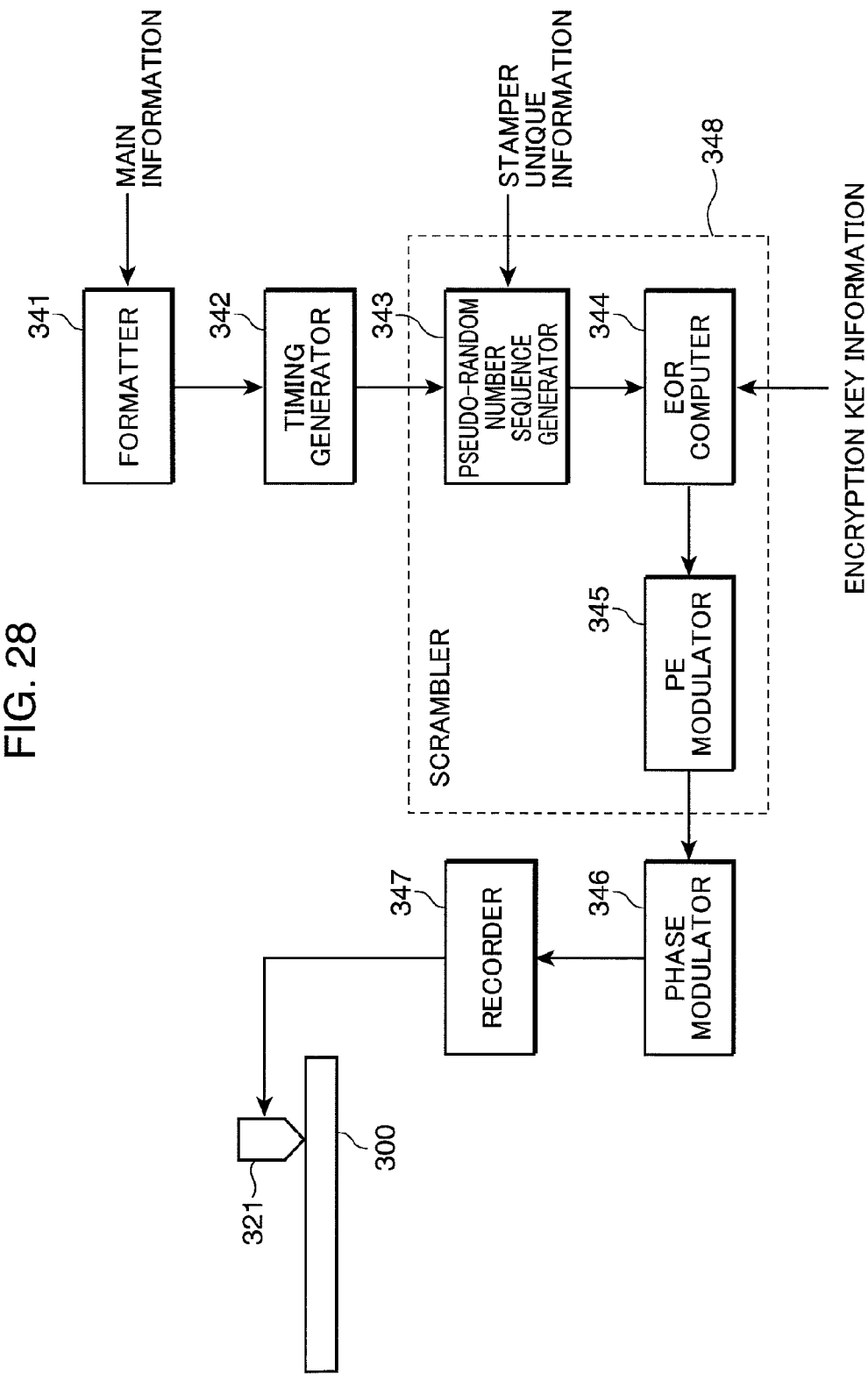
FIG. 28 is a block diagram showing an arrangement of a first sub information recording device in the fourth embodiment of the invention.

FIG. 28 is a block diagram showing an arrangement of the first sub information recording device according to the fourth embodiment of the invention. The first sub information recording device shown in FIG. 28 records first sub information together with main information on a stamper (master optical disc). Note that the first sub information recording device is equivalent to part (the scrambler 49 and the first sub information recorder 50) of the mastering device 42 shown in FIG. 22.

The first sub information recording device includes an optical head 321, a formatter 341, a timing generator 342, a pseudo-random number sequence generator 343, an EOR computer 344, a PE modulator 345, a phase modulator 346, and a recorder 347. The pseudo-random number sequence generator 343, the EOR computer 344, and the PE modulator 345 constitute a scrambler 348.

The formatter 341 modulates main information to be recorded and assigns address information to each predetermined unit (sector) so as to generate a recording signal. The assigned address information is output to the timing generator 342.

The timing generator 342 generates a timing signal used to record the first sub information based on the address information that has been input from the formatter 341, and outputs the timing signal to the pseudo-random number sequence generator 343.

The pseudo-random number sequence generator 343 is an M-sequence generator including a general shift register. The pseudo-random number sequence generator 343 generates pseudo-random number sequences by presetting stamper unique information as an initial value based on the timing signal input from the timing generator 342, and outputs the generated sequence to the EOR computer 344.

The EOR computer 344 is a general exclusive OR gate. The EOR computer 344 calculates an exclusive OR of the pseudo-random number sequences input from the pseudo-random number sequence generator 343 and the encryption key information to be recorded as first sub information, and outputs the calculated result to the PE modulator 345.

The PE modulator 345 performs PE modulation on the output signal from the EOR computer 344 and outputs the PE-modulated signal to the phase modulator 346.

The phase modulator 346 generates recording pulses for controlling the timing of laser irradiation according to the recording signal generated by the formatter 341. The phase modulator 346 also performs phase modulation on the recording pulses according to the PE-modulated signal from the PE modulator 345, so as to provide control such as advancing (or delaying) the edges of concave-convex recording marks.

The recorder 347 controls the intensity of laser light emitted from a laser light source of the optical head 321 and the timing of light emission, based on the recording pulses generated by the phase modulator 346.

The optical head 321 records the main information and the first sub information by irradiating the master optical disc with laser light based on the control signal input from the recorder 347.

Next is a further detailed description of a second sub information reproducing device for reproducing second sub information according to the fourth embodiment.

Figure 29:
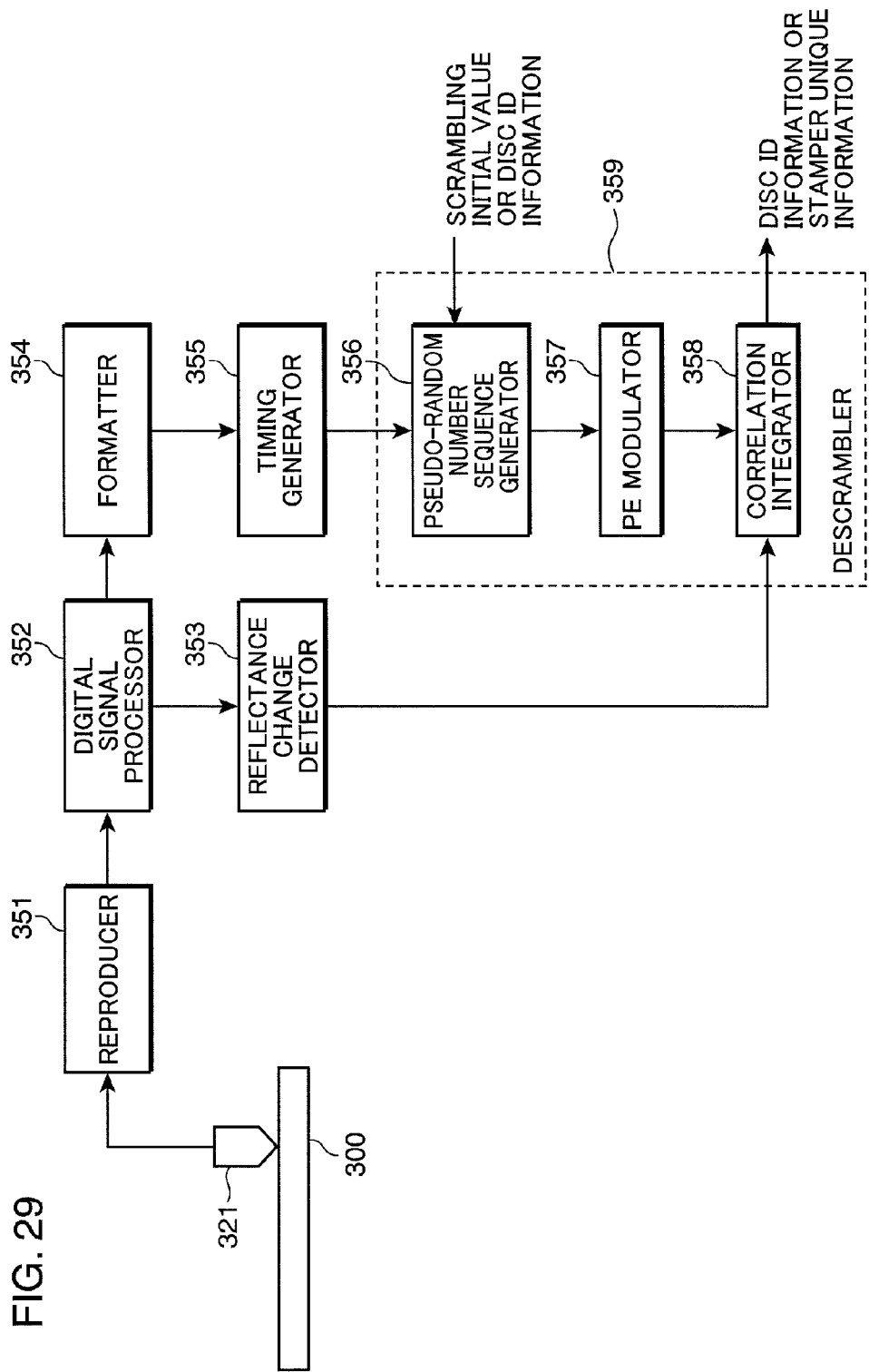
FIG. 29 is a block diagram showing an arrangement of a second sub information reproducing device in the fourth embodiment of the invention.

FIG. 29 is a block diagram showing an arrangement of the second sub information reproducing device according to the fourth embodiment of the invention. The second sub information reproducing device shown in FIG. 29 reproduces the second sub information that has been recorded by varying the reflectance of the reflection film on concave-convex recording marks. Note that the second sub information reproducing device is equivalent to part (the medium identification information reproducer 57, the descrambler 58, the medium unique information reproducer 59, and the descrambler 60) of the information reproducing device 44 shown in FIG. 22.

The second sub information reproducing device includes an optical head 321, a reproducer 351, a digital signal processor 352, a reflectance change detector 353, a formatter 354, a timing generator 355, a pseudo-random number sequence generator 356, a PE modulator 357, and a correlation integrator 358. The pseudo-random number sequence generator 356, the PE modulator 357, and the correlation integrator 358 constitute a descrambler 359.

The optical head 321 is an optical pickup that focuses laser beams on concave-convex recording marks on a rotating optical disc 300, generates an analog reproduction signal indicating the edge positions of the concave-convex recording marks to be modulated, based on reflected light from the concave-convex recording marks, and outputs the analog reproduction signal to the reproducer 351.

The reproducer 351 converts the analog reproduction signal input from the optical head 321 into a digital reproduction signal by waveform equalization or shaping for example, and outputs the digital reproduction signal to the digital signal processor 352.

The digital signal processor 352 extracts a clock signal that synchronizes with the digital reproduction signal input from the reproducer 351, generates a reproduction signal synchronized with the extracted clock signal, and outputs the generated reproduction signal to the formatter 354.

The formatter 354 demodulates the modulated reproduction signal and detects address information assigned to each predetermined unit (sector). The detected address information is output to the timing generator 355.

The timing generator 355 generates a timing signal for reproducing second sub information based on the address information input from the formatter 354, and outputs the timing signal to the pseudo-random number sequence generator 356.

The pseudo-random number sequence generator 356 is an M-sequence generator including a general shift register. The pseudo-random number sequence generator 356 generates pseudo-random number sequences by presetting a scrambling initial value included in sub information management information based on the timing signal input from the timing generator 355, and outputs the generated sequence to the PE modulator 357.

The pseudo-random number sequence generator 356 also generates pseudo-random number sequences by presetting disc identification information as an initial value based on the timing signal input from the timing generator 355, and outputs the generated sequence to the PE modulator 357.

The PE modulator 357 performs PE modulation on the pseudo-random number sequences input from the pseudo-random number sequence generator 356 and outputs the PE-modulated signal to the correlation integrator 358.

The reflectance change detector 353 includes a low-frequency pass filter that receives an input of the digital reproduction signal from the digital signal processor 352 and is capable of extracting signals in the recording band of the second sub information. The reflectance change detector 353 filters digital reproduction signals for concave-convex recording marks so as to extract second sub information that has been recorded by varying the reflectance of the reflection film, and outputs the second sub information to the correlation integrator 358.

The correlation integrator 358 integrates the correlation between the digital reproduction signal filtered by the reflectance change detector 353 and the PE-modulated pseudo-random number sequences obtained by the PE modulator 357. Specifically, the correlation integrator 358 includes an up-down counter. The correlation integrator 358 increments the counter by 1 if the filtered digital reproduction signal and the PE-modulated pseudo-random number sequences are positive with respect to each other, whereas it decrements the counter by 1 if the filtered digital reproduction signal and the PE modulated pseudo-random number sequences are negative with respect to each other. Accordingly, if the filtered digital reproduction signal and the PE-modulated pseudo-random number sequences are positively correlated, the counter increases monotonously, and if they are negatively correlated, the counter decreases monotonously. The correlation integrator 358 detects a bit sequence obtained by repeatedly determining the correlation in the bit recording interval of the second sub information as stamper unique information, and outputs the stamper unique information to a first sub information reproducing device which will be described later.

The correlation integrator 358 also detects a bit sequence obtained by repeatedly determining the correlation in the bit recording interval of the second sub information as the disc identification information, and outputs the disc identification information to the pseudo-random number sequence generator 356.

Next is a further detailed description of a first sub information reproducing device for reproducing first sub information according to the fourth embodiment.

Figure 30:
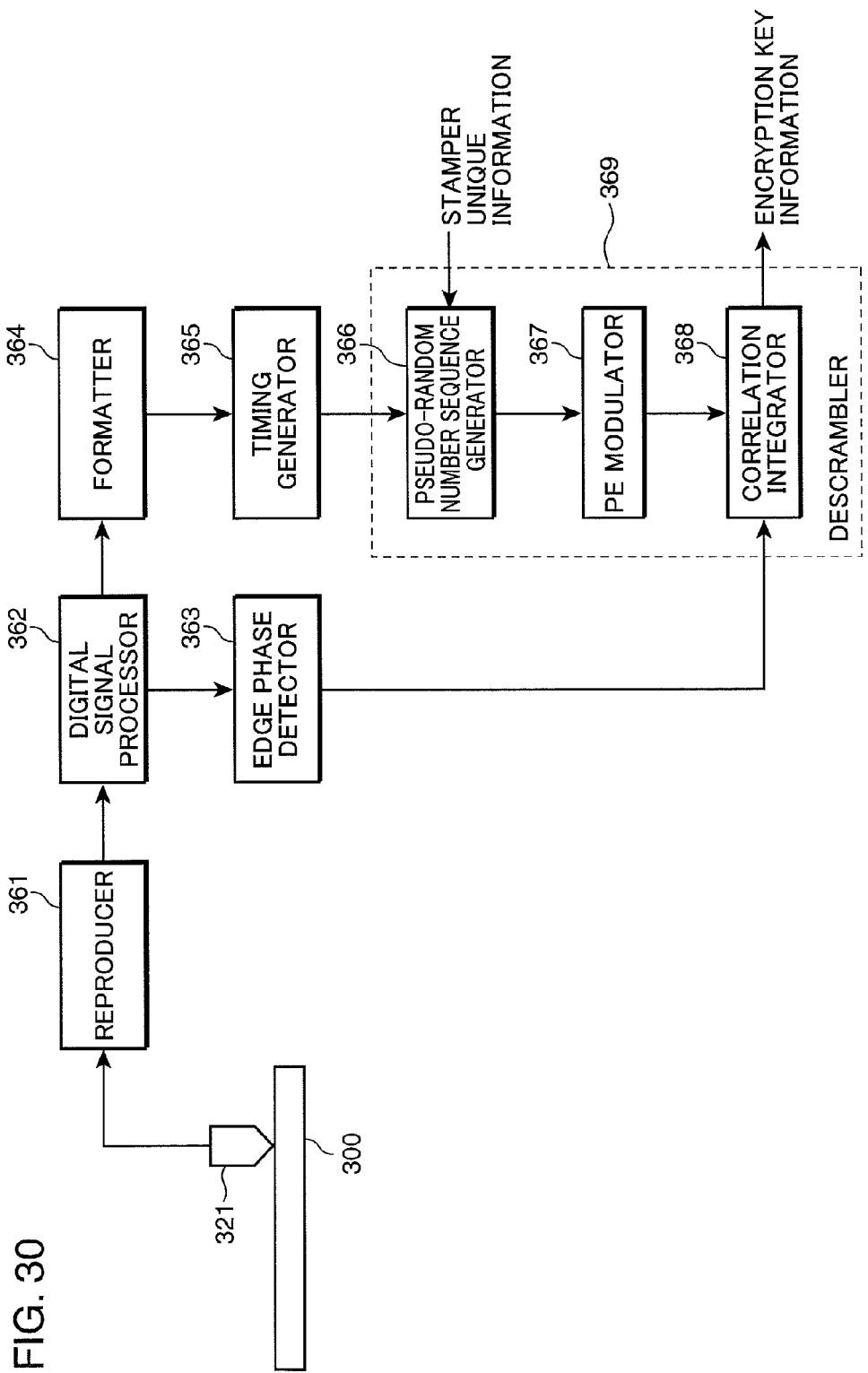
FIG. 30 is a block diagram showing an arrangement of a first sub information reproducing device in the fourth embodiment of the invention.
Figure 31:
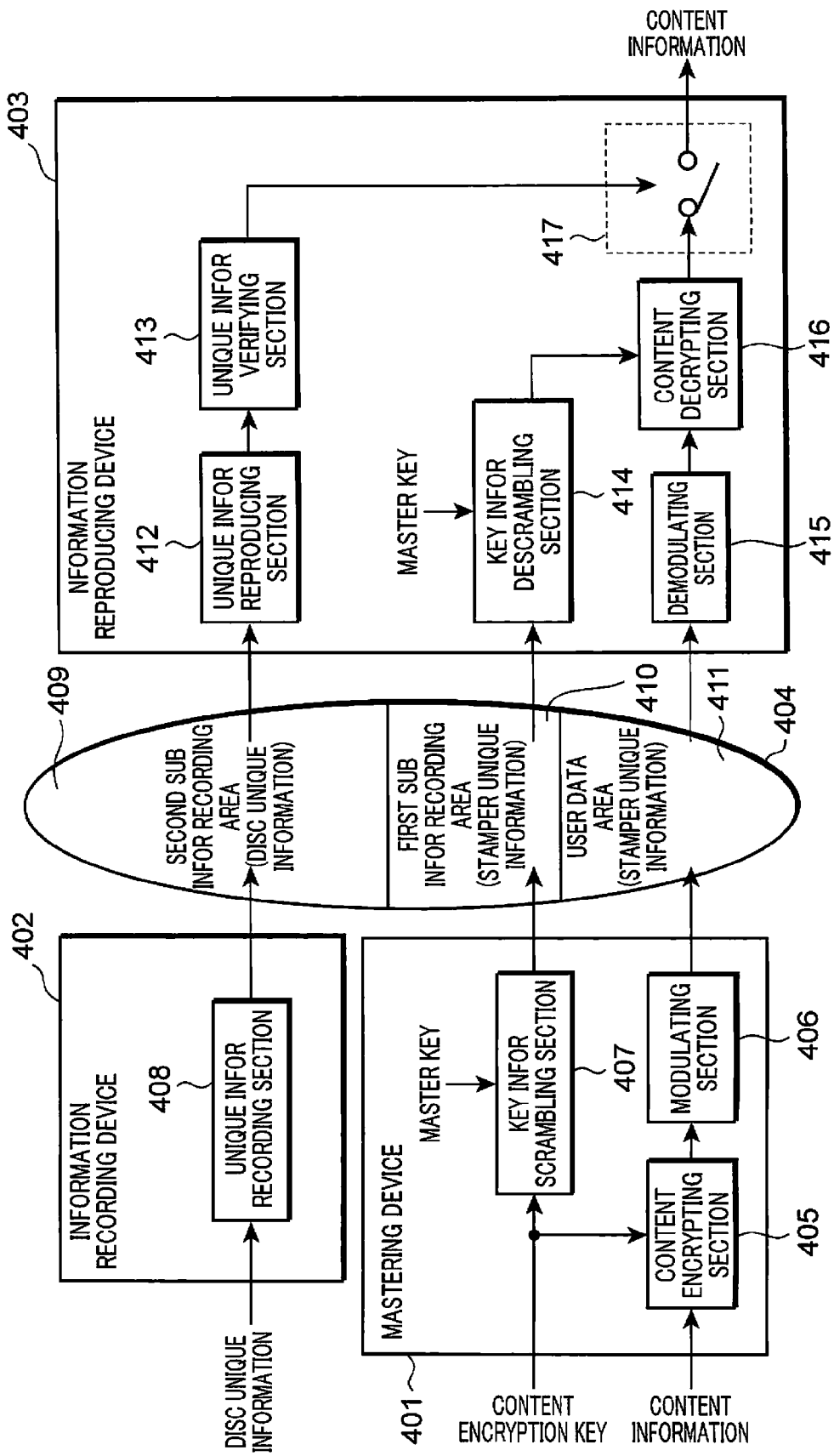
FIG. 31 is a block diagram showing an arrangement of a conventional information recording and reproducing system.

FIG. 30 is a block diagram showing an arrangement of the first sub information reproducing device according to the fourth embodiment of the invention. The first sub information reproducing device shown in FIG. 30 reproduces first sub information that has been recorded by modulating the phases of the edges of concave-convex recording marks, based on the stamper unique information reproduced by the second sub information reproducing device. Note that the first sub information reproducing device is equivalent to part (the first sub information reproducer 61 and the descrambler 62) of the information reproducing device 44 shown in FIG. 22.

The first sub information reproducing device includes an optical head 321, a reproducer 361, a digital signal processor 362, an edge phase detector 363, a formatter 364, a timing generator 365, a pseudo-random number sequence generator 366, a PE modulator 367, and a correlation integrator 368. The pseudo-random number sequence generator 366, the PE modulator 367, and the correlation integrator 368 constitute a descrambler 369.

The optical head 321 is an optical pickup that focuses laser beams on concave-convex recording marks on a rotating optical disc 300, generates an analog reproduction signal indicating the edge positions of the concave-convex recording marks to be modulated, based on reflected light from the concave-convex recording marks, and outputs the analog reproduction signal to the reproducer 361.

The reproducer 361 converts the analog reproduction signal input from the optical head 321 into a digital reproduction signal by waveform equalization or shaping for example, and outputs the digital reproduction signal to the digital signal processor 362.

The digital signal processor 362 extracts a clock signal that synchronizes with the digital reproduction signal input from the reproducer 361, generates a reproduction signal synchronized with the extracted clock signal, and outputs the generated reproduction signal to the formatter 364.

The formatter 364 demodulates the modulated reproduction signal and detects address information assigned to each predetermined unit (sector). The detected address information is output to the timing generator 365.

The timing generator 365 generates a timing signal for reproducing second sub information based on the address information input from the formatter 364 and outputs the timing signal to the pseudo-random number sequence generator 366.

The pseudo-random number sequence generator 366 is an M-sequence generator including a general shift register. The pseudo-random number sequence generator 366 generates pseudo-random number sequences by presetting the stamper unique information reproduced by the second sub information reproducing device as an initial value based on the timing signal input from the timing generator 365, and outputs the generated sequence to the PE modulator 367.

The PE modulator 367 performs PE modulation on the pseudo-random number sequences input from the pseudo-random number sequence generator 366 and outputs the PE-modulated signal to the correlation integrator 368.

The edge phase detector 363 generates an edge phase signal indicating either advance or delay of the edges of concave-convex recording marks with reference to the clock signal extracted by the digital signal processor 362, and outputs the edge phase signal to the correlation integrator 368.

The correlation integrator 368 integrates the correlation between the edge phase signal generated by the edge phase detector 363 and the PE-modulated pseudo-random number sequences obtained by the PE modulator 367. Specifically, the correlation integrator 368 includes an up-down counter. The correlation integrator 368 increments the counter by 1 if the edge phase signal generated by the edge phase detector 363 and the PE-modulated pseudo-random number sequences obtained by the PE modulator 367 are positive with respect to each other, whereas it decrements the counter by 1 if the generated edge phase signal and the PE-modulate pseudo-random number sequences are negative with respective to each other. Accordingly, if the edge phase signal generated by the edge phase detector 363 and the PE-modulated pseudo-random number sequences obtained by the PE modulator 367 are positively correlated, the counter increases monotonously, and if they are negatively correlated, the counter decreases monotonously. The correlation integrator 368 detects a bit sequence obtained by repeatedly determining the correlation between the edge phase signal and the pseudo-random number sequences in the bit recording interval of the second sub information, as encryption key information for decrypting content information. Encrypted content information is reproduced by being decrypted using the encryption key information detected by the correlation integrator 368.

Note that the difference between the second sub information reproducing device and the first sub information reproducing device in the fourth embodiment is whether the device includes the reflectance change detector 353 or the edge phase detector 363. It is thus desirable that both the second sub information reproducing device and the first sub information reproducing device are implemented in the same device so that the second sub information and the first sub information are reproduced by the same device.

The aforementioned embodiments mainly include the features having the following arrangements.

An information recording device according to an aspect of the invention is an information recording device for recording information in information recording media manufactured by using a stamper. The information recording device includes a second sub information generating section that generates second sub information by data-converting stamper unique information common for each stamper, based on medium unique information that differs for each of the information recording media having recorded therein in advance main information and first sub information that is obtained by data-converting reproduction permitting information necessary for reproducing the main information based on the stamper unique information, and a second sub information recording section that records, in each of the information recording media, the second sub information generated by the second sub information generating section in a form different from the forms of the main information and the first sub information.

With the arrangement described above, the second sub information is generated by data-converting the stamper unique information common for each stamper, based on the medium unique information that differs for each information recording medium having recorded therein in advance the main information and the first sub information that is obtained by data-converting the reproduction permitting information necessary for reproducing the main information based on the stamper unique information. The generated second sub information is then recorded in an information recording medium in a form different form the forms of the main information and the first sub information.

It is thus possible to ensure copyright protection of the main information because the main information cannot be reproduced unless the second sub information that differs for each information recording medium is reproduced. Even though information recording media are manufactured by transfer from the same stamper, the second sub information that differs for each information recording medium needs to be read out, which makes illegal analysis of information recording media more difficult than in the case where information common to each information recording medium is read out, thus preventing illegal access to the recorded main information.

Preferably, in the information recording device described above, each of the information recording media includes concave-convex recording marks formed in accordance with the main information and a reflection film formed on the concave-convex recording marks, and the second sub information recording section records the second sub information on each of the information recording media by applying laser light with an interval longer than a longest mark of the concave-convex recording marks and changing the reflectance of the reflection film.

With the arrangement described above, the information recording medium includes concave-convex recording marks formed in accordance with the main information and a reflection film formed on the concave-convex recording marks. The second sub information is recorded on each of the information recording media by applying laser light with an interval longer than the longest mark of the concave-convex recording marks and changing the reflectance of the reflection film.

It is thus possible to record the second sub information without decreasing the readout accuracy of the main information and to prevent illegal copying of information recording media.

Preferably, in the information recording device described above, the medium unique information includes medium identification information for identifying each of the information recording media, and the information recording device further includes a medium identification information recording section that records the medium identification information in each of the information recording media by irradiating each of the information recording media with laser light and changing a reflectance of the reflection film.

With the arrangement described above, the medium unique information includes the medium identification information for identifying the information recording media, and the medium identification information is recorded in each of the information recording media by irradiating each of the information recording media with laser light and changing the reflectance of the reflection film.

It is thus possible to data-convert the stamper unique information based on the medium identification information for identifying information recording media, and to ensure copyright protection of the main information because unless the medium identification information is obtained, the stamper unique information cannot be obtained and accordingly the main information cannot be reproduced. It is also possible to record the medium identification information without decreasing the readout accuracy of the main information and to prevent illegal copying of information recording media.

Also preferably, in the information recording device described above, the second sub information generating section generates the second sub information by encrypting the stamper unique information by using the medium unique information as an encryption key.

With the arrangement described above, it is possible to ensure concealment of the stamper unique information since the second sub information is generated by encrypting the stamper unique information with the medium unique information as an encryption key.

An information reproducing device according to another aspect of the invention is an information reproducing device for reproducing information from information recording media manufactured by using a stamper. The information reproducing device includes a main information reproducing section that reproduces main information, a first sub information reproducing section that reproduces first sub information obtained by data-converting reproduction permitting information necessary for reproducing the main information, based on stamper unique information common for each stamper, a second sub information reproducing section that reproduces second sub information obtained by data-converting the stamper unique information, based on medium unique information that differs for each of the information recording media, a stamper unique information generating section that generates the stamper unique information by data-converting the second sub information reproduced by the second sub information reproducing section, based on the medium unique information, and a reproduction permitting information extracting section that extracts the reproduction permitting information by data-converting the first sub information reproduced by the first sub information reproducing section, based on the stamper unique information generated by the stamper unique information generating section.

The arrangement described above reproduces the main information and the first sub information that is obtained by data-converting the reproduction permitting information necessary for reproducing the main information based on the stamper unique information common for each stamper. The arrangement also reproduces the second sub information that is obtained by data-converting the stamper unique information based on the medium unique information that differs for each of the information recording media. Then, the stamper unique information is generated by data-converting the reproduced second sub information based on the medium unique information, and the reproduction permitting information is extracted by data-converting the reproduced first sub information based on the generated stamper unique information.

It is thus possible to ensure copyright protection of the main information because the main information cannot be reproduced unless the second sub information that differs for each information recording medium is reproduced. In addition, even though information recording media are manufactured by transfer from the same stamper, the second sub information that differs for each information recording medium needs to be read out, which makes illegal analysis of information recording media more difficult than in the case where information common to each information recording medium is read out, thus preventing illegal access to the recorded main information.

Also preferably, in the information reproducing device described above, each of the information recording media includes concave-convex recording marks formed in accordance with the main information and a reflection film formed on the concave-convex recording marks, the main information reproducing section reproduces the main information based on reflected light from the concave-convex recording marks by irradiating the concave-convex recording marks formed on each of the information recording media with laser light, and the second sub information reproducing section reproduces the second sub information by detecting an intensity change of reflected light from the reflection film.

With the arrangement described above, the information recording medium includes concave-convex recording marks formed in accordance with the main information and a reflection film formed on the concave-convex recording marks. The main information is reproduced based on the reflected light from the concave-convex recording marks by irradiating the concave-convex recording marks formed on each of the information recording media with laser light. The second sub information is reproduced by detecting an intensity change of the reflected light from the reflection film.

It is thus possible to record the second sub information without decreasing the readout accuracy of the main information and to prevent illegal copying of information recording media.

Also preferably, in the information reproducing device described above, the first sub information reproducing section reproduces the first sub information by detecting at least one of displacement of the concave-convex recording marks, deformation of the concave-convex recording marks, and modification of a predetermined pattern of data to be recorded by the concave-convex recording marks, based on the reflected light from the concave-convex recording marks.

With the arrangement described above, the first sub information is reproduced by detecting at least one of displacement of the concave-convex recording marks, deformation of the concave-convex recording marks, and modification of a predetermined pattern of data to be recorded using the concave-convex recording marks, based on the reflected light from the concave-convex recording marks. This suppresses easy copying of the first sub information, thus preventing illegal copying of information recording media.

Also preferably, in the information reproducing device described above, the medium unique information includes medium identification information for identifying the information recording media, the information reproducing device further includes a medium identification information reproducing section that reproduces the medium identification information by irradiating each of the information recording media with laser light, and the stamper unique information generating section generates the stamper unique information by data-converting the second sub information reproduced by the second sub information reproducing section, based on the medium identification information reproduced by the medium identification information reproducing section.

With the arrangement described above, the medium unique information includes the medium identification information for identifying the information recording media, and the medium identification information is reproduced by irradiating each of the information recording media with laser light. Then, the stamper unique information is generated by data-converting the reproduced second sub information based on the reproduced medium identification information.

It is thus possible to data-convert the second sub information based on the medium identification information for identifying each information recording medium and to ensure copyright protection of the main information since unless the medium identification information is obtained, the stamper unique information cannot be obtained and accordingly the main information cannot be reproduced.

Also preferably, in the information reproducing device described above, the medium identification information reproducing section reproduces the medium identification information by detecting an intensity change of reflected light from the reflection film.

With the arrangement described above, the medium identification information is reproduced by detecting an intensity change of reflected light from the reflection film whose recording band differs from the recording band of the concave-convex recording marks. It is thus possible to record the medium identification information without decreasing the readout accuracy of the main information and to prevent illegal copying of information recording media.

Also preferably, in the information reproducing device described above, the stamper unique information generating section generates the stamper unique information by decrypting the second sub information by using the medium unique information as an encryption key, and the reproduction permitting information extracting section extracts the reproduction permitting information by descrambling the scrambled first sub information, based on the stamper unique information generated by the stamper unique information generating section.

With the arrangement described above, the stamper unique information is generated by decrypting the second sub information by using the medium unique information as an encryption key. Also, the reproduction permitting information is extracted by descrambling the scrambled first sub information based on the generated stamper unique information. It is thus possible to ensure concealment of the stamper unique information and of the reproduction permitting information.

An information recording medium according to another aspect of the invention includes a main information recording area where main information is recorded, a first sub information recording area where first sub information is recorded, the first sub information being obtained by data-converting reproduction permitting information necessary for reproducing the main information, based on stamper unique information common for each stamper, and a second sub information recording area where second sub information is recorded, the second sub information being obtained by data-converting the stamper unique information based on medium unique information that differs for each information recording medium. The main information and the first sub information are transferred from a stamper having the main information and the first sub information recorded therein to the information recording medium, and the second sub information is recorded on the information recording medium.

With the arrangement described above, the main information recording area has recorded therein the main information, the first sub information recording area has recorded therein the first sub information that is obtained by data-converting the reproduction permitting information necessary for reproducing the main information based on the stamper unique information common for each stamper, and the second sub information recording area has recorded therein the second sub information that is obtained by data-converting the stamper unique information based on the medium unique information that differs for each information recording medium. The main information and the first sub information are transferred from the stamper having the main information and the first sub information recorded therein to the information recording medium, and the second sub information is recorded on the information recording medium.

It is thus possible to ensure copyright protection of the main information because the main information cannot be reproduced unless the second sub information that differs for each information recording medium is reproduced. In addition, even though information recording media are manufactured by transfer from the same stamper, the second sub information that differs for each information recording medium needs to be read out, which makes illegal analysis of information recording media more difficult than in the case where information common to each information recording medium is read out, thus preventing illegal access to the recorded main information.

Also preferably, in the information recording medium described above, the first sub information recording area has the first sub information recorded therein in a form different from the form of the main information, and the second sub information recording area has the second sub information recorded therein in a form different from the forms of the main information and the first sub information.

With the arrangement described above, the first sub information recording area has the first sub information recorded therein in a form different from the form of the main information, and the second sub information recording area has the second sub information recorded therein in a form different from the forms of the main information and the first sub information.

The main information, the first sub information, and the second sub information are recorded in different forms, which suppresses easy reproduction of the main information, the first sub information, and the second sub information, thus preventing illegal copying of information recording media.

Also preferably, in each of the information recording media described above, the information recording medium includes concave-convex recording marks formed in accordance with the main information and a reflection film formed on the concave-convex recording marks, the first sub information recording area has the first sub information recorded therein by at least one of displacement of the concave-convex recording marks, deformation of the concave-convex recording marks, and modification of a predetermined pattern of data to be recorded using the concave-convex recording marks, and the second sub information recording area has the second sub information recorded therein by changing a reflectance of the reflection film.

With the arrangement described above, the information recording medium includes concave-convex recording marks formed in accordance with the main information and a reflection film formed on the concave-convex recording marks. In the first sub information recording area, the first sub information is recorded by at least one of displacement of the concave-convex recording marks, deformation of the concave-convex recording marks, and modification of a predetermined pattern of data to be recorded using the concave-convex recording marks. In the second sub information recording area, the second sub information is recorded by changing the reflectance of the reflection film. It is thus possible to record the first sub information and the second sub information without decreasing the readout accuracy of the main information and to prevent illegal copying of information recording media.

Also preferably, in the information recording medium described above, the medium unique information includes medium identification information for identifying the information recording medium, the information recording medium further comprises a medium identification information recording area where the medium identification information is recorded, and the second sub information recording area has recorded therein second sub information that is obtained by data-converting the stamper unique information based on the medium identification information.

With the arrangement described above, the medium unique information includes medium identification information for identifying the information recording media, and the medium identification information is recorded in the medium identification information recording area. The second sub information recording area has recorded therein the second sub information that is obtained by data-converting the stamper unique information based on the medium identification information.

It is thus possible to data-convert the stamper unique information based on the medium identification information for identifying each information recording medium, and to ensure copyright protection of the main information because unless the medium identification information is obtained, the stamper unique information cannot be obtained and accordingly the main information cannot be reproduced.

Also preferably, in the information recording medium described above, the medium identification information recording area has the medium identification information recorded therein by irradiating the information recording medium with laser light and changing the reflectance of the reflection film.

With the arrangement described above, in the medium identification information recording area, the medium identification information is recorded by irradiating the information recording medium with laser light and changing the reflectance of the reflection film. It is thus possible to record the medium identification information without decreasing the readout accuracy of the main information and to prevent illegal copying of information recording media.

The embodiments or the examples described in the section of description of embodiments are provided to clarify the technical contents of the invention. The invention should not be construed to be limited to the embodiments or the examples. The invention may be modified in various ways as far as such modifications do not depart from the spirit and the scope of the invention hereinafter defined.

The information recording device, the information reproducing device, and the information recording medium of the invention is operable to configure a system, wherein unless second sub information that differs for each of the information recording media is reproduced, content information is not allowed to be reproduced, even in an information recording medium manufactured by transferring and copying a stamper. Thus, the invention is very useful as a medium for distributing digital copyrighted work having a copy guard function.

The invention claimed is:

1. An information recording device for recording information in information recording media manufactured by using stampers, the information recording device comprising:
 a second sub information generating section that generates second sub information by data-converting stamper unique information common for each stamper, based on medium unique information that differs for each of the information recording media having recorded thereon in advance main information and first sub information that is obtained by data-converting reproduction permitting information necessary for reproducing the main information based on the stamper unique information; and a second sub information recording section that records, in each of the information recording media, the second sub information generated by the second sub information generating section in a form different from forms of the main information and the first sub information, wherein the reproduction permitting information is converted into the first sub information by using the stamper unique information, and the second sub information generating section converts the stamper unique information into the second sub information by using the medium unique information.

2. The information recording device according to claim 1, wherein each of the information recording media includes concave-convex recording marks formed in accordance with the main information, and a reflection film formed on the concave-convex recording marks, and the second sub information recording section records the second sub information on each of the information recording media by applying laser light with an interval longer than a longest mark of the concave-convex recording marks and changing a reflectance of the reflection film.

3. The information recording device according to claim 1, wherein the medium unique information includes medium identification information for identifying the information recording medium, and the information recording device further comprises a medium identification information recording section that records the medium identification information in each of the information recording media by irradiating each of the information recording media with laser light and changing a reflectance of the reflection film.

4. The information recording device according to claim 1, wherein the second sub information generating section generates second sub information by encrypting the stamper unique information by using the medium unique information as an encryption key.

5. An information reproducing device for reproducing information from information recording media manufactured by copying stampers, the information reproducing device comprising:

a main information reproducing section that reproduces main information by irradiating laser light onto concave-convex recording marks formed on the information recording medium, based on an intensity of reflection light from the concave-convex recording marks;

a first sub information reproducing section that reproduces first sub information obtained by data-converting reproduction permitting information necessary for reproducing the main information, based on stamper unique information common for each stamper by detecting at least one of displacement of the concave-convex recording marks, deformation of the concave-convex recording marks, and modification of a predetermined pattern of data to be recorded by the concave-convex recording marks, based on the reflection light from the concave-convex recording marks;

a second sub information reproducing section that reproduces second sub information obtained by data-converting the stamper unique information, based on medium unique information that differs for each of the information recording media by detecting an intensity change of reflection light from a reflection film formed on the concave-convex recording marks and having a reflection light intensity smaller than the reflection light intensity of the concave-convex recording marks;

a medium unique information reproducing section that reproduces the medium unique information by detecting an intensity change of reflection light from the reflection film;

a stamper unique information generating section that generates the stamper unique information by correlation integral between the second sub information reproduced by the second sub information reproducing section, and a correlation sequence to be generated from the medium unique information reproduced by the medium unique information reproducing section; and a reproduction permitting information extracting section that extracts the reproduction permitting information by correlation integral between the first sub information reproduced by the first sub information reproducing section, and a correlation sequence to be generated from the stamper unique information generated by the stamper unique information generating section, wherein the reproduction permitting information is converted into the first sub information by using the stamper unique information, the stamper unique information is converted into the second sub information by using the medium unique information, the stamper unique information generating section generates the stamper unique information from the second sub information by using the medium unique information reproduced by the medium unique information reproducing section, and the reproduction permitting information extracting section extracts the reproduction permitting information from the first sub information by using the stamper unique information generated by the stamper unique information generating section.

6. The information reproducing device according to claim 5, wherein the medium unique information includes medium identification information for identifying the information recording media, the medium unique information reproducing section includes a medium identification information reproducing section that reproduces the medium-identification information by irradiating each of the information recording media with laser light, and the stamper unique information generating section generates the stamper unique information by correlation integral between the second sub information reproduced by the second sub information reproducing section, and a correlation sequence to be generated from the medium identification information reproduced by the medium identification information reproducing section.

7. The information reproducing device according to claim 6, wherein the medium identification information reproducing section reproduces the medium identification information by detecting an intensity change of reflected light from the reflection film.

8. The information reproducing device according to claim 5, wherein the stamper unique information generating section generates the stamper unique information by decrypting the second sub information by using the medium unique information as an encryption key, and the reproduction permitting information extracting section extracts the reproduction permitting information by descrambling the scrambled first sub information, based on the stamper unique information generated by the stamper unique information generating section.

9. An information recording medium, comprising:
a main information recording area where main information is recorded;
a first sub information recording area where first sub information is recorded, the first sub information being obtained by data-converting reproduction permitting information necessary for reproducing the main information, based on stamper unique information common for each stamper; and
a second sub information recording area where second sub information is recorded, the second sub information being obtained by data-converting the stamper unique information, based on medium unique information that differs for each information recording medium, wherein
the main information and the first sub information are transferred from a stamper having the main information and the first sub information recorded thereon to the information recording medium, and the second sub information is recorded on the information recording medium,
the reproduction permitting information is converted into the first sub information by using the stamper unique information, and
the stamper unique information is converted into the second sub information by using the medium unique information.

10. The information recording medium according to claim 9, wherein
the first sub information recording area has the first sub information recorded thereon in a form different from a form of the main information, and
the second sub information recording area has the second sub information recorded thereon in a form different from the forms of the main information and the first sub information.

11. The information recording medium according to claim 10, wherein
the information recording medium includes concave-convex recording marks formed in accordance with the main information, and a reflection film formed on the concave-convex recording marks,
the first sub information recording area has the first sub information recorded thereon by at least one of displacement of the concave-convex recording marks, deformation of the concave-convex recording marks, and modification of a predetermined pattern of data to be recorded by the concave-convex recording marks, and
the second sub information recording area has the second sub information recorded thereon by changing a reflectance of the reflection film.

12. The information recording medium according to claim 11, wherein
the medium unique information includes medium identification information for identifying the information recording medium,
the information recording medium further comprises a medium identification information recording area where the medium identification information is recorded, and
the second sub information recording area has recorded thereon second sub information that is obtained by data-converting the stamper unique information based on the medium identification information.

13. The information recording medium according to claim 12, wherein the medium identification information recording area has the medium identification information recorded thereon by irradiating the information recording medium with laser light and changing the reflectance of the reflection film.

* * * * *